(12) United States Patent
Tabata et al.

(10) Patent No.: US 7,198,765 B2
(45) Date of Patent: Apr. 3, 2007

(54) OZONIZER

(75) Inventors: Youichiro Tabata, Tokyo (JP); Akaru Usui, Tokyo (JP); Yujiro Okihara, Tokyo (JP); Tetsuya Saitsu, Tokyo (JP); Norimitsu Esaki, Tokyo (JP); Hajime Nakatani, Tokyo (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 622 days.

(21) Appl. No.: 10/394,048

(22) Filed: Mar. 24, 2003

(65) Prior Publication Data
US 2004/0076560 A1 Apr. 22, 2004

(30) Foreign Application Priority Data
Oct. 22, 2002 (JP) .............................. 2002-306941

(51) Int. Cl.
*B01J 19/08* (2006.01)
(52) U.S. Cl. .............................. 422/186.07; 422/186.2
(58) Field of Classification Search ............ 422/186.7, 422/186.2, 186.07
See application file for complete search history.

(56) References Cited

U.S. PATENT DOCUMENTS

| | | | |
|---|---|---|---|
| 3,973,133 A * | 8/1976 | Emigh et al. .......... | 422/186.11 |
| 4,232,229 A | 11/1980 | Tanaka et al. | |
| 5,094,822 A * | 3/1992 | Dunder .................. | 422/186.22 |
| 5,932,180 A * | 8/1999 | Zhang et al. .......... | 422/186.07 |
| 5,942,196 A * | 8/1999 | Tabata et al. .......... | 422/186.07 |
| 6,284,205 B1* | 9/2001 | Murata et al. ......... | 422/186.11 |

FOREIGN PATENT DOCUMENTS

| | | |
|---|---|---|
| EP | 1052221 A1 * | 11/2000 |
| EP | 1 167 287 A1 | 1/2002 |
| JP | 10-25104 | 1/1998 |
| JP | 11-292516 | 10/1999 |
| WO | WO 02/20398 | 3/2002 |

* cited by examiner

*Primary Examiner*—Kishor Mayekar
(74) *Attorney, Agent, or Firm*—Leydig, Voit & Mayer, Ltd.

(57) ABSTRACT

An ozone generator in which a discharge region may be enlarged without damaging ozone generating performance. In the ozonizer, an alternating current is applied between a first electrode and a second electrode, and a discharge is produced in a gap into which oxygen is injected. In the first electrode, an ozone gas passage for retrieving ozone gas generated in the discharge region is located between an electrode surface facing the discharge region and a side. The ozone gas passages are dispersed in the first electrode. The ozone gas passages collect ozone generated at discharge region locations inside the first electrode.

19 Claims, 53 Drawing Sheets

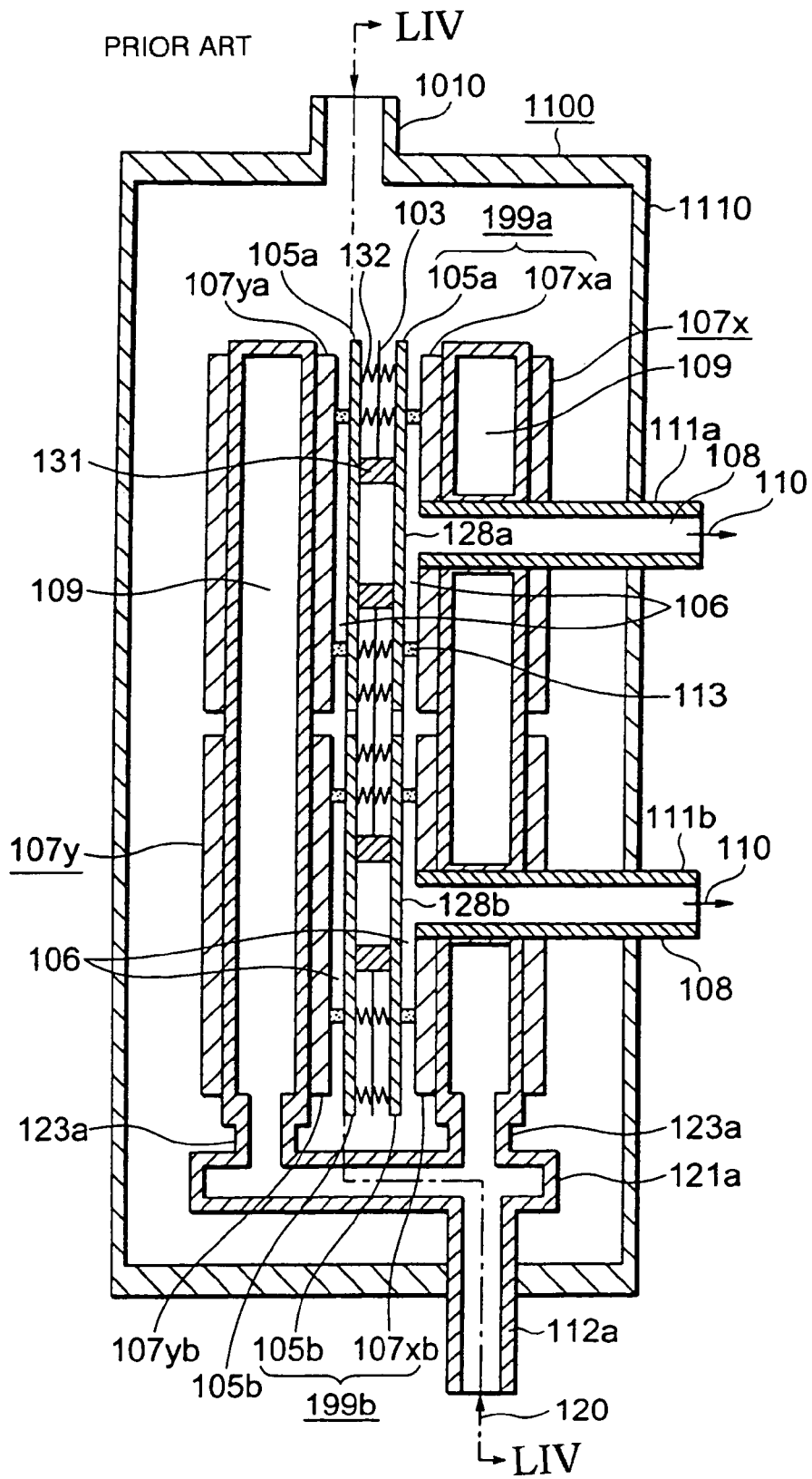

OZONIZER

BACKGROUND OF THE INVENTION

1. Field of the Invention

The present invention relates to a flat plate laminate ozone generating apparatus including a plurality of laminated plate-shaped high voltage electrodes and low voltage electrodes between which an alternating voltage is applied to produce a discharge and generate ozone gas, and in particular, to an ozonizer which is an essential portion of the flat plate laminate ozone generating apparatus and which includes the high voltage electrodes and low voltage electrodes and to which a gas containing oxygen is supplied to generate ozone gas, and also in particular, to a construction of the ozonizer which is thin, of a large capacity and in which the number of components may be reduced while also making the apparatus small in size.

2. Description of the Related Art

FIG. 49 is a side sectional view of a conventional coaxial cylindrical ozone generating apparatus disclosed in, for example, Japanese Patent Publication Sho 59-48716. FIG. 50 is a sectional view, taken along the line L—L, of the coaxial cylindrical ozone generating apparatus of FIG. 49. In FIGS. 49 and 50, a coaxial cylindrical ozone generating apparatus includes a power source 1300 for applying a high voltage to a high voltage electrode 3, a glass dielectric tube 5 which is 40 mm in diameter and approximately 1 m in height. The high voltage electrode 3 has a conductive layer on an inner circumferential surface of the glass dielectric tube 5. A cylindrical earthed electrode tube 7 having an 50 mm outside diameter and approximately 1.2 m height is disposed coaxially with the glass dielectric tube 5 having the high voltage electrode 3. A discharge gap 106 between the cylindrical earthed electrode tube 7 and the glass dielectric tube 5 is maintained by a spring-shaped spacer 113 disposed at opposing portions of both electrodes. In a housing 1100 for housing these component parts, an inlet 1010 for supplying a raw material gas, including oxygen, and an exhaust outlet 111 are provided. Moreover, a cooling space 109 is provided at an outer circumferential side of the cylindrical earthed electrode tube 7 of the housing 1100.

The glass dielectric tube 5 forms a dual tube construction together with the cylindrical earthed electrode tube 7 and a dielectric is inserted between the cylindrical earthed electrode and the high voltage electrode 3 to form an electrode pair. A high voltage is applied to the high voltage electrode 3 to cause a discharge in the discharge gap 106 and generate ozone. In the cooling space 109, water (coolant) is flowed from a flow inlet 112*a* to a flow outlet 112*b* for cooling.

The discharge gap 106 is formed as an approximately 0.6 mm space (discharge gap) between the cylindrical earthed electrode tube 7 and the glass dielectric tube 5 by fitting the glass dielectric tube 5, with the spring-shaped spacer 113 disposed at an outer circumferential portion thereof, in the cylindrical earthed electrode tube 7. Construction is such that oxygen or air, being a raw material gas, is flowed in the discharge gap under a gas pressure of approximately 0.1 MPa and gas passing through the apparatus is taken out. Generally, in one (1) of the above ozone generating cells of a 50 mm outside diameter and approximately 1.2 m height, a power injection density is 0.2 W/cm² or less for efficient ozone generation.

An alternating high voltage is applied between the electrodes (between the gap), which include the cylindrical earthed electrode tube 7 and the glass dielectric tube 5 formed with the high voltage electrode 3 at an inner circumferential surface thereof, and a dielectric barrier of a 0.2 W/cm² power density is generated whereby the raw material gas is converted to an ozone gas of a 100 g/m³ ozone concentration. This generated ozone gas is continuously taken out from the exhaust port 111 with the flow of the raw material gas. Generally, in each of the above ozone generating cells, 50 mm in outside diameter and approximately 1.2 m in height, approximately 25 g/h of generated ozone may be obtained. An ozone efficiency for obtaining 1 kg/h of ozone is approximately 10 kWh/kg. Also, the volume of one (1) of these ozone generating apparatuses is 2000 cm³.

Ozone gas is used in washing semiconductors and liquid crystal production apparatuses and film and resist peeling processing. It is also used in water treatment apparatuses and pulp bleaching apparatuses and a large amount of ozone is required in these fields. The amount of ozone used in the above mentioned semiconductors and liquid crystal production fields is several tens g/h to 500 g/h, and, in addition to ozone generating performance, compactness is highly desired. For example, in only an ozonizer portion with an ozone generating capacity of 250 g/h, a width of 20 cm or less, height of 20 cm or less, depth of 50 cm or less and volume of 20000 cm³ (0.02 m³) or less is desired. Moreover, in the fields of water treatment or pulp bleaching, a large capacity of ozone, 10 to 60 kg/h, is necessary. In this case, were one to construct a 60 kg/h-class ozone generating apparatus of a plurality of the above mentioned 50 mm–1.2 m ozone generating cells, approximately 2400 (=60000 g/h/25 g/h) ozone generating cells would be required and this would be extremely large and construction and maintenance costs would be high. By simple calculation, the size of this 60 kg/h-class ozone generating apparatus would be approximately 4.8 m³ (=2400 cells×2000 cm³) and, in actuality, it would be a large apparatus, approximately 6 m³. An apparatus of a number of these ozone generating cells is shown in FIGS. 51 to 52. Although the apparatus shown includes eight (8) ozone generating cells, the conventional large apparatus is constructed as in FIG. 53; in the actual 60 kg/h-class ozone generating apparatus, construction is such that two thousand four hundred (2400) glass dielectric tubes are inserted.

In FIGS. 51 and 52, the large ozone generating apparatus includes a plurality of electrode pairs including the cylindrical earthed electrode tube and glass dielectric tube 5, 40 mm in diameter and 1 m in length, with the high voltage electrode 3 housed in the housing 1100; FIG. 51 is a side sectional view thereof and FIG. 52 is a sectional view, taken along the line LII—LII, of FIG. 51. The apparatus shown in FIGS. 51 and 52 has an abutting structure (tandem structure) in which, in the electrode pair, the glass dielectric tubes 5 are inserted in the cylindrical earthed electrode tubes 7 from both sides. These two electrode pairs disposed in tandem comprise one set of which there are four sets in all. That is, the apparatus is constructed from a total of eight electrode pairs. (See FIG. 52).

In FIGS. 54 and 55, there is shown a conventional example of a flat plate ozone generating cell laminated in multiple layers in order to make the apparatus comprising a number of 50 mm–1.2 m ozone generating cells, shown in FIGS. 51 and 52, a compact structure. This is essential portion of a conventional ozone generating apparatus disclosed in Japanese Patent Publication Laid-open No. Hei 10-25104 "Discharge Cell for Ozone Generating Apparatus". FIG. 54 is a transverse sectional view and FIG. 55 is a vertical section taken along the line LV—LV in FIG. 54. Moreover, FIG. 54 shows a view, along the line LIV—LIV in FIG. 55, viewed from the direction of the arrows. In FIGS.

54 and 55, high frequency wave inverter portions 1300a, 1300b, 1300c for supplying power to an ozonizer 1100 are connected in the ozonizer 1100. Fuses 177a, 177b, and 177c for preventing excess current, which are electrically connected to the high frequency wave inverter portions 1300a, 1300b, and 300c, are disposed inside the ozonizer 1100. The fuses 177a, 177b, 177c are held at side surfaces of low voltage electrodes 107x, 107y via insulators.

The ozonizer 1100 includes an ozonizer cover 1110 of a cylinder-and-bottom shape with an airtight inner structure. A raw material gas inlet 1010 for supplying a raw material gas (oxygen gas) from outside to inside the ozonizer cover 1110 is provided in the ozonizer cover 1110. Two (2) plate, six (6) corner, flat low voltage electrodes 107x, 107y are provided in the ozonizer 1100. In the low voltage electrodes 107x, 107y, machined material is joined by welding so as to make cavities in respective inner portions. These inner portion cavities are, as described later, used as a cooling water passage 109. That is to say, cooling water is circulated as a coolant in inner portions of the low voltage electrodes 107x, 107y which, in addition to being electrodes, also have a heat sink function.

In the space between the two (2) plate low voltage electrodes 107x, 107y, three (3) plate disc-shaped low voltage electrodes 107xa, 107xb (107xc not shown in the drawing) are connected at a low voltage electrode 107y-side surface of the low voltage electrodes 107x. On the other hand, three (3) plate disc-shaped low voltage electrodes 107ya, 107yb (107yc not shown in the drawing) are connected at a low voltage electrode 107x-side surface of the low voltage electrodes 107y.

Furthermore, In the space between the two (2) plate low voltage electrodes 107x, 107y, three (3) disc-shaped dielectric plates 105a, 105b, 105c are disposed facing the disc-shaped low voltage electrodes 107xa, 107xb (107xc not shown), respectively. While three (3) disc-shaped dielectric plates 105a, 105b and 105c are disposed facing the disc-shaped low voltage electrodes 107ya, 107yb (107yc not shown), respectively, at the low voltage electrode 107y-side as well. Each two (2) plate dielectric 105a, 105b and 105c forms a pair. Thin electrically conductive films 115a, 115b and 115c are formed at surfaces which face the two (2) plate, dielectric 105a, 105b, 105c pairs, respectively.

Spacers 113 are sandwiched between the low voltage electrodes 107xa, 107xb (107xc not shown) and the dielectric plates 105a, 105b and 105c. Discharge regions 106 are formed between low voltage electrodes 107xa, 107xb (107xc not shown) and dielectric plates 105a, 105b and 105c, respectively, by means of spacers 113. The discharge regions 106 are formed as an extremely small space. Similarly, discharge regions 106 are formed as an extremely small space between low voltage electrodes 107ya, 107yb (107yc not shown) and dielectric plates 105a, 105b and 105c, respectively, by means of spacers 113.

Gas sealing material 131 having elasticity is disposed between each two (2) plate dielectric pair 105a, 105b and 105c. Moreover, high voltage electrodes 103 which are thin plate electrodes are disposed between each two (2) plate dielectric pair 105a, 105b and 105c. Furthermore, gold springs 132 are disposed between each respective high voltage electrode 103 and dielectric 105a, 105b and 105c. That is, the high voltage electrodes 103 are constructed so as to be sandwiched between two (2) plate dielectrics 105a, 105b and 105c which have an elastic function. The high voltage electrodes 103 are electrically connected to surfaces of the electrically conductive films 115a, 115b and 115c of the dielectric plates 105a, 105b and 105c via the gold springs so as to supply high voltage to the dielectric plates 105a, 105b and 105c.

In this prior art, the disc-shaped low voltage electrodes 107xa, 107xb (107xc not shown) which are to be discharge surfaces of a high degree of flatness are each connected on the low voltage electrode surface divided from the center of the six (6) corner, flat low voltage electrodes 107x, 107y into three equal sections at 120 degrees, and three (3) disc-shaped dielectric plates 105a, 105b, 105c are disposed facing the disc-shaped low voltage electrodes 107xa, 107xb (107xc not shown), respectively. Accordingly, the common low voltage electrode 107x, 107y and a discharge portion including one (1) of the dielectric plates 105a or 105b or 105c is referred to as an ozone generating discharge cell 199a, 199b (199c not shown), respectively. In this prior art, a discharge unit includes three (3) discharge cells 199a, 199b and 199c in the common low voltage electrode 107x, 107y.

Ozone retrieving holes 128a, 128b and 128c are bored in central portions of the dielectric plates 105a or 105b and 105c. Moreover, ozone retrieval holes are also formed in the low voltage electrodes 107xa, 107xb (107xc not shown), and ozone discharge pipes 111a, 111b (111c not shown) which pass through a respective low voltage electrodes 107x are communicated in these ozone retrieval holes. Ozone gas flowing in the direction of the arrows 110 in FIG. 55 is taken out from the ozonizer 1100 The cooling water passage 109 for circulating cooling water as a coolant is formed in an inner potion of the low voltage electrode 107x, 107y. The cooling water passage 109 includes a cooling water inlet 123a and outlet 123b. A cooling water supply header 121a and cooling water discharge header 121b are connected in the inlet 123a and outlet 123b via piping 122a, 122b, respectively. Furthermore, a discharge outlet 112a of a main cooling pipe for supplying cooling water to the ozonizer 1100 from the outside is connected at the cooling water supply header 121a. Also, a discharge inlet 112b of a main cooling pipe for discharging cooling water from the ozonizer 1100 to the outside is connected at the cooling water discharge header 121b. Cooling water flows as shown by the arrow 120 in FIG. 54 and is supplied to the ozonizer 1100.

Accordingly, three (3) discharge regions 106 are provided at the main surface of the low voltage electrode 107x, 107y, and since the discharge regions 106 are also formed at both surfaces of the high voltage electrode 103, a total of six (6) discharge regions are formed. Six (6) discharge cells are formed by the spacers 113 provided in the discharge regions 106 for forming the discharge regions 106, one (1) low voltage electrode 107x, 107y set and six (6) dielectric plates 105a, 105b and 105c, and the high voltage electrode 103. Hence, (each) low voltage electrode pair 107x, 107y includes six (6) discharge regions and the structure is such that a high capacity ozonizer may be constructed.

The discharge cell structure is such that, along with the cooling water passage 109 provided in an inner portion of the low voltage electrode pair 107x, 107y, ozone gas passages are also formed and three (3) ozone gas passages are provided in the laminating direction.

Next, operation will be explained. A high voltage generated by the high frequency inverter portions 1300a, 1300b and 1300c is supplied to the dielectric plates 105a, 105b and 105c via the excess current preventing fuses 177a, 177b and 177c disposed at side surfaces of the low voltage electrode 107x, 107y, from the high voltage electrode and (finally) through the gold springs 132. A raw material gas containing oxygen is introduced from the raw material gas inlet 1010 provided in the ozonizer cover 1110 and the raw material gas is sucked into the discharge gaps 106 from the outside circumferential direction of the ozone generating discharge cells 199a, 199b and 199c, and the raw material gas becomes ozone when a silent discharge is performed in the discharge gaps 106. The ozone gas exiting the discharge gaps 106 is led to the ozone retrieving holes 128a, 128b and 128c, discharged in the ozone discharge pipes 111a, 111b and 111c in the direction shown by the arrows 110 and is taken out.

In an ozone generating apparatus constructed such as above, in order to increase the discharge surface area and, thus, capacity, a plurality of dielectric plates 105a, 105b and 105c are disposed facing the common low voltage electrode 107x, 107y so that a high capacity becomes a possible without increasing the size of the dielectric plates 105a, 105b and 105c, which must be thick in order to obtain a predetermined level of flatness. Also, the amount of ozone generated may be increased while the number of low voltage electrode parts for cooling—coupling, connected to low voltage electrode 107x, 107y, as well as parts in the low voltage electrode 107x, 107y itself, may be reduced.

Furthermore, because the plurality of discharge cells 199a, 199b and 199c are disposed effectively in the common low voltage electrode 107x, 107y, a compact apparatus may be realized. Moreover, since the disc shaped low voltage electrodes 107xa, 107xb 107xc which are discharge surfaces having a flatness of a high precision are connected in the common low voltage electrode 107x, 107y, a predetermined level of flatness may be obtained.

A dielectric barrier discharge is generated in the discharge regions 106 via the dielectric plates 105a, 105b and 105c by applying an alternating high voltage to the total of six (6) high voltage electrodes 103 arranged at main surfaces of the low voltage electrode pair 107x, 107y. Because an alternating high voltage is applied for discharge to each of the low voltage electrode pair 107x, 107y and the six (6) high voltage electrodes 103, three pairs (6) of discharge regions 106 are formed in roughly the same plane. Oxygen gas is at first disassociated into oxygen atoms and, at approximately the same time, these oxygen atoms are involved in a three-way collision with other oxygen atoms or a wall and ozone gas is simultaneously generated from the six (6) discharge regions 106, and a large quantity of ozone gas may be obtained.

Because each low voltage electrode 107x, 107y is common for three discharge regions 106, electrodes of three discharge regions may be cooled together when cooling water is flowed in the low voltage electrode 107x or 107y.

Moreover, although this prior art is described having only one (1) low voltage electrode pair 107x, 107y, laminating modules, including the low voltage electrode pair 107x, 107y and a plurality of electrodes sandwiched there-between, in a plurality of layers is also commonly performed to increase the quantity of generated ozone gas.

Patent Publication 1: Japanese Patent Publication No. Sho 59-48761

Patent Publication 2: Japanese Patent Laid-open No. Hei 10-25104 (para. 4–5, FIGS. 1–2)

Patent Publication 3: Japanese Patent Laid-open No. Hei 11-292516

SUMMARY OF THE INVENTION

Nevertheless, in an ozonizer of such a construction, the low voltage electrodes 107x, 107y are made by machining and welding, and making the apparatus, which is stubbornly heavy, compact is problematic.

Also, in the ozone generating apparatus including piping for retrieving ozone gas and piping for cooling the low voltage electrodes 107x, 107y, and particularly in the case where modules of a plurality of electrodes are laminated in multiple layers parallel to the main surfaces thereof and sandwiched between the pair of low voltage electrodes 107x, 107y, piping extends from the modules and there are problems in that arrangement of the piping becomes complicated, manufacturing costs increase and the size of the ozone generating apparatus increases.

The present invention was made to solve the above problems and an object of the present invention is to provide an ozonizer in which a surface area of discharge regions may be increased to increase an ozone generating capacity, ozone generating performance is not damaged even if the discharge region for one (each) electrode surface is increased and reliability is high, a high level of flatness may be maintained in the electrode surface, a laminate structure of modules may be easily constructed, cooling performance of the electrode may be increased, an apparatus may be small and light, structure of the piping may be simplified, and further, the manufacturing cost may be reduced.

Moreover, flat plate electrodes are of slender shape and an ozone generating capacity of an ozone generating module of a plurality of layers of laminated ozone generating cells is increased, and an outer shape of a housing for the ozone generating module(s) is made smaller. Thus, another object is to provided an ozonizer which is compact and light, and which has strong resistance to gas pressure in the housing.

Furthermore, another object is to provide an ozone generating apparatus in which a plurality of ozonizers are housed in a single housing so that, in the ozone generating apparatus of further increased capacity, the size may be reduced, and manufacturing and maintenance costs may be reduced.

According to one aspect of the present invention there is provided an ozonizer wherein, an electrode module comprising a flat plate first electrode, a flat plate second electrode facing a main surface of the first electrode, and a flat dielectric plate and spacer for forming a discharge region provided between electrodes of the first electrode and second electrode, is laminated in a plurality of layers, an alternating current is applied between an electrode of the first electrode and an electrode of the second electrode, and a discharge is brought about in a gap of the discharge region which is injected with a gas containing at least oxygen gas, in the first electrode, an ozone gas passage for taking out ozone gas generated by the discharge region is formed between an electrode surface facing the discharge region and a side portion, a plurality of the ozone gas retrieving holes are dispersed in a discharge region of the first electrode so as to make flow velocity distribution in a radial direction(s), with the ozone gas retrieving holes connected with the ozone passage as centers, approximately uniform, and the plurality of ozone gas passages collect and draw out ozone gas generated at a plurality of the discharge region locations inside the first electrode.

According to another aspect of the present invention, the ozonizer housing is made an airtight structure by soldering or welding and the like.

According to yet another aspect of the present invention, the ozonizers are housed in a cylindrical housing and any of coolant inlet/outlet piping, raw material gas intake piping, ozone gas retrieving piping and a high voltage brushing are taken out from an end surface of the housing, and the housing is made an airtight structure by soldering or welding and the like.

According to yet another aspect of the present invention, a plurality of ozonizers are housed in a single vessel and the construction includes means for branching and sending coolant to the ozonizers, means for collecting and retrieving coolant from the ozonizers, means for collecting and retrieving ozone gas from the ozonizers and means for supplying voltage to a high voltage electrode.

BRIEF DESCRIPTION OF THE DRAWINGS

FIG. 55 is a vertical section of an essential portion of a conventional ozone generating apparatus, and is a sectional view, from the perspective of the arrows, taken along the line LV—LV in FIG. 54;

DETAILED DESCRIPTION OF THE PREFERRED EMBODIMENTS

Embodiment 1

A flat plate laminated ozone generating apparatus including an ozonizer of the present invention is commonly provided for a semiconductor manufacturing apparatus and another apparatus such as a washing apparatus. Although, a control panel or control portion is generally provided at each apparatus, in view of operability by an operator, it is preferable that each control panel or control portion be provided side by side facing, for example, a corridor and the like. On the other hand, a comparatively large dimension (area) is allowed for length (depth) perpendicular to the surface where the control panels and the like are arranged. For this reason, each apparatus is likely have a narrow width facing the corridor and to be long and narrow in the depth direction.

When the flat plate laminated ozone generating apparatus is used as a high capacity ozone apparatus in the fields of water treatment and pulp bleaching, a housing must have sufficient strength to withstand the gas pressure. An electrode of a discharge cell is made as a long, thin rectangular shape to ensure electrode surface area, and, as for the housing which forms (the shape of) the ozonizer, if a cylindrical housing of a small diameter is used, it is possible to have high-pressure strength, the apparatus may be made lighter and the cost may be reduced.

Accordingly, in the flat plate laminated ozone generating apparatus including an ozonizer of the present invention a long thin rectangular shape is generally desired. On the other hand, with an aim to increasing an ozone generating capacity of an ozonizer 100, it is also desired that volume be as large as possible. From these two (2) requirements the flat plate laminated ozone generating apparatus should ideally be a rectangular parallelopiped-shape which is as expansive as possible in the allotted space, and in particular, a cross sectional shape should ideally be a long thin rectangle in the horizontal plane.

Figure 1:
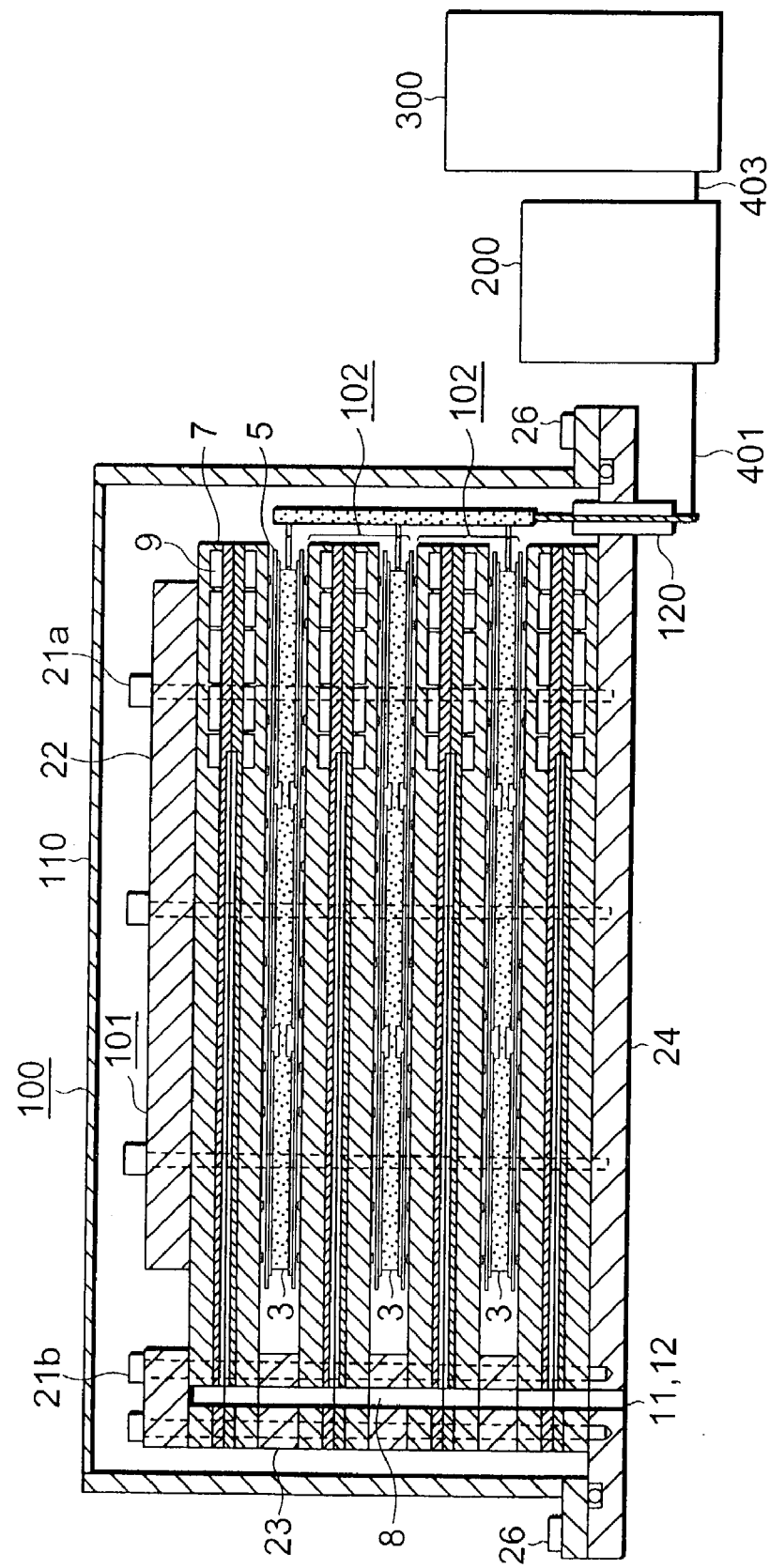
FIG. 1 is a schematic sectional view of a flat plate laminate ozone generating apparatus including an ozonizer of Embodiment 1 of the present invention.
Figure 2:
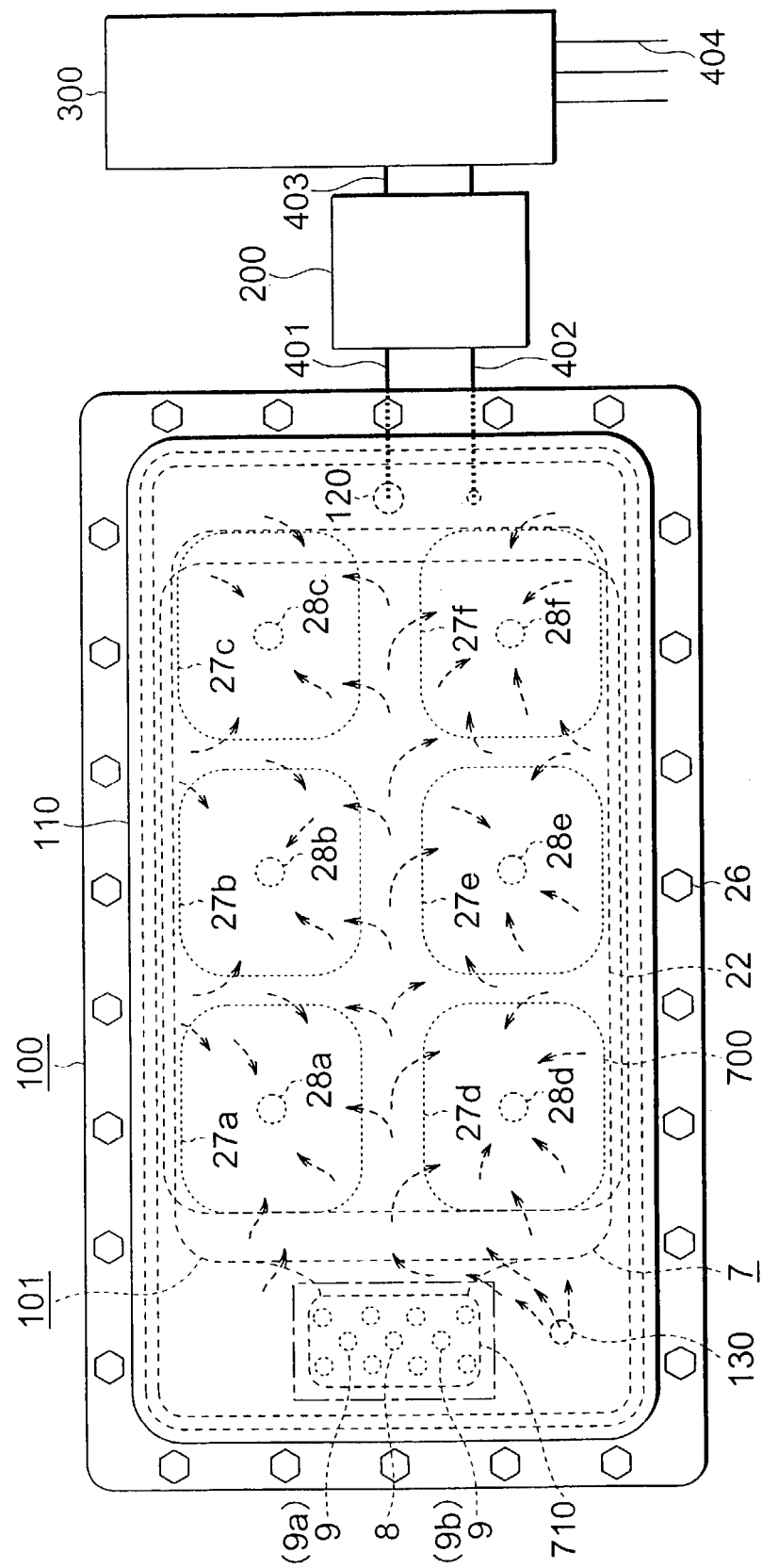
FIG. 2 is a drawing of the laminate ozone generating apparatus of FIG.1 as viewed from above.

FIG. 1 is a schematic sectional view of a flat plate laminate ozone generating apparatus including an ozonizer of Embodiment 1 of the present invention. FIG. 2 is a drawing of the laminate ozone generating apparatus of FIG. 1 as viewed from above. In FIGS. 1 and 2, the flat plate laminate ozone generating apparatus includes an ozonizer 100 which is an essential construction for generating ozone, an ozone transformer 200 for supplying power to the ozonizer 100 and a high frequency inverter 300.

The high frequency inverter 300 changes power from an input power source to a required frequency and outputs it to an inverter output cable 403. The ozone transformer 200 improves a power factor of a load by its own inductance, increases the power to a predetermined voltage and supplies the power, which is necessary for ozone generation, to the ozonizer 100 via a high voltage cable. The high voltage cable 401 is connected to high voltage electrode(s) 3 in the ozonizer 100 (described below) through a high voltage bushing 120. The high frequency inverter 300 has a function of controlling current/voltage and controls the amount of power supplied to the ozonizer 100.

High voltage is supplied from the ozone transformer 200 to the high voltage electrode(s) 3 of the ozonizer 100 from the high voltage cable 401 through the high voltage bushing 120. On the other hand, low voltage supplied form the ozone transformer 200 is supplied to low voltage electrode(s) 7 from a low voltage cable 402 via a base 24.

The ozonizer 100 includes a plurality of laminated electrode modules 102. An electrode module 102 comprises the low voltage electrode 7 as a first electrode and the high voltage electrode 3 as a second electrode. Construction of the electrode module 102 will be described later. A predetermined number of electrode modules 102 are laminated on a base 24 in a vertical direction in FIG. 1 to construct an ozonizer electrode 101. The plurality of laminated electrode modules 102 and an electrode presser plate 22 superposed in a topmost position are secured to the base 24, with a predetermined fastening force, by means of fastening bolts 21a. This fastening force will be described later.

The ozonizer electrode 101 is covered with an ozonizer cover 110. The ozonizer cover 110 forms an approximate box-shape with one (1) surface removed, and flanges provided at a circumferential edge portion of an opening are secured to the base 24 by means of cover fastening bolts 26. An O-ring is sandwiched between the opening circumferential edge portion of the ozonizer cover 110 and the base 24 and an inner space formed by the ozonizer cover 110 and the base 24 is an airtight construction.

An oxygen gas inlet 130 for supplying oxygen gas containing trace amounts of nitrogen and carbon dioxide gas is provided in the base 24 in the inner space. Oxygen gas supplied from the oxygen gas inlet 130 is filled in the ozonizer cover 110 and enters into a gap of a discharge region which is described later. An ozone gas outlet 11 for expelling ozone gas generated in a discharge region from the ozonizer 100 to the outside and a cooling water inlet/outlet 12 for bringing in and taking out cooling water for cooling the electrode module 102 are provided in the base 24. That is, the ozone gas outlet 11 is an end portion opening of an ozone gas passage 8 provided in the base 24 and the cooling water inlet/outlet 12 is an end portion opening of a cooling water passage 8 provided in the base 24.

In a flat plate laminate ozone generating apparatus such as above, the present invention particularly relates to the ozonizer 100 which is an essential portion of the ozone generating apparatus. In particular, the present invention relates to a construction in which the ozonizer 100 is made in a rectangular shape with an aim to increasing the capacity of the ozonizer 100 and improving a space factor of the apparatus, and along with making the ozonizer 100 rectangular, relates to respective shapes of low voltage electrodes, dielectric plates and high voltage electrodes in the electrode module 102, a cooling construction and an ozone retrieving construction. Furthermore, the present invention also relates to a constructions such as a shape of the housing and the like in which ozone may be efficiently generated, the ozonizer may be compact, manufacturing cost may be lowered, weight may be reduced, and to method of sealing the housing in which a pressure strength of the housing may be increased, and to a construction of a large capacity ozonizer provided with a plurality of ozonizers.

Figure 3:
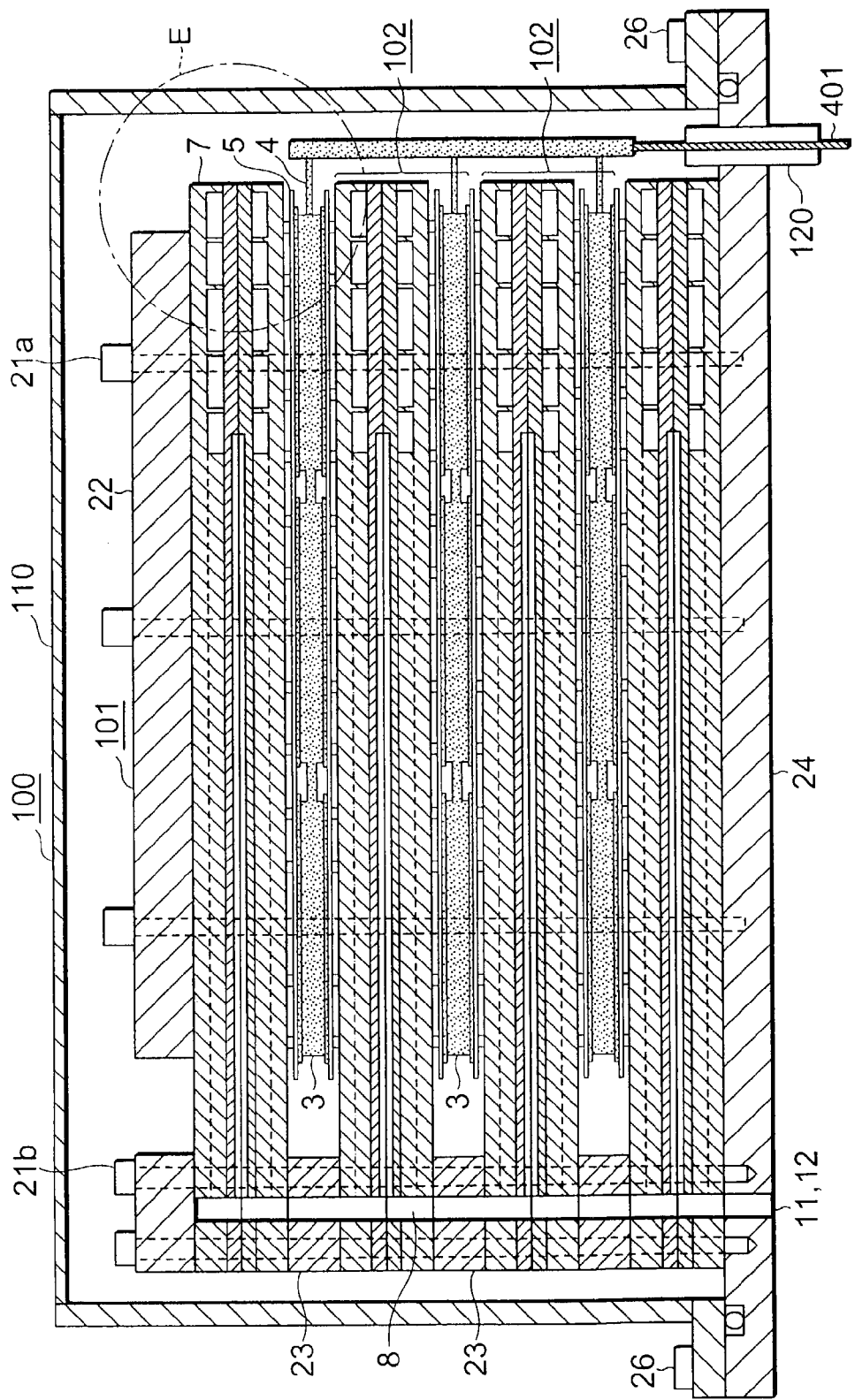
FIG. 3 is a typical detailed sectional view showing an ozonizer electrode of the ozonizer of Embodiment 1 of the present invention.
Figure 4:
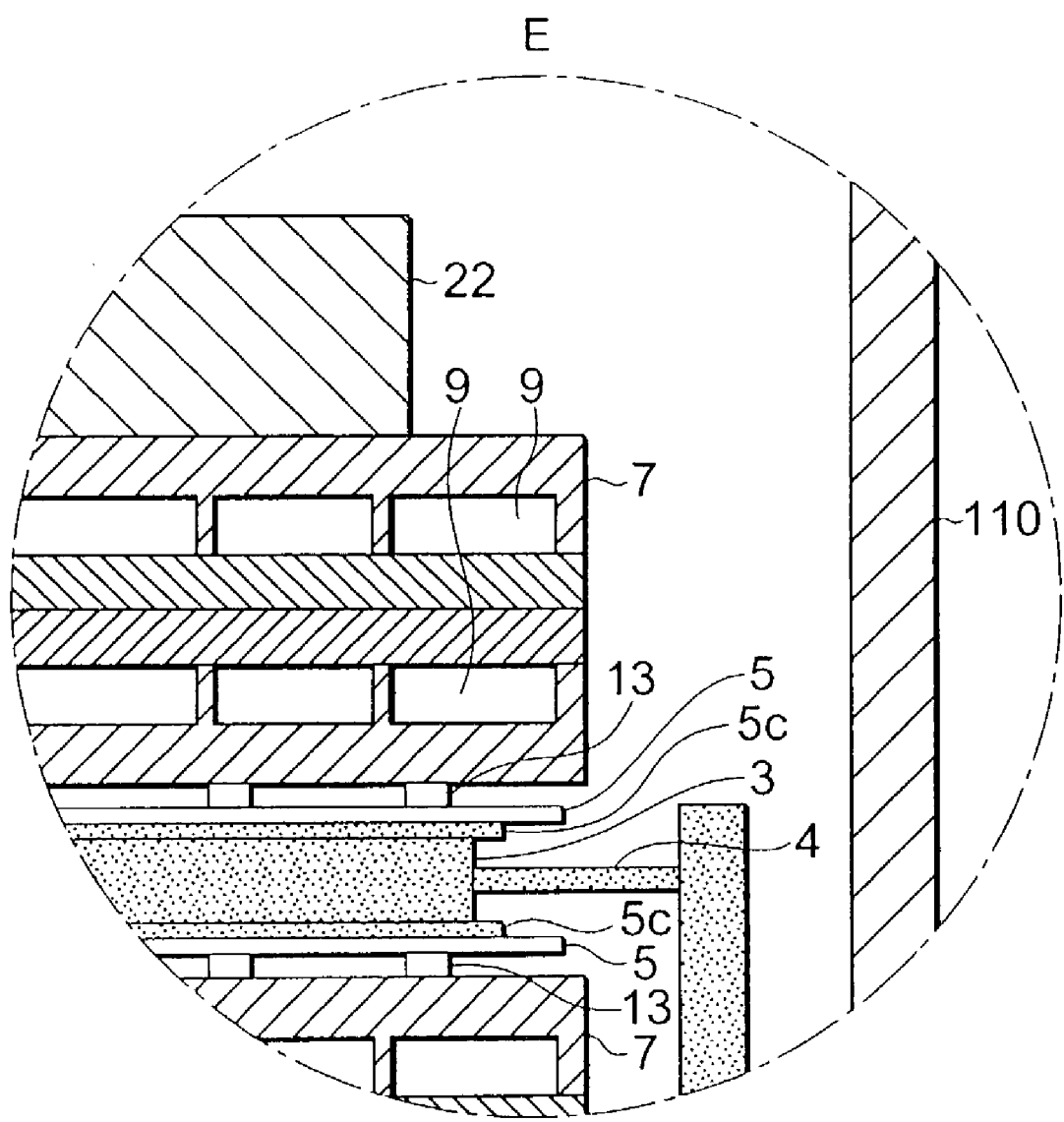
FIG. 4 is an enlarged view of the portion E in FIG. 3.

FIG. 3 is a typical detailed sectional view showing an ozonizer electrode of the ozonizer of Embodiment 1 of the present invention. FIG. 4 is an enlarged view of the portion E in FIG. 3. In FIGS. 3 and 4, the ozonizer electrode 101 comprises the flat plate low voltage electrode(s) 7 as first electrodes, the flat plate high voltage electrode(s) 3 as second electrodes facing a main surface of the low voltage electrodes 7, flat plate dielectric(s) 5 provided between the low voltage electrodes 7 and high voltage electrodes 3 and spacer(s) 13 for forming discharge regions of a thin thickness in a laminating direction. One (1) electrode module 102 is formed by a combination of the high voltage electrode 3, low voltage electrode 7, dielectric plate 5, spacer(s) 13 and a later described discharge region. The electrode modules 102 are laminated in multiple stages (layers) to construct the ozonizer electrode 101.

In the ozonizer 101, an alternating current is applied between the low voltage electrode 7 and high voltage electrode 3 and a discharge is caused in a discharge region filled with a gas containing oxygen gas (raw material gas) to generate ozone gas. Power is supplied to a feeder terminal 4 of the high voltage electrode 3 from the transformer 200 shown in FIG. 1 via the high voltage bushing 120. The high voltage electrode 3 is made of a metal such as stainless steel, aluminum and the like. A main surface of the dielectric plate 5 is closely contacted to the high voltage electrode 3 via a later described electrically conductive film. The dielectric plate 5 is made of a material such as ceramic, glass, silicon and the like. The discharge region is formed between the dielectric plate 5 and low voltage electrode 7 by means of the spacer(s) 13. In the present embodiment, the discharge region is divided into six (6) discharge regions 27a to 27f shown by the broken lines in FIG. 2. Each discharge region 27a to 27f forms an approximate square shape with four (4) rounded corners, and a raw material gas filled in the ozonizer cover 110 shown in FIG. 1 rushes in toward a center of each discharge region from an entire outer periphery of each discharge region as shown by the broken arrows in FIG. 2.

The raw material gas flowing in the discharge regions 27a to 27f is converted into ozone by applying an alternating high voltage between the low voltage electrode 7 and the high voltage electrode 3. Ozone gas having undergone ozonization in each of the discharge regions 27a to 27f enters inside the low voltage electrode 7 from later described ozone retrieving holes 128a, 128b and 128 and is lead to the ozone gas outlet 11 via the ozone gas passage 8 provided in the low voltage electrode 7.

The low voltage electrode 7 is a thin plate rigid body of four (4) joined metal plates made of stainless steel and the like. Besides the ozone gas passage 8, the cooling water passage 9 for increasing ozone generating efficiency is also provided in the low voltage electrode 7. A gas temperature in the discharge regions 27a to 27f is lowered by flowing cooling water as a coolant in the cooling water passage 9.

The ozone gas passage 8 formed in the low voltage electrode 7 is connected with the ozone gas outlet 11 provided in the base 24 via an ozone gas passage 8 formed in a manifold block 23. On the other hand, the cooling water passage 9 formed in the low voltage electrode 7 is connected with the cooling water inlet/outlet 11 provided in the base 24 via cooling water passage(s) 9 formed in a manifold block 23.

Although not expressly shown in the drawings, a gasket material, such as an O-ring and the like, is sandwiched between the low voltage electrode 7 and the base 24 or manifold block 23, as a watertight countermeasure. Also, a gasket material, such as an O-ring and the like, is sandwiched as an airtight countermeasure.

The electrode module 102 including the low voltage electrode 7, high voltage electrode 3, dielectric plate 5 and spacer(s) 13 are fastened and fixed between the presser plate 22 and base 24 by means of fastening bolts 21a which pass through each constructive element.

Figure 5:
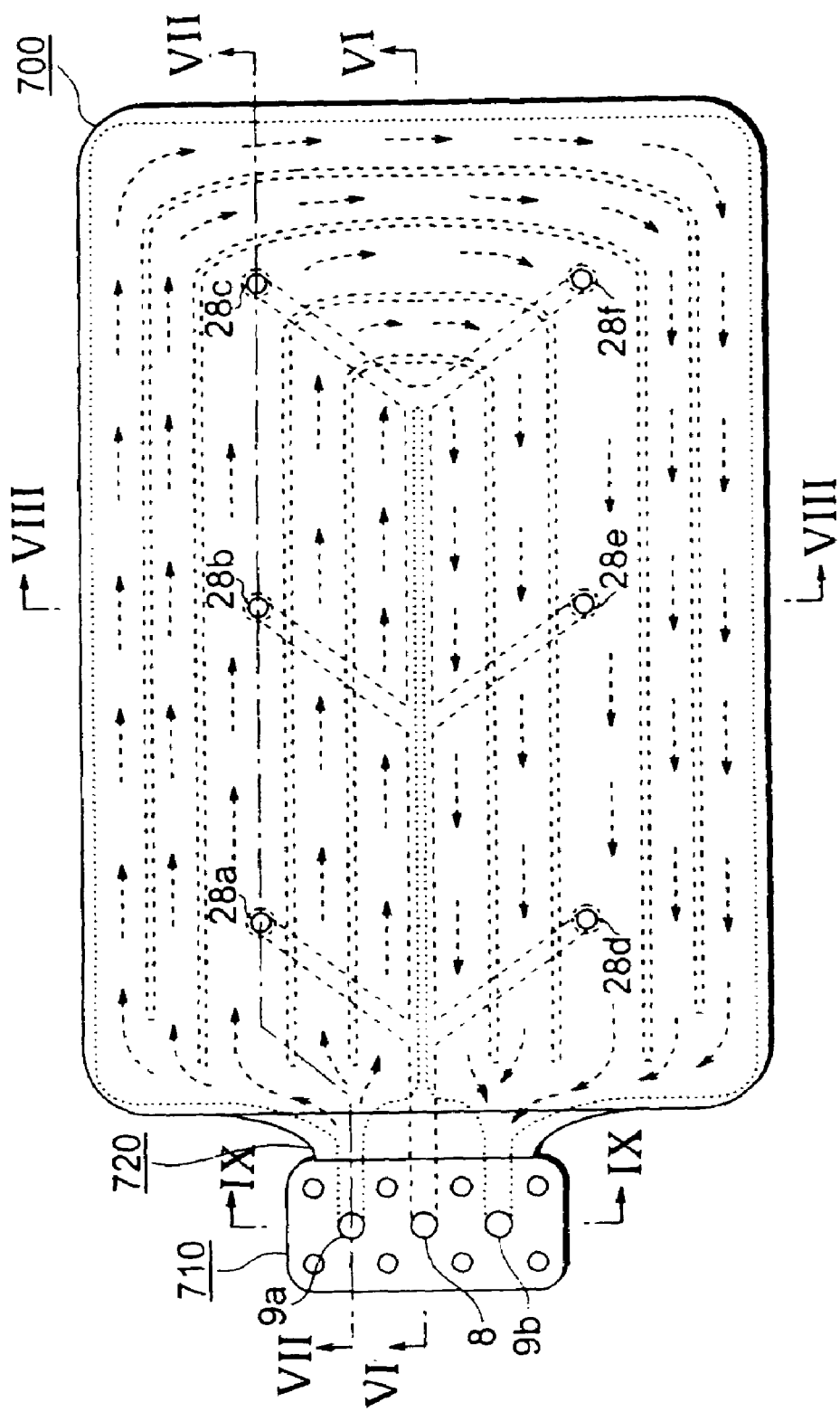
FIG. 5 is a top view of a low voltage electrode of the ozonizer of Embodiment 1 of the present invention.
Figure 6:
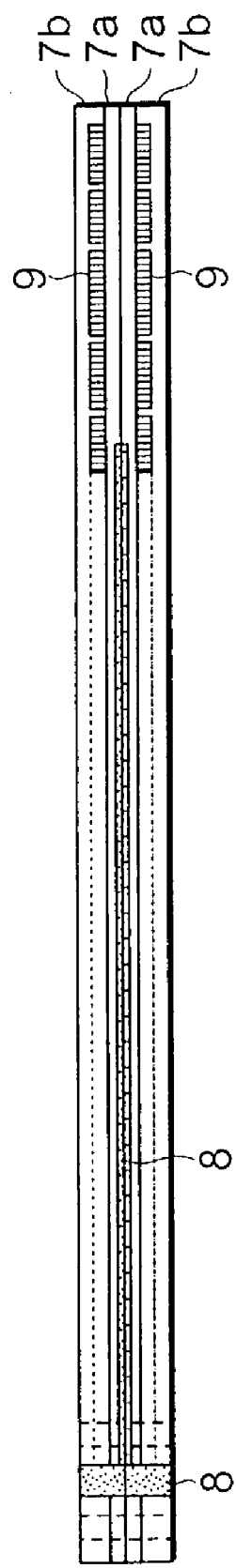
FIG. 6 is a sectional view, from the perspective of the arrows, taken along the line VI—VI in FIG. 5.
Figure 7:
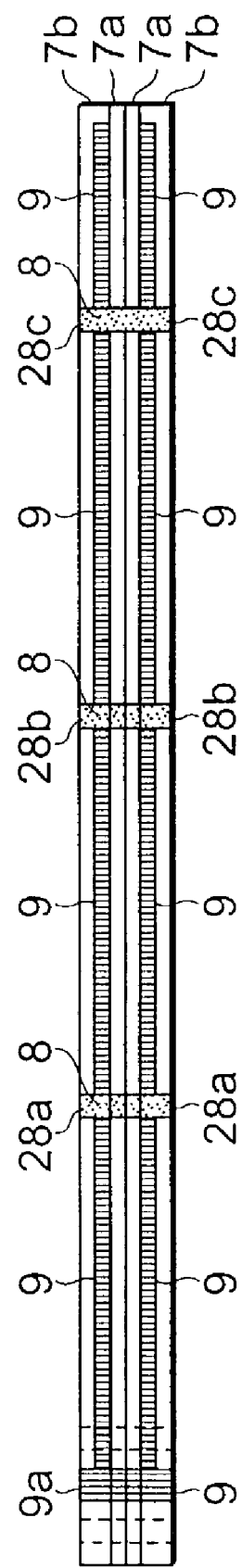
FIG. 7 is a sectional view, from the perspective of the arrows, taken along the line VII—VII in FIG. 5.
Figure 8:
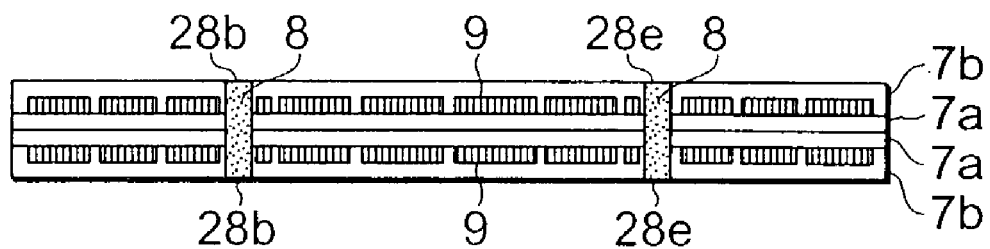
FIG. 8 is a sectional view, from the perspective of the arrows, taken along the line VIII—VIII in FIG. 5.
Figure 9:
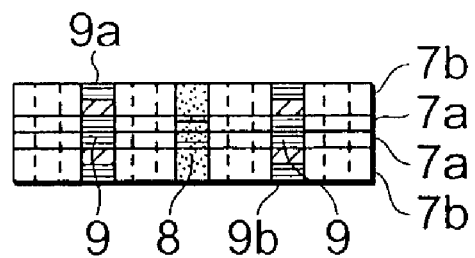
FIG. 9 is a sectional view, from the perspective of the arrows, taken along the line IX—IX in FIG. 5.

Next, construction of the low voltage electrode 7 will be described in detail. FIG. 5 is a top view of a low voltage electrode of the ozonizer of Embodiment 1 of the present invention. FIG. 6 is a sectional view, from the perspective of the arrows, taken along the line VI—VI in FIG. 5. FIG. 7 is a sectional view, from the perspective of the arrows, taken along the line VII—VII in FIG. 5. FIG. 8 is a sectional view, from the perspective of the arrows, taken along the line VIII—VIII in FIG. 5. FIG. 9 is a sectional view, from the perspective of the arrows, taken along the line IX—IX in FIG. 5.

The low voltage electrode 7 is made of a highly ozone resistant metal material and is made as an approximately rectangular (rectangle) flat plate-shape which is spread over an entire region in a horizontal section of the ozonizer cover 110 in order to maintain a large surface area.

The low voltage electrode 7 includes a rectangular flat plate-shape low voltage electrode discharge portion 700 in which main surfaces are electrodes and in which the ozone gas passage 8 and cooling water passage (coolant passage) 9 are formed, and an inlet/outlet portion 710 including an ozone retrieval opening 8a of the ozone gas passage 8 and a cooling water inlet (coolant inlet) 9a and cooling water outlet (coolant outlet) 9b of the cooling water passage 9, provided at a side edge of the low voltage electrode discharge portion 700. The cooling water passage 9 provided in the low voltage electrode discharge portion 700 as a coolant passage extends over the entire low voltage electrode discharge portion 700 so that cooling water, as coolant, circuits through the entire low voltage electrode discharge portion 700.

The low voltage electrode discharge portion 700 comprises the electrode module 102 together with the high voltage electrode 3, dielectric plate 5 and spacer(s) 13 and is laminated on the base 24 and fastened by means of fastening bolts 21a. On the other hand, in the inlet/outlet portion 710, manifold blocks 23 are sandwiched and superimposed adjacently above and below in order to interpolate a height in a laminating direction created by the high voltage electrode 3, dielectric plate 5 and spacer(s) 13, and fastening is by means of fastening bolts 21b. An ozone gas passage 8 and cooling water passage(s) 9 are formed in the manifold blocks 23.

A neck portion 720 is provided between the low voltage electrode discharge portion 700 and inlet/outlet portion 710. The neck portion 720 is formed as a portion of small rigidity so that when the low voltage electrode discharge portion 700 and inlet/outlet portion 710 are fastened by the fastening bolts 21a and 21b, respectively, any deformation occurring in the either of low voltage electrode discharge portion 700 and inlet/outlet portion 710 will not affect the fastening force of the other.

That is to say, the low voltage electrode discharge portion 700, together with the high voltage electrode 3, dielectric plate 5 and spacer(s) 13, is fastened to the base 24 by a predetermined fastening force by means of the fastening bolts 21*a*, and this fastening force is very finely controlled in order to exactly control a height (thickness) of the discharge regions 27*a* to 27*b* which are extremely thin gaps.

On the other hand, the inlet/outlet portion(s) 710, together with the manifold blocks 23, is fastened to the base 24 by means of the fastening bolts 24. Although inlet/outlet portion 710 and manifold blocks 23 are manufactured according to tight dimensional control, because there can never be zero manufacturing errors, a few errors occur between an ideal height.

Although a relative difference between an accumulated error caused by stacking up the low voltage electrode discharge portions 700, the high voltage electrodes 3, dielectric plates 5 and spacers 13 and an accumulated error caused by stacking up the inlet/outlet portions 710 and manifold blocks 23 causes a bending stress to occur between the low voltage electrode discharge portions 700 and the inlet/outlet portions 710, the neck portion 720 of little rigidity is provided between both portions to absorb the bending stress. The neck portion 720 of little rigidity ensure that stresses in respective low voltage electrode discharge portion 700 and the inlet/outlet portion 710 do not have an effect on each other.

Six (6) ozone retrieving holes 28*a* to 28*f* are bored in respective discharge regions of the low voltage electrode discharge portion 700 surface, at both upper and lower main surfaces of the low voltage electrode discharge portion 700, so as to make flow velocity distribution roughly uniform. The amount of ozone gas generated at the surface of the low voltage electrode discharge portion 700 is made uniform by an equal amount of gas flowing into the six (6) bore holes, and thus it is possible to obtain a highly concentrated ozone gas and ozone gas retrieval efficiency is improved. Furthermore, in addition to providing the six (6) ozone retrieving holes 28*a* to 28*f*, by dividing high voltage electrode into six (6) at respective ozone retrieving holes, the discharge regions are dispersed and raw material gas flowing in from a periphery of each discharge region may be equalized. In the present embodiment, as described above, discharge regions 27*a* to 27*f* are divided into six (6). Also, ozone retrieving holes 28*a* to 28*f* are provided so as to be positioned in an approximately central portion of the six (6) discharge regions 27*a* to 27*f*, and ozone gas generated by each discharge region 27*a* to 27*f* is sucked inside the low voltage electrode 7 from these retrieving holes 28*a* to 28*f*. The ozone gas entering the low voltage electrode 7 from the retrieving holes 28*a* to 28*f* is merged into one (1) flow in the low voltage electrode 7 and led to the ozone passage 8 formed in the inlet/outlet portion 710.

As shown in FIGS. 6 to 9, the low voltage electrode 7 is manufactured by laminating a total of four (4) metal electrodes, two (2) first metal electrodes 7*a* and two (2) second metal electrodes 7*b*. A plurality of grooves several mm in depth of a semi-rectangular cross section are formed in a main surface at one side of each of the metal electrodes 7*a*, 7*b* by means of pre-formed half etching or a manufacturing process and the like. First, the two (2) first metal electrodes 7*a* are adhered together so that grooves line up to form the ozone passage(s) 8 in an inside portion. Then, sides of each of the two (2) second metal electrodes 7*b* formed with the grooves are adhered to outside surfaces of each of the metal electrodes 7*a* to form the cooling water passage(s) 9. These four (4) plate metal electrodes 7*a*, 7*b* are joined superposed as an airtight structure by means of soldering or hot pressing and the like.

The ozone passage 8 and cooling water passage(s) 9 are also formed extending in the laminating direction in the inlet/outlet portion 710. Here, the cooling water passage 9 is provided divided into a cooling water inlet (coolant inlet) 9*a* and a cooling water outlet (coolant outlet) 9*b*. As shown by the dotted line in FIG. 5, the cooling water passage 9 connected with the cooling water inlet 9*a* and cooling water outlet 9*b* is formed over nearly the entire inside portion of the low voltage electrode 7. That is, the cooling water passage 9 is formed concentrically in the rectangular flat plate low voltage electrode discharge portion 700 over the entirety, from a central portion to an outer portion. Moreover, adjacent concentric cooling water passages 9 are partitioned by ribs of a thin width. Cooling water flows in these cooling water passages 9 as shown by the broken arrows in FIG. 4.

On the other hand, from the passage formed extending in the laminating portion in the inlet/out let portion 710, the ozone gas passage(s) 8 formed in the low voltage electrode discharge portion 700 extends and branches in the low voltage electrode discharge portion 700 as a branch shape and ends of branch portions are communicated with the ozone gas retrieving holes 28*a* to 28*f* formed at both surfaces. The ozone gas retrieving holes 28*a* to 28*f* equally divide the low voltage electrode discharge portion 700 into six (6) and are provided at central portions, respectively, of these discharge regions 27*a* to 27*f*. Nearly uniform gas is flowed into the ozone gas retrieving holes 28*a* to 28*f* from the periphery by raw material gas flowing toward the ozone gas retrieving holes 28*a* to 28*f* provided at respective centers of the six (6) equally divided discharge regions. The ozone gas retrieving holes 28*a* to 28*f* and branched ozone gas passage 8 comprise collecting means for collecting the ozone gas generated by the number of discharge regions 27*a* to 27*f*. In the present embodiment, although the low voltage electrode discharge portion is divided equally into six (6) and there are six (6) ozone gas retrieving holes 28*a* to 28*f* accompanying them, the low voltage electrode discharge portion 700 may be divided n equal times, two (2) or more, and n number of ozone gas retrieving holes may be provided.

The ozone gas passage 8 and cooling water passage(s) 9 formed extending in the laminating direction in the inlet/outlet portion 710 are connected in a straight line with each respective ozone gas passage and cooling water passage provided in the manifold blocks 23 and are finally connected with the ozone gas outlet 11 and cooling water inlet/outlet 12 provided in the base 24.

The generated ozone gas passes through the ozone gas passages 8 provided in the low voltage electrode discharge portion 700 from central portions of the plurality of discharge regions 27*a* to 27*f* and merges, and is led to the ozone gas passage 8 extending in the laminating direction in the inlet/outlet portion 710. Meanwhile, cooling water flowing in an entirety of the low voltage electrode discharge portion 700 enters the low voltage electrode 7 from the cooling water inlet hole 9*a* of the inlet/outlet portion, cools the entire surfaces of the low voltage electrode discharge portion 700 and is drawn out to the cooling water outlet hole 9*b* of the inlet/outlet portion 710.

The combined passage structure of the ozone gas passage 8 and cooling water passage(s) 9 of the inlet/outlet portion 710 provided at the edge of one (1) side of the low voltage electrode 7 cooperates in the same way with the combined passage structure of the manifold blocks provided vertically adjacent in the inlet/outlet portion 710 to form the ozone gas passage 8 and cooling water passage(s) 9 extending in a straight line in the laminating direction, and the ozone gas passage 8 and cooling water passage(s) 9, formed so as to cooperate, are connected with the ozone gas outlet 11 and cooling water inlet/outlet 12 provided in the base 24.

Accordingly, in the present embodiment, by forming ozone gas passages 8 and cooling water passages 9 in the manifold blocks 23 and low voltage electrode(s) 7, conventionally used collecting means and piping members maybe done away with and it is possible to realize a simplified and compact ozonizer by eliminating the space for the means and piping members.

Also, in the present embodiment, in the low voltage electrode 7, airtight circulating spaces are constructed by adhering the four (4) metal plates subjected to convexoconcave (groove) processing of several mm in depth by means of etching or machining and the ozone gas passages 8 and cooling water passages 9 are formed so as to be separated in an air tight manner. Thus, the electrode 7 may be made thin and the apparatus may be small in size. Also, because piping for cooling water and ozone retrieval is unnecessary, assembly and disassembly may be simply performed and a low-cost ozonizer may be provided.

Moreover, in the present invention, although four (4) metal electrodes 7a, 7b are joined to manufacture the low voltage electrode 7, more than four (4) electrodes may be joined so that ozone gas passages 8 and cooling water passages 9 are formed therein.

Further, in the present invention, although the discharge regions 27a to 27f are provided between the low voltage electrode 7 and dielectric plate 5 and the ozone gas passage (s) 8 are formed inside the low voltage electrode 7, discharge regions may be provided between the high voltage electrode 3 and dielectric plate 5 and ozone gas passage(s) may be formed inside the high voltage electrode 3.

Moreover, in the present invention, the dielectric plate 5 which is necessary for silent discharge (dielectric barrier) is provided between the low voltage electrode 7 and the high voltage electrode 3, and spacers for forming the discharge regions 27a to 27f are disposed between the low voltage electrode 7 and dielectric plate 5. However, spacers may also be disposed between the high voltage electrode 3 and dielectric plate 5 to form the discharge regions 27a to 27f.

Figure 10:
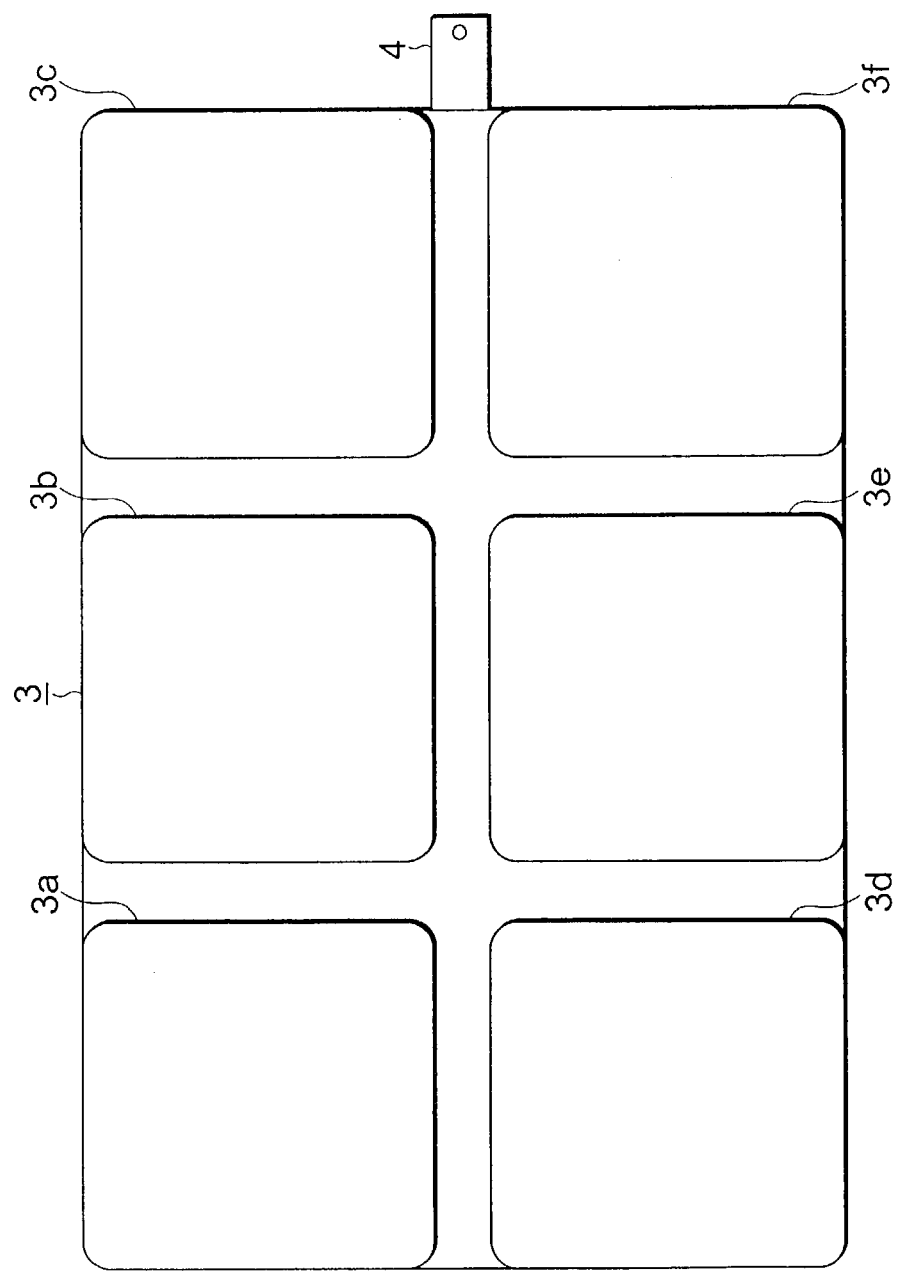
FIG. 10 is a top view of a high voltage electrode of the ozonizer of Embodiment 1 of the present invention.
Figure 11:
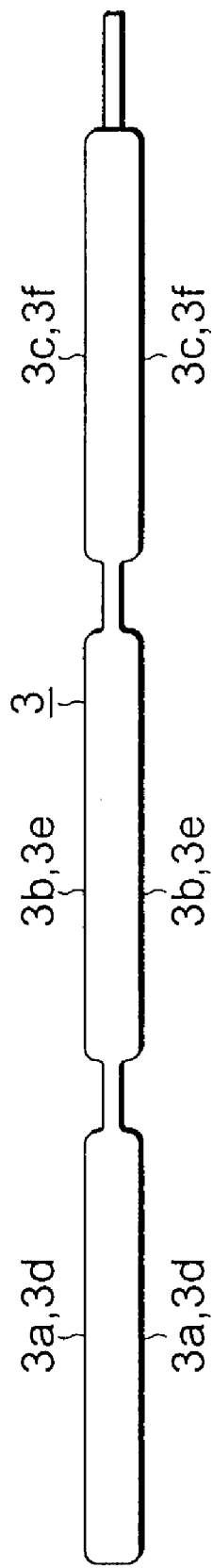
FIG. 11 is a front elevational view of the high voltage electrode of FIG. 10.
Figure 12:
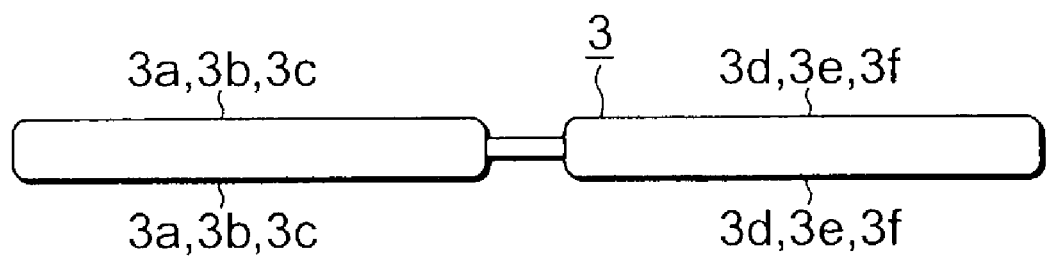
FIG. 12 is a side elevational view of the high voltage electrode of FIG. 10.

FIG. 10 is a top view of the high voltage electrode. FIG. 11 is a front elevational view of the high voltage electrode. FIG. 12 is a side elevational view of the high voltage electrode. The high voltage electrode 3 is made of an electrically conductive thin plate such as a stainless steel plate and the like and a portion thereof protrudes as a feed terminal 4. In the high voltage electrode 3, unnecessary portion are removed from a rectangular flat plate material by machining to form six (6) flat convex portions 3a to 3f at one side. That is, together, twelve (12) convex portions 3a to 3f formed at both surfaces. An electrode surface is formed on a flat portion of top surfaces of the convex portions 3a to 3f. The above six (6) discharge regions 27a to 27f are partly formed based on these six (6) convex portions 3a to 3f of the high voltage electrode 3.

Each of the convex portions 3a to 3f is formed as an approximately rectangular shape with four (4) rounded corners. Of these six (6) convex portions, the four (4) convex portions 3a, 3c, 3d and 3f are formed at the four corners (4) of the high voltage electrode 3 so as to conform with two (2) side edges. Of the other two (2) convex portions 3b, 3e, the convex portions 3b is is provided between the convex portions 3a and 3c. Also, the convex portions 3e is provided between the convex portions 3d and 3f. Adjacent convex portions are each separated by only a predetermined gap. This gap will be described below.

Main surfaces of each of the convex portions 3a to 3f are formed as similar flat surfaces and each is formed having a highly precise flatness. As can be understood from the front elevational view of FIG. 11 and the side elevational view of FIG. 12, outer peripheral portions of each convex portion 3a to 3f are chamfered so as to be formed as smooth circular arcs in cross section.

The feeder terminal 4 is provided at one (1) side edge of the rectangular shaped high voltage electrode 3. The feeder terminal 4 may also be formed by machining process (material removal) similar to the convex portions 3a to 3f. Moreover, it may also be formed by joining a plate member by means of welding, screwing and the like.

The above six (6) discharge regions 27a to 27f are formed in regions formed by the convex portions 3a to 3f. A ratio between a length of a longitudinal edge in the horizontal surface of the convex portions 3a to 3f and a length of an edge perpendicular thereto (referred to hereinafter as an aspect ratio in the horizontal surface) is approximately 1:1. That is, it is an approximate square shape. Accordingly, an aspect ratio of the above six (6) discharge regions 27a to 27f is also approximately 1:1. By providing ozone retrieving holes in centers of the 1:1 aspect ratio discharge regions, gas flow in a radial direction, with the ozone retrieving hole as the center, may be made uniform.

As a result of varying the aspect ratio of the discharge region and measuring ozone concentration and ozone generating efficiency, it was found that when the aspect ratio is within 1.5:1.0, there is not a large difference in distribution of a gas flow velocity V (or flow amount Q) in a longitudinal/horizontal direction of the horizontal surface when gas flows in, in a radial direction with the ozone retrieving hole as a center. Consequently, it was confirmed that it is possible to maintain an ozone concentration and ozone generating efficiency of 80% or more, and other conspicuous performance decrements where not observed. On the other hand, when the aspect ratio exceeds 1.5:1.0, ozone concentration and ozone generating efficiency is conspicuously lowered and the effect of increasing surface area is diminished.

Generally, when the discharge region is made as one (1) large area, there are large irregularities in discharge power density and ozone concentration and ozone generating efficiency are degraded. Here, a maximum allowable discharge area, which is a surface area of the discharge region, in which a predetermined ozone concentration and ozone generating efficiency can be obtained will be described. When the discharge region is smaller than this maximum allowable discharge area, ozone concentration and ozone generating efficiency are good, and, when the discharge region is larger than this maximum allowable discharge area, ozone concentration and ozone generating efficiency are extremely degraded and the apparatus cannot maintain a predetermined performance.

The maximum allowable discharge area can be many things depending on the shape (aspect ratio) of the discharge region. And in the case where the maximum allowable discharge area is the largest is when the ozone gas passage is in a central portion of the discharge region and the discharge region is a circular shape. When the discharge region is a circular shape, raw material raw enters from a periphery of the circumference and flows toward the ozone retrieving hole provided in the central portion, and flow of the raw material gas is uniform regardless of where it enters from the circumference.

In the case of a rectangular discharge region, even when the discharge area (region) is smaller than the maximum allowable discharge area, if the aspect ration becomes poor, gas flow into the discharge region in a radial direction with the ozone retrieving hole as a center becomes irregular and a discharge region gas temperature is increased at a far point in the gas flow and the ozone generating efficiency is degraded.

The maximum allowable discharge area can be discerned by the following formula. That is, when, the maximum allowable discharge area S0 [cm$^2$] is,
a discharge region gap length d [cm],
a discharge gas pressure P [MPa]

$$(P [MPa]=7500(0.1+P)[Torr]-p [Torr])$$

a discharge voltage Vp [V], (Moreover, a discharge waveform is an alternating current, and since the discharge voltage here represents a peak value of the alternating current waveform, Vp is used as a reference numeral.)
a discharge power density W [W/cm$^2$], $$S0=(A \times d \times P \times Vp)/W \qquad \text{(Formula 1)}$$

A: proportional constant

The maximum allowable discharge area maybe determined by the formula.

Here, A is a proportional constant determined by the shape (aspect ratio) of the discharge region, and, depending on the shape of the discharge region, varies in a range of from 10 to 30.

Regarding the discharge regions 27a to 27f of the present embodiment, the gap length of the discharge region is 0.01 [cm],
the discharge gas pressure is 0.25 [MPa
the discharge voltage is 5000 [V]
and the discharge power density is 1 [W/cm$^2$].

Here, supposing the proportional constant is 20, the maximum allowable discharge area S0 is, $$S0=(20 \times 0.01 \times 0.25 \times 5000)/1.0 = 250 \text{ cm}^2$$

Hence, it is determined to be 250 cm$^2$. In addition to keeping within this maximum allowable discharge area S0, based on the entire construction of the ozone apparatus, a surface area S of each single discharge region 27a to 27f of the present embodiment is 75 cm$^2$ (φ200). This surface area is set by setting a surface area S of each convex portion 3a to 3f of the high voltage electrode at 75 cm . Moreover, besides being based on the surface area S of the convex portions 3a to 3f, the surface area S of the discharge regions 27a to 27f is also related to a surface of the conductive film formed on the surface of the dielectric plate, described later in detail.

As described above, in the dielectric barrier discharge (silent discharge), generally there is a discharge, at the electrode surface, in which power density increases uniformly proportional to an increase in the discharge voltage.

However, in actuality, dimensional errors and the like when the discharge gap is formed cause a discharge(s) to start from portions of the gap of the discharge region which are smaller, and the power density becomes higher in these small gap portions. When the discharge region is made larger, a difference in the power density distribution at the electrode surface becomes larger and this causes ozone generating capability to degenerate. When the discharge region is made as one (1) large surface area, there is a large difference in discharge power densities between the central portion of the discharge region (generally, the portion in the discharge region where the gap is the smallest) and peripheral portions thereof. Also, when the discharge region is made as one (1) large surface area, the rectangular shape of the electrode causes the value of the aspect ratio to deviate largely from 1:1. These values of the discharge power density and aspect ratio which deviate from the ideal cause the ozone generating efficiency to be degraded and ozone concentration to be lowered.

In order to resolve this problem, in the present embodiment, the discharge region is divided into six (6) discharge region 27a to 27f. The six (6) convex portions 3a to 3f provided in the above high voltage electrode 3 correspond to these six (6) discharge region 27a to 27f. In the present embodiment, one (1) discharge region may be limited within the maximum allowable discharge area S0, and the aspect ratio of the optimum discharge region is maintained within a fixed value and, further, the location(s) of the ozone retrieving holes are dispersed.

In the above (Formula 1) for the maximum allowable discharge area S0, the discharge voltage Vp may be determined by the following formula. That is, when, a discharge voltage Vp
a discharge region gap length d [cm],
a discharge gas pressure p [Torr] the discharge voltage may be determined by the formula:

$$Vp = B \times p \times d \qquad \text{(Formula 2)}$$

B: proportional constant

Here, B is a proportional constant for converting to a discharge voltage value, and although the actual value is 188, this differs slightly depending on the discharge gas type and material of the electrode.

Here, when the discharge region gap length d [cm] and discharge gas pressure p [Torr] are written into the above (Formula 1)

$$S0=(A \times d \times P \times Vp)/W \qquad \text{(Formula 1)}$$

this becomes, $$\begin{aligned}
&= A \times d \times (p/7500 - 0.1) \times B \times p \times d / W & \text{(Formula 3)} \\
&= \{A \times B / 7500\ (p \times d)\ 2/W\} - \{A \times B \times (p \times d) \times d / W\} \\
&= \{0.5 \times (p \times d)\ 2/W\} - \{376.0 \times (p \times d) \times d / W\}
\end{aligned}$$

A smallest value, 0.001 cm, of the discharge region gap length d is determined by a machining working accuracy. Nevertheless, when the electrode surface is made to a processing error of ±10 μm or less, this becomes a factor for increasing the processing cost of the electrode. On the other hand, when the discharge region gap length d is 0.001 cm and the processing error of the electrode surface is made to ±10 μm or more, the precision of the discharge gap becomes ±10% or more and the irregularity of the discharge gap invites degradation of ozone performance.

Figure 13:
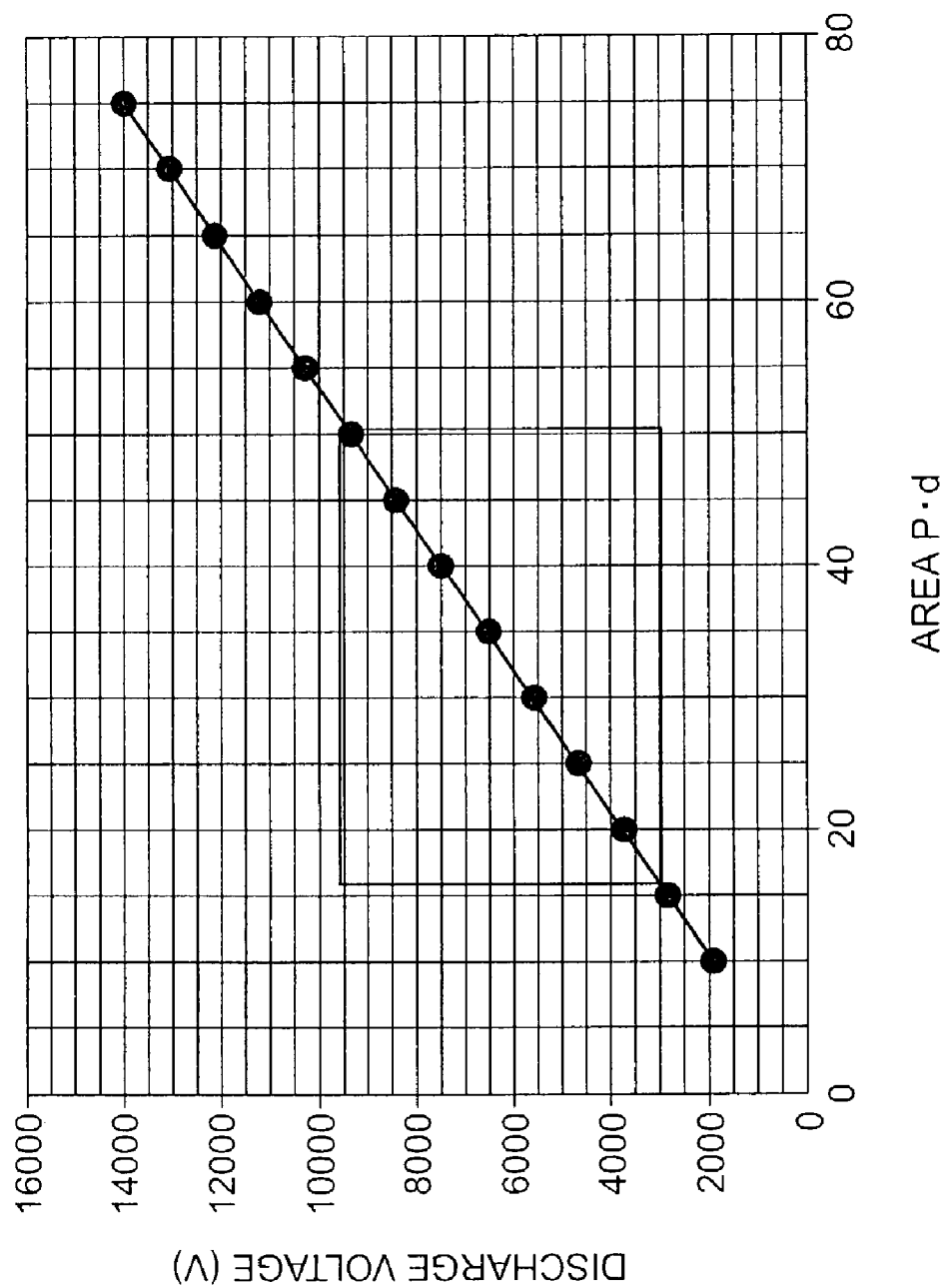
FIG. 13 is a characteristics diagram showing a relationship between an area p×d and a discharge voltage in Embodiment 1.
Figure 14:
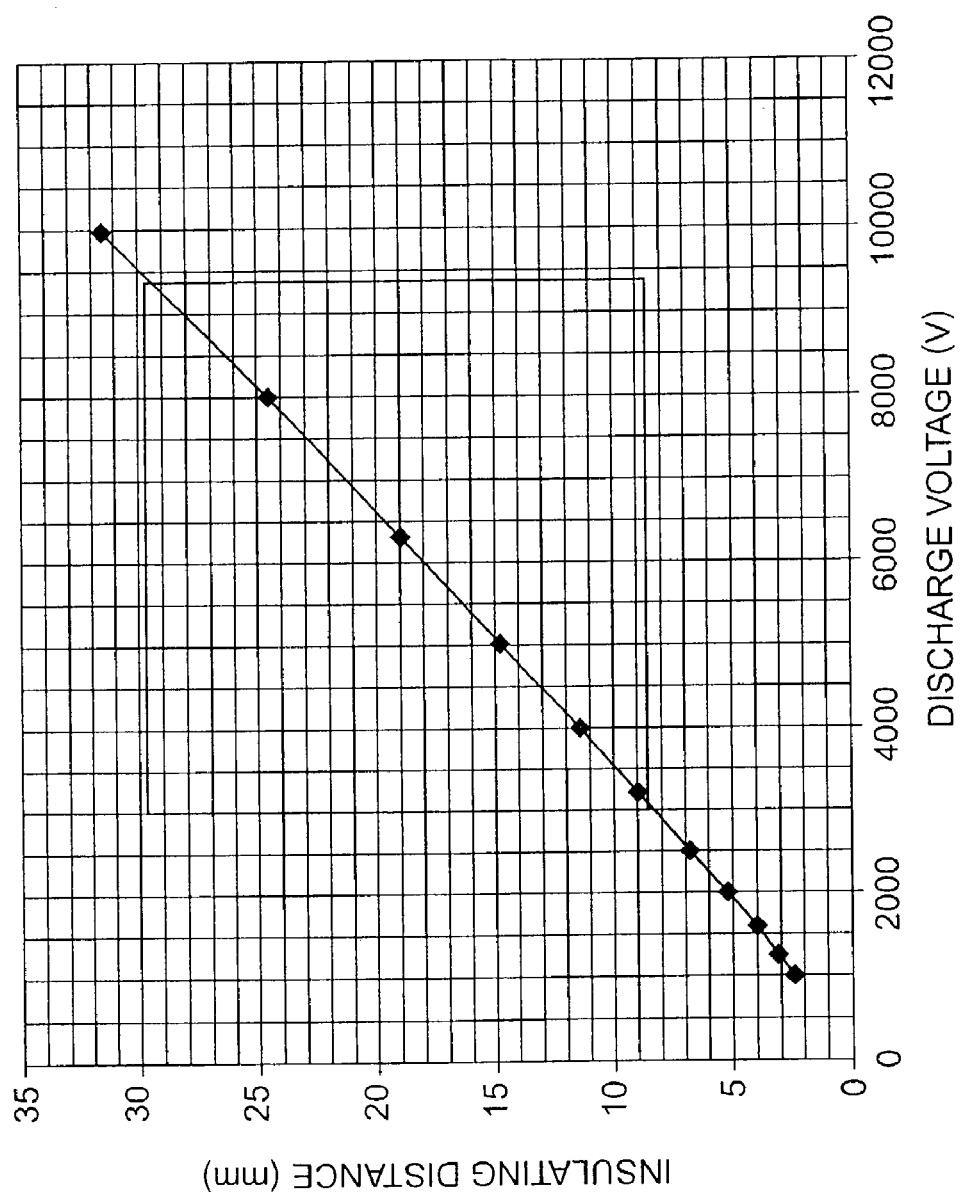
FIG. 14 is a characteristics diagram showing a relationship between a discharge voltage and an insulating distance of a high voltage in Embodiment 1.
Figure 15:
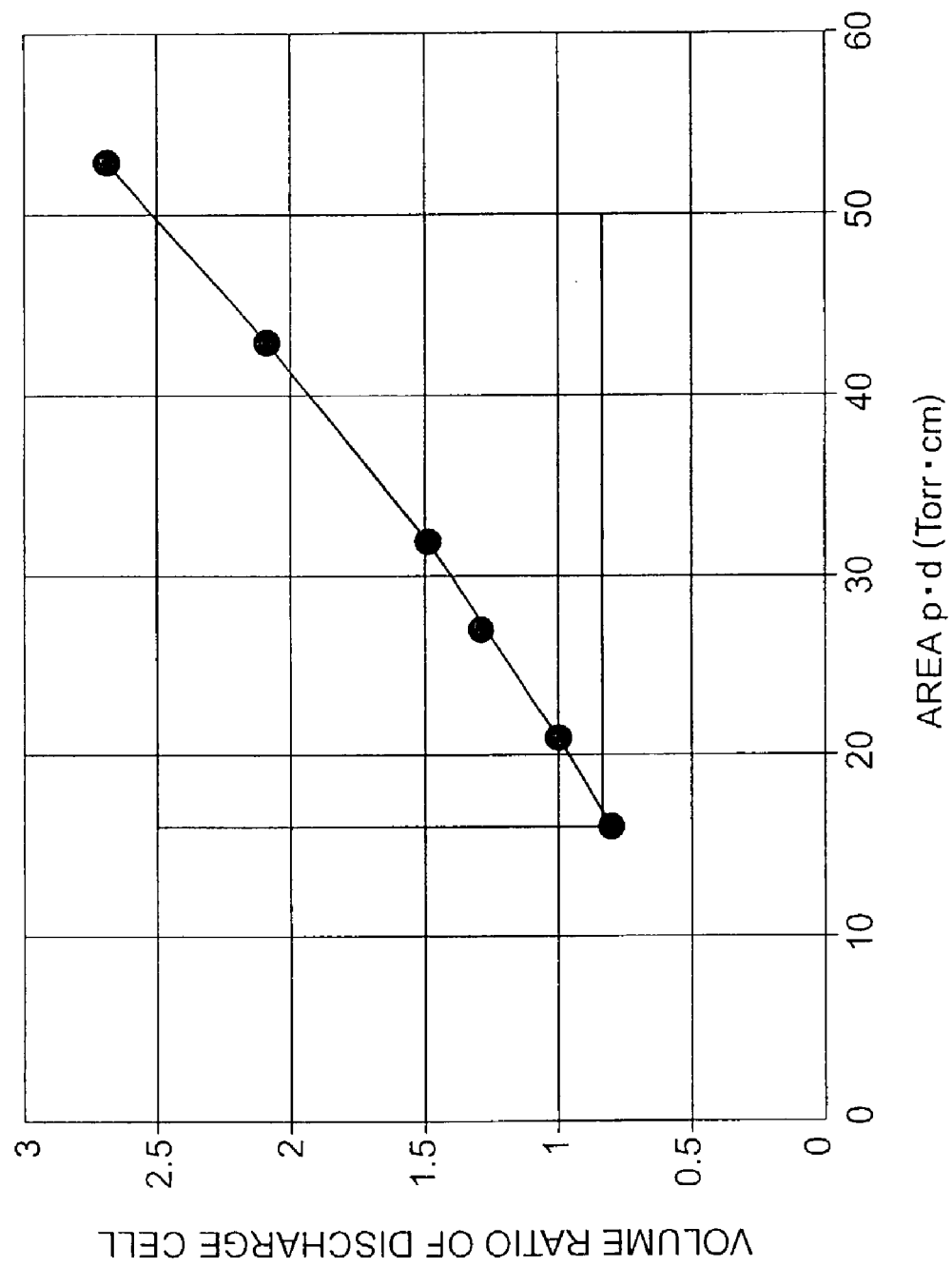
FIG. 15 is a characteristics diagram showing one (1) example of a relationship between an area p×d in a case where the value of the area p×d is varied and a volume ratio of a discharge cell in Embodiment 1.
Figure 16:
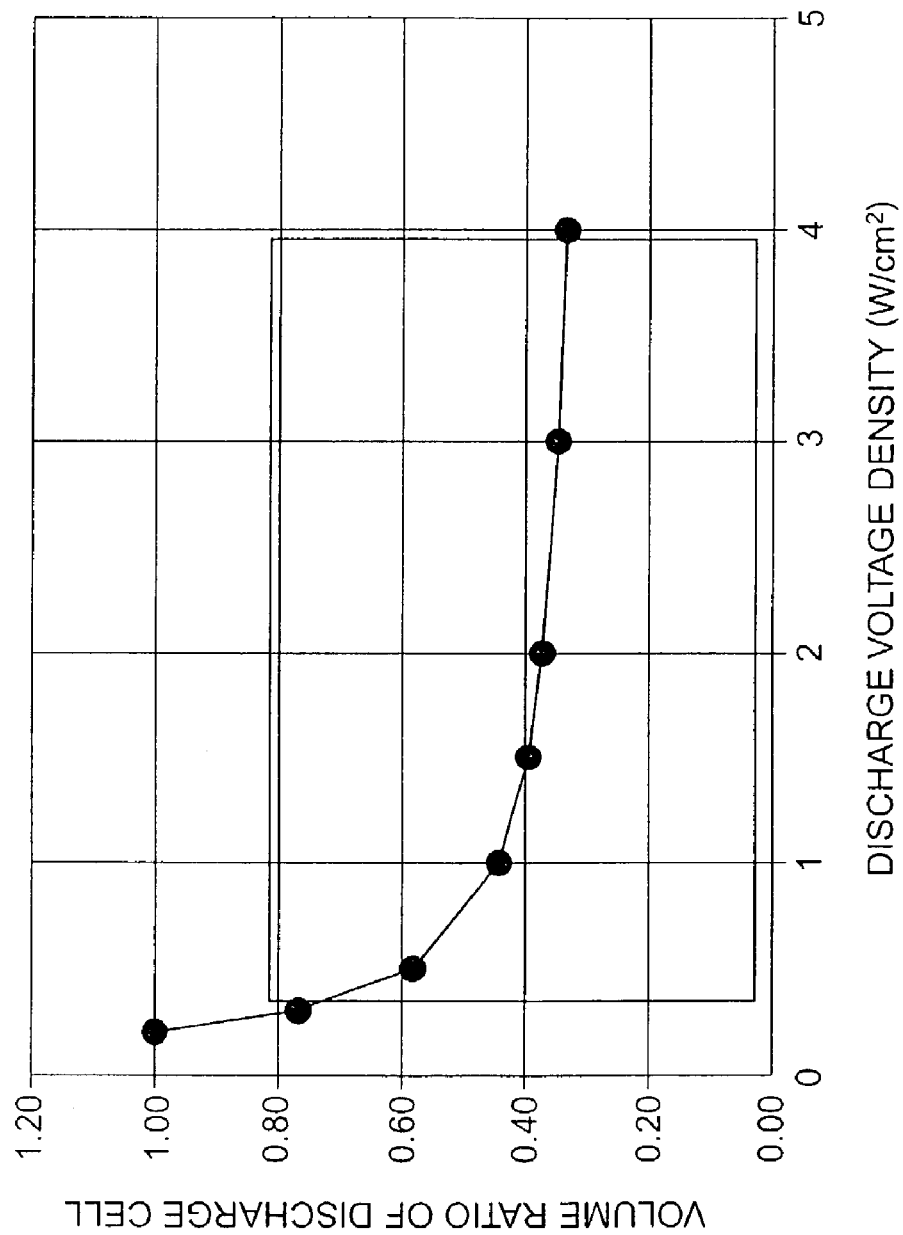
FIG. 16 is a characteristics diagram showing one (1) example of a relationship between a discharge voltage density in a case where the discharge voltage density is varied and a volume ratio of a discharge cell in Embodiment 1.

FIG. 13 is a characteristics diagram showing a relationship between an area p×d and a discharge voltage. Also, FIG. 14 is a characteristics diagram showing a relationship between a discharge voltage and an insulating distance of a high voltage. Furthermore, FIG. 15 is a characteristics diagram showing one (1) example of a relationship between an area p×d in a case where the value of the area p×d is varied and a volume ratio of a discharge cell. FIG. 16 is a characteristics diagram showing one (1) example of a relationship between a discharge voltage density, in a case where the discharge voltage density is varied, and a volume ratio of a discharge cell. Each diagram is based on data obtained from measurements of the actual apparatus or calculated from measured values, and the regions shown by the black rectangular outlines are regions of good efficiency.

An increase in the discharge region gap length d or increase in the discharge gas pressure p increases the value of the area p×d and, as shown in FIG. 13, the discharge voltage for generating ozone increases. Also, when the discharge voltage increases as shown in FIG. 14, a large insulating distance must be secured inside the apparatus. Thus, the volume of the ozone apparatus increases and a large power source is also required.

Also, FIG. 15 is a graph which is an approximate calculation, in a case where the value of the area p×d is varied and the discharge power density is constant, of a volume ratio of the discharge cell for ensuring the insulating distance. When the value of the area p×d is, for example, 20 Torr·cm to 50 Torr·cm, the volume ratio of the discharge cell is 2.5 times and the discharge voltage Vp is 9.5 kV or more. When it (the area p×d) is more, high voltage control and the constraints of regulating etc. a high pressure housing are encountered and these become factors for greatly increasing the manufacturing cost.

Moreover, FIG. 16 is a graph which is an approximate calculation of a volume ratio of the discharge cell in a case where the value of the area p×d is constant and the discharge power density is varied. When the discharge power density is 0.3 W/cm$^2$ to 4 W/cm$^2$, it possible to decrease the discharge cell volume ratio to approximately 0.3 times. Also, the discharge power density relies on the cooling performance of the electrode, and when the discharge is 4W/cm$^2$ or more, the gas temperature of the discharge portion rapidly increases, and it becomes difficult to maintain a predetermined ozone generating capacity because ozone generating performance quickly degenerates. As can be understood from FIG. 16, a range of 0.3 W/cm$^2$ to 4 W/cm$^2$ is most preferable for the apparatus in terms of efficiency.

In the ozonizer of the present embodiment, from the knowledge in the above actual apparatus, in consideration of the size, volume ratio and economy of the apparatus, the discharge region gap length d, discharge gas pressure p, both areas p×d and the discharge power density W are preferably selected from the region shown by the black rectangular outline in FIGS. 13 to 16, that is, selected from a range of the following Table 1.

TABLE 1

| | |
|---|---|
| discharge region gap length d | 0.001 to 0.06 [cm] |
| discharge gas pressure p | 0.1 to 0.4 [MPa] |
| | 1500 to 3750 [Torr] |
| area p × d | 15 to 50 [Torr × cm] |
| discharge power density W | 0.3 to 4 [W/cm$^2$] |

When the maximum allowable discharge area is calculated based on the above Formula 3 and Table 1 the following conditions can be derived.

| | |
|---|---|
| discharge region gap length d | 0.06 [cm] or less |
| area p × d | 50 [Torr × cm] or less |
| discharge power density W | 0.3 [W/cm$^2$] or more |

In this case the maximum allowable discharge area is, maximum allowable discharge are S0 3038 [cm$^2$] or less. When this was verified by experiment and, for example, the discharge region gap length d was 0.06 [cm] or less the area p×d was 50 [Torr×cm] or less the discharge power density W was 0.3 [W/cm$^2$] or more the maximum allowable discharge area S0 was 3000 [cm$^2$] or less, the ozone generating efficiency was 80%. On the other hand, when these conditions breakdown, it was observed that ozone concentration and ozone generating efficiency were conspicuously degraded. That is, it was confirmed that a surface area increase had little effect.

Figure 17:
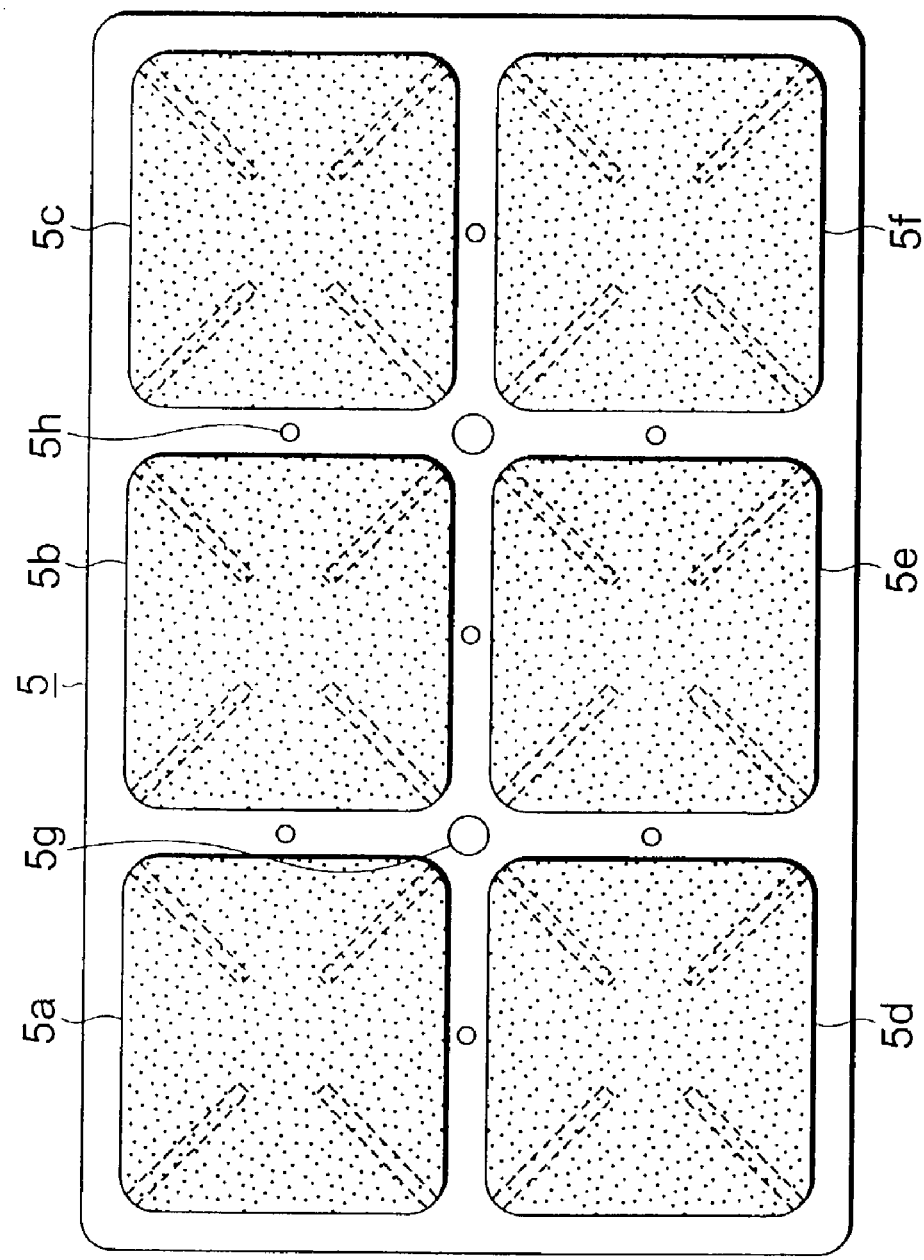
FIG. 17 is a top view of a dielectric plate of the ozonizer of Embodiment 1 of the present invention.
Figure 18:
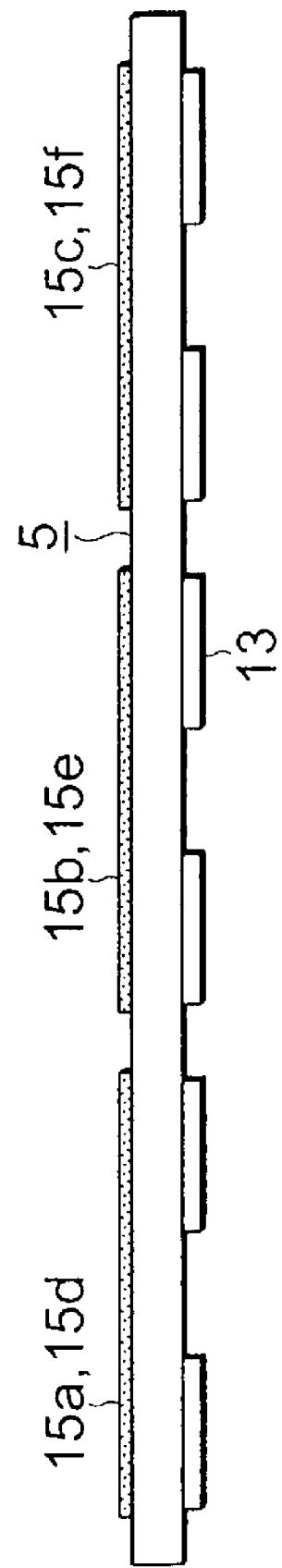
FIG. 18 is a front elevational view of the dielectric plate of FIG. 17.
Figure 19:
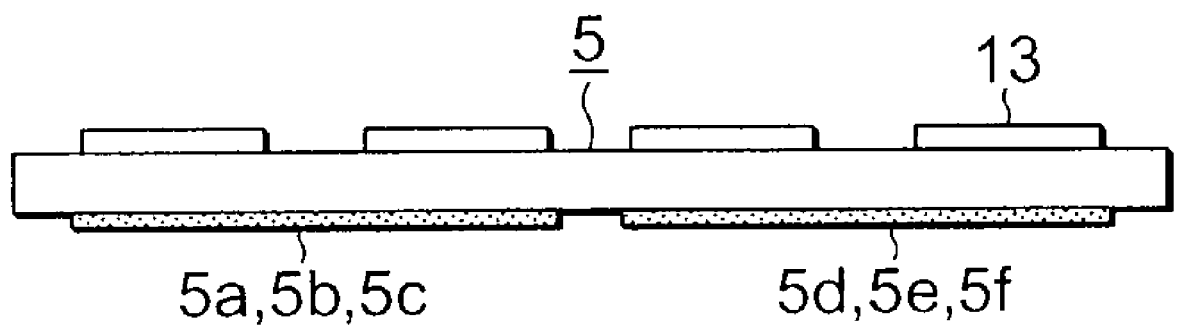
FIG. 19 is a side elevational view of the dielectric plate of FIG. 17.

FIG. 17 is a top view of the dielectric plate. FIG. 18 is a front elevational view of the dielectric plate. FIG. 19 is a side elevational view of the dielectric plate. The shape of the ozone generating apparatus is made rectangular in cross section so as to improve the large capacity of the ozonizer 100 and space factor of the apparatus. The dielectric plate 5 is manufactured of a glass or ceramic material and the like and, for the purpose of maintaining a large surface area, is formed as an approximately rectangular (rectangle) flat plate expanding of the entire region in horizontal section in the ozonizer cover 110, and is constructed so as to sandwich the high voltage electrode(s) from both sides.

The dielectric plate 5 forms a rectangular flat plate shape, and six (6) conductive films 5a to 5f are formed at a surface of side that contacts the high voltage electrode 3. Each conductive film 5a to 5f is formed as an approximately square shape with four (4) rounded corners. That is to say, Each conductive film 5a to 5f is made to an aspect ratio of approximately 1:1. Each conductive film 5a to 5f is provided at a location corresponding to respective convex portions 3a to 3f of the high voltage electrode and are formed in approximately the same shape as the convex portions 3a to 3f. Adjacent conductive films are each separated by only a predetermined gap. A main surface of each conductive film 5a to 5f is formed so as to exist on the same plane, and each is formed so as to have a high degree of flatness. Moreover, small and large raw material gas equalizing supply holes 5g, 5h for supplying raw material gas, so as to flow uniformly, to each discharge region 27a to 27f are bored between adjacent conductive films.

The size of these conductive films 5a to 5f relates to the size of the above six (6) discharge regions 27a to 27f. That is, the size of the above six (6) discharge regions 27a to 27f is determined by the size of the convex portions 3a to 3f of the high voltage electrode 3 and the size of the conductive films 5a to 5f.

Accordingly, the conductive films 5a to 5f are formed on the surface of the dielectric plate 5. The dielectric plate 5 and high voltage electrode 3 contact through these conductive films 5a to 5f. That is to say, the convex portions 3a to 3f of the high voltage electrode 3 contact with the conductive films 5a to 5f of the dielectric plate 5. In such a construction, even if there is bad contact in a portion between surfaces of the conductive films 5a to 5f and surfaces of the convex portions 3a to 3f of the high voltage electrode 3, the conductive films 5a to 5f and the high voltage electrode 3 have the same electric potential and there is no irregular discharge resulting from the bad contact, and the efficiency of the ozonizer 100 is prevented from being degraded and the life of the ozone generating apparatus is increased.

Spacers 13 for forming the discharge regions 27a to 27f are provided at the surface of the dielectric plate 5 where the conductive films 5a to 5f are formed and the surface on the opposite side, that is, the low voltage electrode 7-side (discharge region-side) of the dielectric plate. The spacers 13 form an extremely thin space of a 1:1 aspect ratio. In the present embodiment, the spacers 13 are long thin rods or discs of a 0.1 mm thickness. The spacers 13 are formed by, for example, machining the plate shaped dielectric plate to shave peripheries so as to shave convex shapes, relatively. Accordingly, because the dielectric plate 5 and the spacers 13 are integrally cut from one (1) material, compared to the procedure where the spacers 13 are formed separately and joined, parts for a single may be eliminated and the number of parts may be reduce, also, a process for positioning the spacers 13 becomes unnecessary and assembly of the ozonizer is facilitated.

As above, the two dielectric plates 5, the conductive films 5a to 5f being formed at a surface of one side thereof and the spacers 13 being provided at the other side, are disposed at either side of the high voltage electrode 3, both sides thereof each being formed with the six (6) convex portions 3a to 3f, so as to sandwich the high voltage electrode 3 and contact the conductive films 5a to 5f with respective convex portions 3a to 3f, and low voltage electrodes 7 are provided at respective surfaces thereof. The six (6) discharge regions 27a to 27f are formed by the spacers 13 between the dielectric plate 5 and the low voltage electrode 7. In this way, the stacked high voltage electrode 3, low voltage electrode 7, dielectric plates 5 and spacers 13 construct the electrode module 102. The electrode modules are laminated in plurality, meanwhile, respective manifold blocks 23 are disposed in between vertically in the inlet/outlet portion 710 of the low voltage electrode, and all of this is fastened to the base 24 by a predetermined pressure by means of the fastening bolts 21a, 21b.

Next, operation will be explained. A silent (dielectric barrier) discharge occurs in the discharge regions 27a to 27f when an alternating high voltage is applied to the high voltage electrode 3 and low voltage electrode 7. When a gas containing oxygen (raw material gas) is passed through the discharge regions 27a to 27f at this time, the oxygen is converted into ozone gas. The raw material gas filled in the ozonizer cover 110 enters from the entire periphery of each discharge region 27a to 27f towards respective centers thereof as shown by the broken arrows in FIG. 2. Oxygen gas passes through the discharge regions 27a to 27f formed between the low voltage electrode 7 and high voltage electrode 3 and is converted into ozone. In the present embodiment, the dielectric plates 5, high voltage electrode 3 and discharge regions 27a to 27f formed there-between are each formed in an approximate square shape. The oxygen gas flows from the entire periphery of the squares toward the center and becomes ozone gas (oxygen gas subjected to ozonization) in the discharge regions 27a to 27f.

In order to generate ozone gas efficiently, it is necessary that the precision of discharge regions 27a to 27f, which are spaces of an extremely thin thickness, be well maintained. In the electrode module(s) 102 laminate, a predetermined air-gap(s) is obtained by disposing the manifold blocks 23 at one side and fastening the modules between the electrode presser plate 22 and base 24 by means of a plurality of fastening bolts 21a, 21b passing through in the laminating direction.

The discharge regions 27a to 27f are formed by the discharge region forming spacers 13 disposed at the surface of the low voltage electrode 7. That is, the thickness (height in the laminating direction) of the discharge regions 27a to 27f is set by these discharge region forming spacers 13. By processing the discharge region forming spacers 13 to a uniform height and fastening each electrode module 102 by a predetermined force by means of fastening bolts 21a, 21b, precision of the discharge regions 27a to 27f is maintained.

A method for lowering the temperature in the discharge regions 27a to 27f may be given as one more means for efficiently generating ozone. The high voltage electrode 3 and low voltage electrode 7 are provided electrodes. And a method is conceived where both of these electrodes are cooled with water or gas. Although between water and gas, water has a large cooling effect, when water is used, it is necessary to decrease the electrical conductivity of the cooling water (use ion exchanged water and the like) because a high voltage is applied to the high voltage electrode 3. On the other hand, although there is no such necessity when gas is used, there are shortcomings such as the structure becomes complicated, it is noisy, and the heat capacity of the coolant is small.

In the present embodiment, the discharge regions 27a to 27b are formed abutting the low voltage electrode 7, and the discharge regions 27a to 27b are cooled by providing cooling water passages 9 in the low voltage electrode(s) 7. Also, the cooling water passages 9 are provided in the low voltage electrode 7 to cool the high voltage electrode(s) 3, and this provides a structure for venting heat of the high voltage electrode. The heat generated by the high voltage electrode is cooled with cooling water by means of the low voltage electrode 7 which is made into a heat sink. Thus, by concurrently cooling the discharge regions 27a to 27b and the high voltage electrode(s) 3, a low temperature gas temperature may be maintained in the discharge regions 27a to 27b.

In the present embodiment, the gas temperature in he discharge regions 27a to 27b is lowered by flowing water in the low voltage electrode(s) 7. Generated ozone gas passes through ozone gas passages 8 in the low voltage electrode 7, passes the side portion of the low voltage electrode 7, passes through the ozone gas passage 8 formed in the laminated inlet/outlet portion 710 and manifold blocks 23, and reaches the ozone outlet 11 provided in the base 24.

On the other hand, the cooling water as a coolant, enters in the ozonizer 100 from a cooling water inlet 12 provided in the base 24, passes through the cooling water passage 9 formed in the laminated inlet/outlet portion 710 and manifold blocks 23, enters the low voltage electrode 7 from the cooling water inlet 9a in the inlet/outlet portion 710, and, after circuiting around the entire surface of the low voltage electrode discharge portion 700, passes through the cooling water passage 9 formed in the laminated inlet/outlet portion 710 and manifold blocks 23 via the cooling water outlet 9b of the inlet/outlet portion, and exits outside from the cooling water outlet provided in the base 24.

In the present embodiment, because the structure is such that the high voltage electrode 3 may be cooled by the low voltage electrode 7, it is not necessary to lower the electrical conductivity of the cooling water flowing in the low voltage electrode 7, and common tap water may be used. Thus, the cost of the cooing water may be reduced.

Accordingly, in the present embodiment, the cooling efficiency of the discharge regions 27a to 27f is improved, and the temperature of discharge regions 27a to 27f may be preferably lowered. Hence, it is possible to increase the discharge power density without lowering the ozone generating efficiency, and size and cost reductions are possible in an apparatus which may have a fewer number of electrode modules. Furthermore, because the high voltage electrode 3 is cooled via the low voltage electrode 7, it is not necessary to use ion exchanged water and the like of a low electrical conductivity as the cooling water, and common tap water may be used as the cooling water. Thus, an electrical conductivity monitoring apparatus and ion exchanged water recycling equipment and the like are unnecessary, and since the number of component parts in the apparatus may be reduced, the cost and maintenance costs may be lowered.

In the present embodiment, in order to increase the ozone generating capacity (capacity) of the ozonizer 100, the discharge surface area of one (1) electrode module 102 is increased and the electrode modules 102 are further laminated in a plurality of layers to realize a large capacity. Moreover, from the point of view of improving the space factor of the ozonizer 100, an individual electrode module 102 is formed as a rectangular shape.

Corresponding to the increase in surface area in one (1) electrode module 102, the surface area of the discharge region also simply becomes larger and when the entire surface of the electrode module 102 is formed as a discharge region, there is a large difference in discharge power density between the central portion and peripheral portions. Moreover, when the discharge region becomes large there problems such as the raw material gas cannot be flowed uniformly at the discharge surface.

When the problems of irregularities in the discharge power density and nonuniform flow of the raw material gas occur, the ozone concentration is lowered and the ozone generating efficiency becomes poor. Furthermore, when the electrodes are made as flat rectangular plates to improve the space factor of the ozonizer 100, because the discharge regions also become rectangular, the aspect ratio deviates largely from 1:1. And since gas flow distribution in the discharge regions is further degraded, the ozone concentration is further lowered and the ozone generating efficiency is further degraded.

In the present embodiment, the electrodes are made rectangular, and although the discharge region for one (1) electrode is large, this large discharge region is divided into six (6) small discharge regions 27a to 27b by forming the six (6) convex portions 3a to 3b in the high voltage electrode 3, and the ozone retrieving holes 28a to 28b are provided in the main surface of the low voltage electrode 7 at locations which are approximate centers of each discharge region 27a to 27b.

In accordance with such a structure, since discharge occurs only in the discharge regions which are portions that are opposed to the six (6) convex portions 3a to 3f in the high voltage electrode 3, the problems with the aspect ratio of one (1) discharge region and the increase in the discharge region may be resolved. The raw material gas is supplied from the entire periphery of the discharge regions 27a to 27f and is retrieved from the ozone retrieving holes 28a to 28f provided in central portions of discharge regions in the low voltage electrode 7. Hence, the raw material gas may be approximately uniformly flowed at each discharge region.

The ozone gas generated by a single electrode module 102 may be collected in and retrieved from the ozone gas passage passing through in the inlet/out portion 710 of the low voltage electrode 7 in the laminating direction. Moreover, the cooling water as a coolant for cooling the low voltage electrode 7 is supplied from the cooling water inlet 9a provided in the inlet/outlet portion 710 and, after circulating inside the low voltage electrode 7 to cool the low voltage electrode 7, returns to the cooling water outlet provided in the inlet/outlet portion 710.

In the present embodiment, there is a distance of approximately 3 mm between adjacent convex portions 3a to 3f of the high voltage electrode 3 in order to divide the discharge region into six (6) discharge regions 27a to 27f. Moreover, there is also distance of approximately 3 mm between adjacent conductive films 5a to 5f of the dielectric 5. However, when experiments were done using various distances, it was understood that a distance of 1.5 mm or more is sufficient. On the other hand, when the distance is 1.5 mm or less, irregular discharges occur in the space between adjacent discharge regions 27a to 27f. These irregular discharges cause defects such as damage to the electrode or degradation of the ozone generating efficiency and the like.

In the present embodiment, ozone gas is retrieved from the inlet/outlet portion 710, provided at an end of the low voltage electrode, via the ozone gas passage 8, provided in the low voltage electrode 7, from each discharge region 27a to 27f. Thus, the ozone gas generated in the discharge regions 27a to 27f may be retrieved as is and there is no need to construct separate ozone gas and raw material gas portions as in a conventional apparatus, the phenomena in the conventional apparatus in which raw material gas is mixed in the ozone gas to lower the derived ozone concentration (gas short pass) may be prevented, and highly concentrated ozone gas may be derived.

Also, the low voltage electrode 7 as the first electrode includes the rectangular flat plate shaped electrode discharge portion 700, in which the main surface(s) forms an electrode in which and the ozone gas passage 8 and the cooling water passage 9 as a coolant passage are formed, and the inlet/outlet portion 710 formed with the ozone retrieval opening 8a and the cooling water inlet 9a and cooling water outlet 9b of the cooling water passage 9 and provided at either side edge of the electrode discharge portion 700. Therefore, the piping for ozone retrieval and the piping for cooling water supply and discharge may be simplified.

Moreover, in the present embodiment, the electrode module 102 including the flat plate first electrode 7, the flat plate second electrode 3 facing a main surface of the first electrode 7, flat dielectric plate(s) 5 provided between the first electrode 7 and the second electrode 3 and the spacers 13 for forming the discharge region(s), is laminated in plurality. An alternating voltage is applied between the first electrode 7 and the second electrode 3 and a discharge(s) occur in the discharge regions, which are filled with raw material gas, to generate ozone. In the first electrode 7, the ozone gas passage 8 for retrieving the ozone gas generated in the discharge regions is formed between the electrode surface facing the discharge regions and the side portion. The plurality of ozone gas passages are distributed in the discharge regions of the first electrode in order to make the flow velocity distribution in the radial direction(s), with the ozone gas passage 8 as the center, approximately uniform. This plurality of ozone passages 8 collects and retrieves ozone gas generated in each discharge zone in the first electrode 7. Thus, the discharge region may be increased without impairing the ozone generating performance, the discharge region relative to one (1) electrode surface may be increased without impairing ozone generating performance and the apparatus may have high reliability, construction of the laminated structure of the modules is facilitated and piping for ozone retrieval may be simplified.

Furthermore, the discharge region is divided into a plurality (of regions) between the first electrode 7 and the second electrode 3 corresponding to the plurality of ozone gas passages 8 for making the flow velocity distribution in the radial direction(s), with the ozone gas passage 8 as the center, approximately uniform. Hence, the discharge region may be further increased without impairing the ozone generating performance, the discharge region relative to one (1) electrode surface may be increased without impairing ozone generating performance and the apparatus may have high reliability, a high level of precision for the flat electrode surface may be maintained, construction of the laminated structure of the modules is facilitated and piping for ozone retrieval may be simplified.

Embodiment 2

Figure 20:
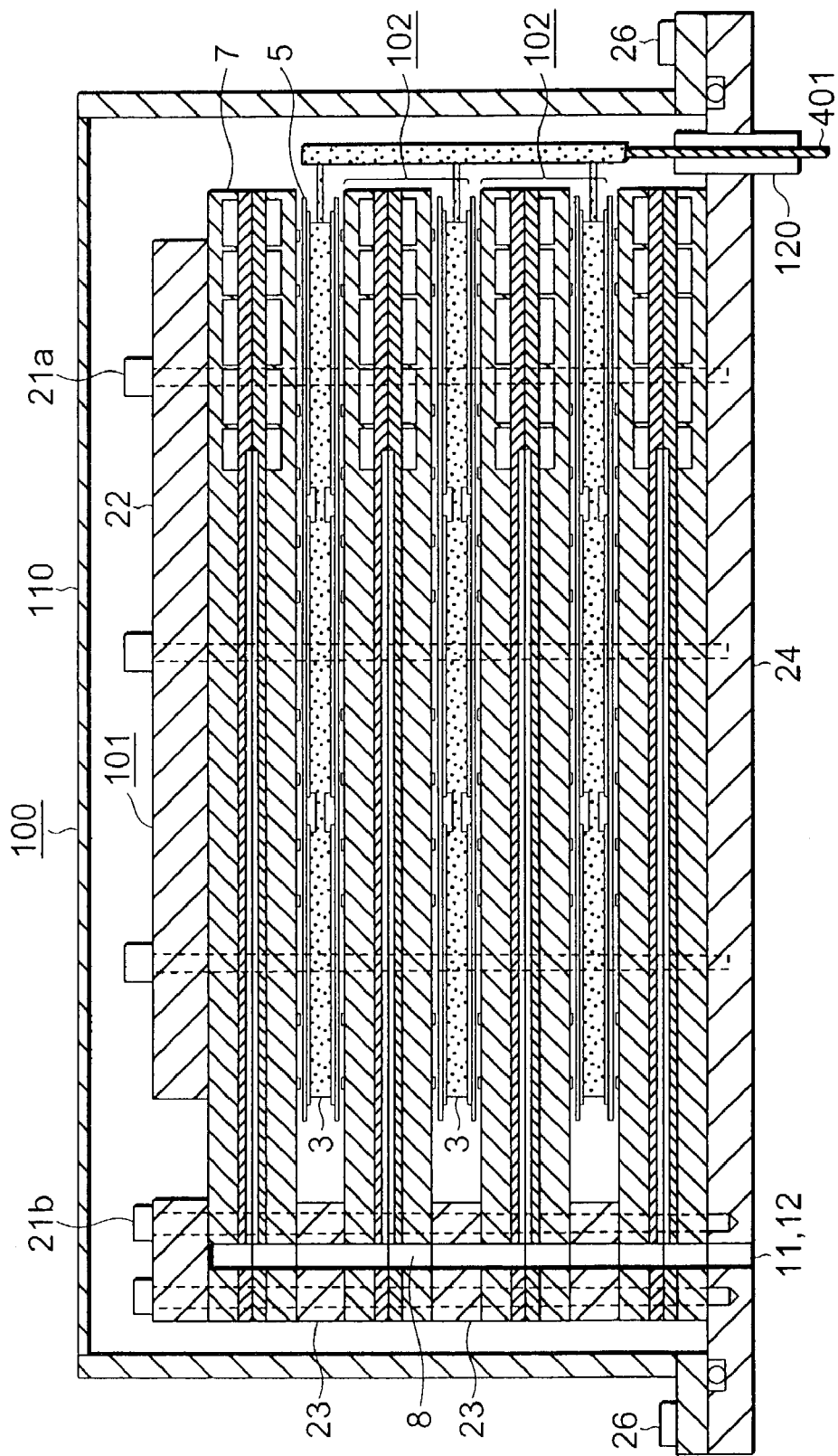
FIG. 20 is a schematic sectional view of a flat plate laminate ozone generating apparatus including an ozonizer of Embodiment 2 of the present invention.
Figure 21:
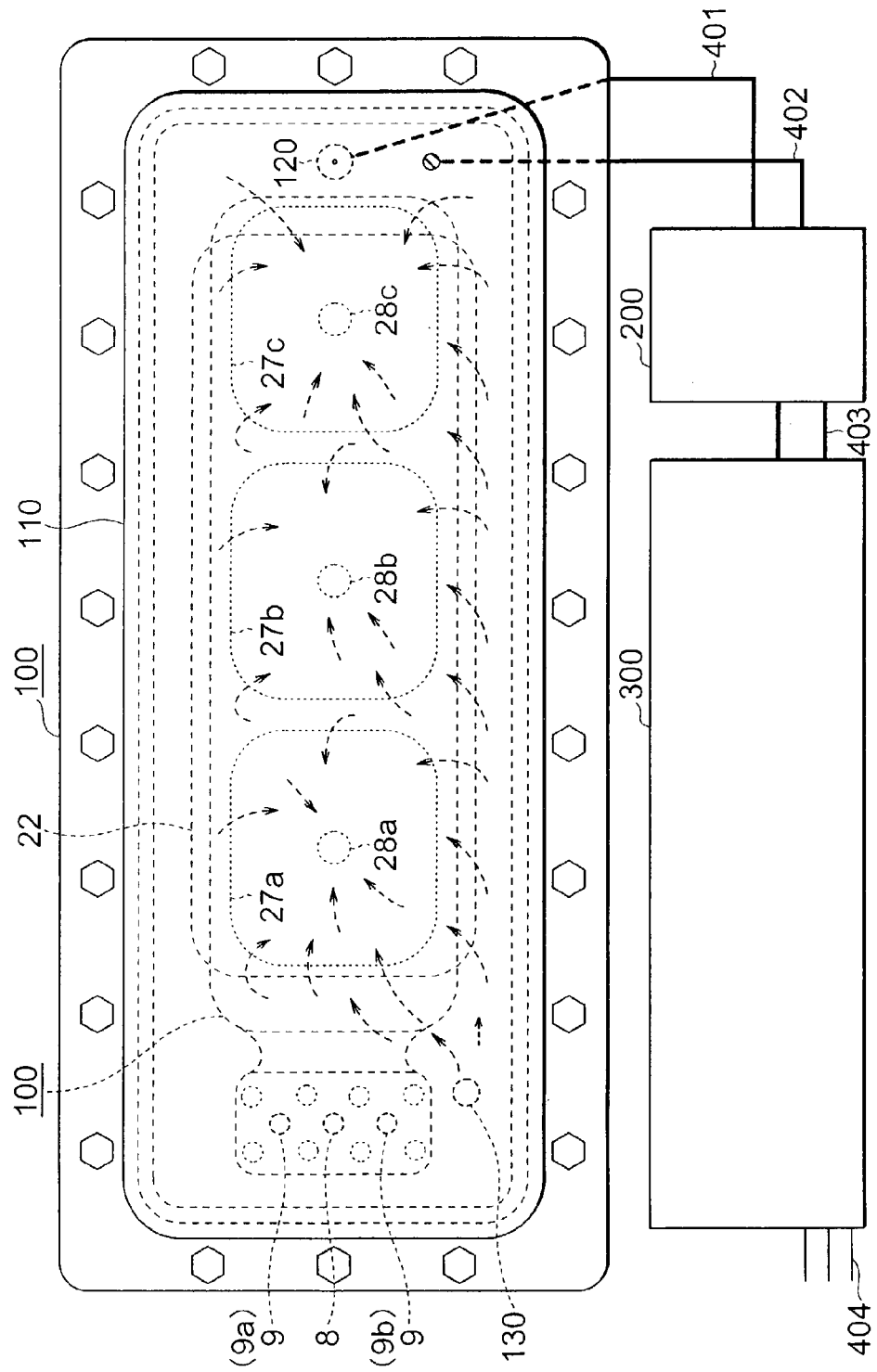
FIG. 21 is a drawing of the flat plate laminate ozone generating apparatus of FIG. 20 as viewed from above.

FIG. 20 is a schematic sectional view of a flat plate laminate ozone generating apparatus, including an ozonizer, of the present invention. FIG. 21 is a drawing of the flat plate laminate ozone generating apparatus of FIG. 20 as viewed from above. In the present embodiment, an outer shape of the ozonizer 100 is made rectangular in cross section in order to improve the space factor of the ozone generating apparatus and aim for a large capacity. In the present embodiment, the ozone transformer 200 for supplying power to the ozonizer 100 and the high frequency wave inverter 300 are disposed parallel to the ozonizer 100. Thus, the ozonizer 100 is made as a long, thin rectangular shape. Along with this, the high voltage electrode 3, low voltage electrode 7 and dielectric plate(s) 5, housed inside thereof, are made in more slender rectangular shapes than in Embodiment 1. Hence, a discharge region formed in the high voltage electrode 3 and low voltage electrode 7 is divided into three (3) discharge regions 27a to 27c. And together with this, three (3) convex portions are provided in the high voltage electrode 3 and three (3) conductive films are provided in the dielectric plate 5.

Other constructions are similar to Embodiment 1

Figure 22:
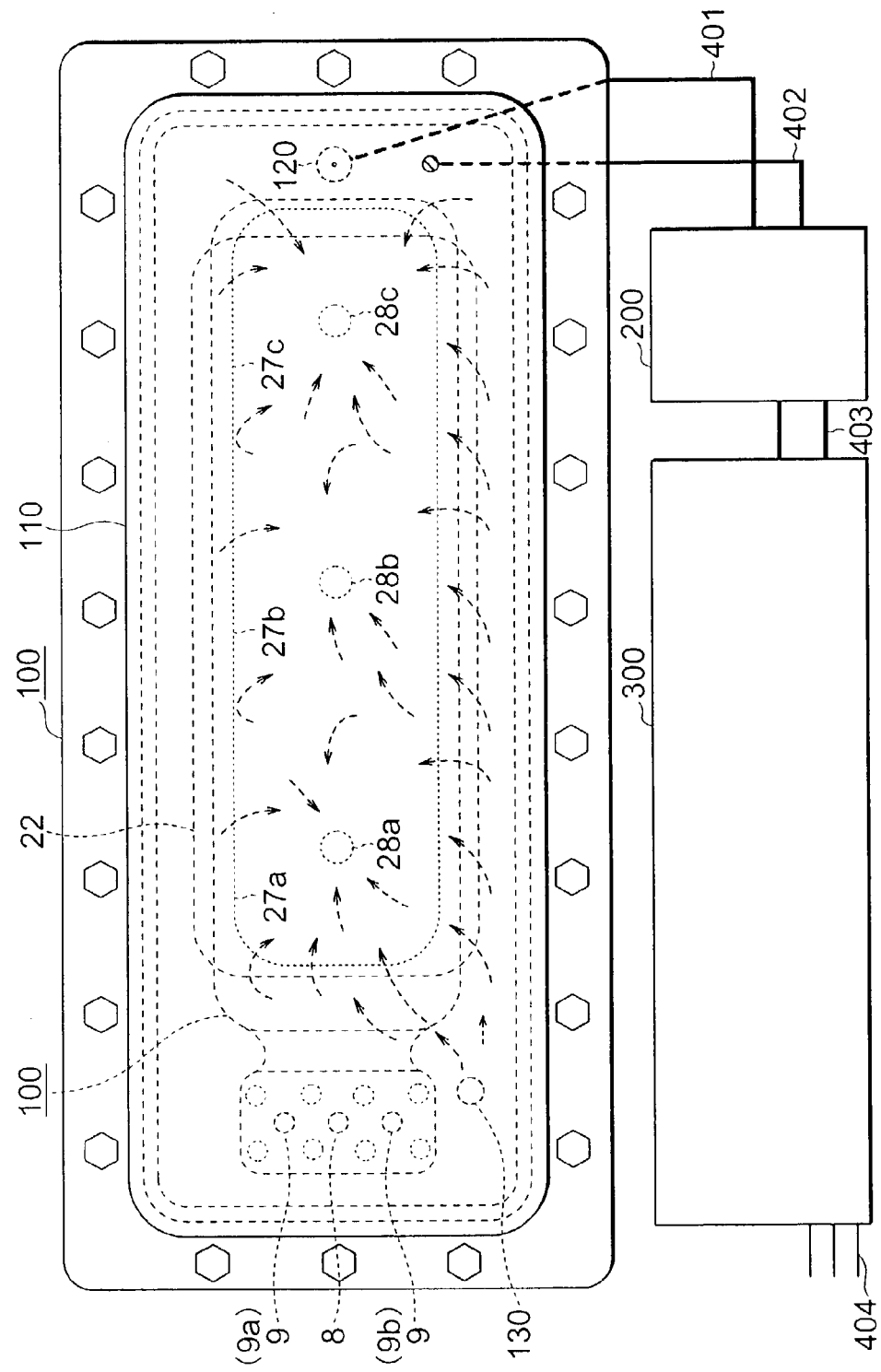
FIG. 22 is a drawing, showing another example of a flat plate laminate ozone generating apparatus including an ozonizer of Embodiment 2 of the present invention, of the flat plate laminate ozone generating apparatus of FIG. 20 as viewed from above.
Figure 27:
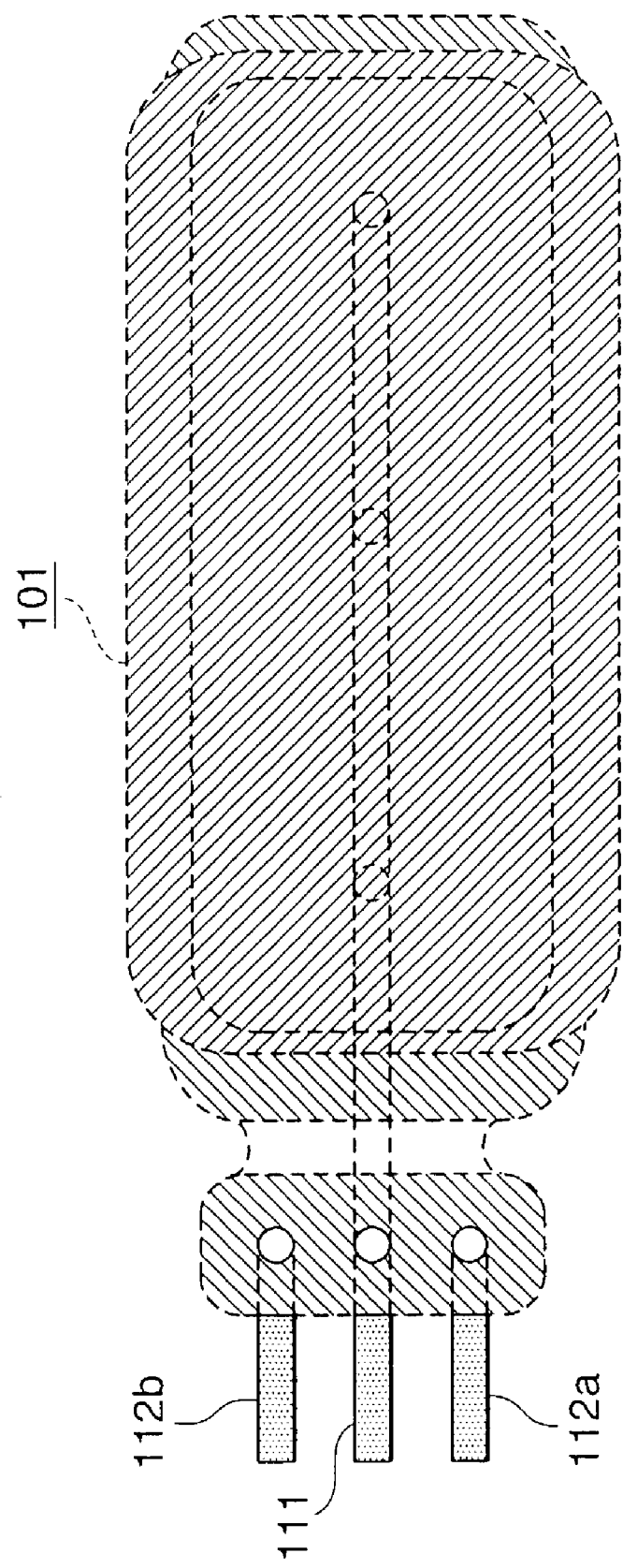
FIG. 27 is a plan view of the ozonizer module of the flat plate laminate ozone generating apparatus of FIG. 23.

Moreover, although a structural drawing of the low voltage electrode of the ozone generating apparatus of FIGS. 21, 22, 27 is omitted, flow of the cooling water is basically similar to that in FIG. 5. Also, as for ozone retrieving holes, although in FIG. 5 the construction is such that the passage branches in the low voltage electrode 7 and the ozone retrieving holes 28a to 28f are provided at ends thereof, the ozone retrieving holes of the low voltage electrode of the ozone generating apparatus of FIGS. 21, 22, 27 are provided along a center line of the low voltage electrode, and a structure is such that one (1) passage is provided on the center line of the low voltage electrode. Although three (holes) are is provided on the center line of the low voltage electrode of the ozone generating apparatus of FIGS. 21, 22, 27, it is not absolutely necessary that (the holes) be provided on the centerline and, for example, they may disposed separated in zigzag fashion above the centerline.

The discharge region of the present embodiment is a more slender rectangular shape than that in Embodiment 1, and is divided into three (3) discharge regions 27a to 27c. However, an aspect ratio of the three (3) discharge regions 27a to 27c is made approximately 1:1, similar to Embodiment 1. Thus, it is possible to prevent degradation of the ozone generating efficiency and lowering of the ozone concentration may be prevented.

FIG. 22 is a drawing, showing another example of the flat plate laminate ozone generating apparatus of FIG. 20 as viewed from above. Although the apparatus shown in FIG. 21 is divided into the three (3) discharge regions 27a to 27c, in a case where the discharge region is long and thin and ozone retrieving holes 28a to 28c are formed in a row, by only providing the ozone retrieving holes 28a to 28c at centers of regions, equally separating them, so as to give the discharge regions an aspect ratio of approximately 1 without (actually) dividing the discharge region, as shown in FIG. 22., it is possible to make the flow velocity distribution of ozone gas in radial direction(s), with the zone retrieving holes 28a to 28c as centers, approximately uniform. Performance may be obtained which can bear comparison with the apparatus of FIG. 21.

Embodiment 3

Figure 23:
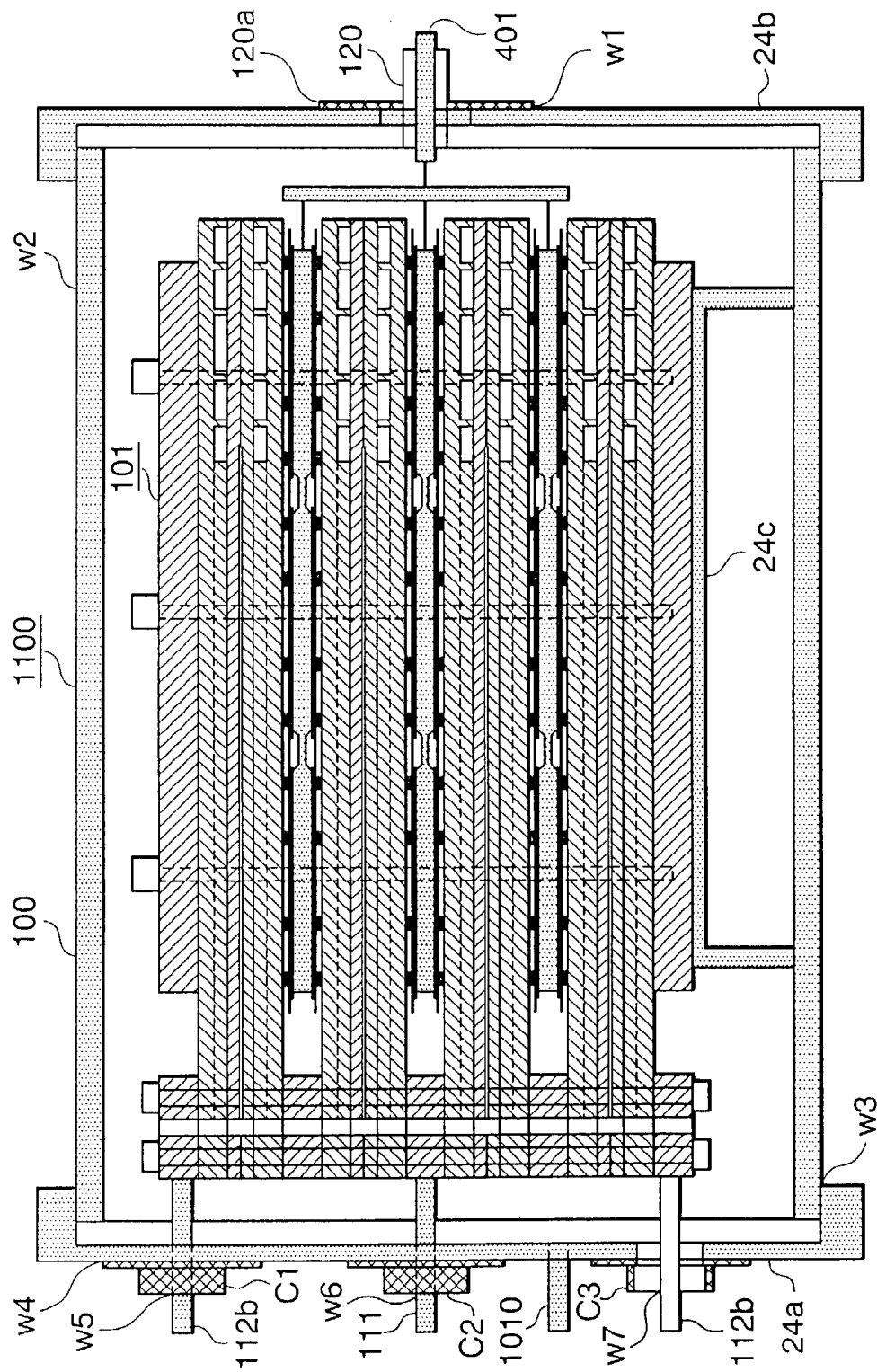
FIG. 23 is a front sectional view of a flat plate laminate ozone generating apparatus including an ozonizer of Embodiment 3 of the present invention.
Figure 24:
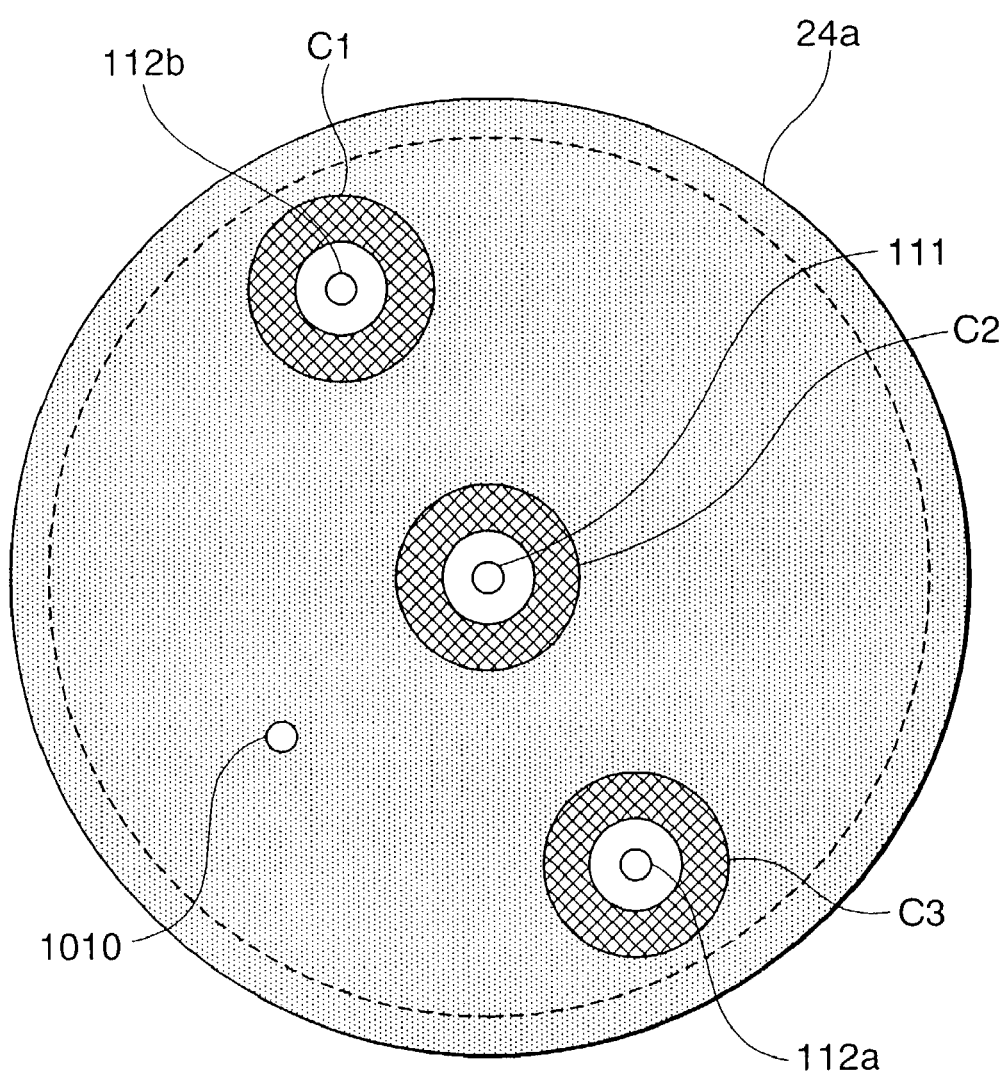
FIG. 24 is a side elevational view of a gas inlet/outlet-side of the flat plate laminate ozone generating apparatus of FIG. 23.
Figure 25:
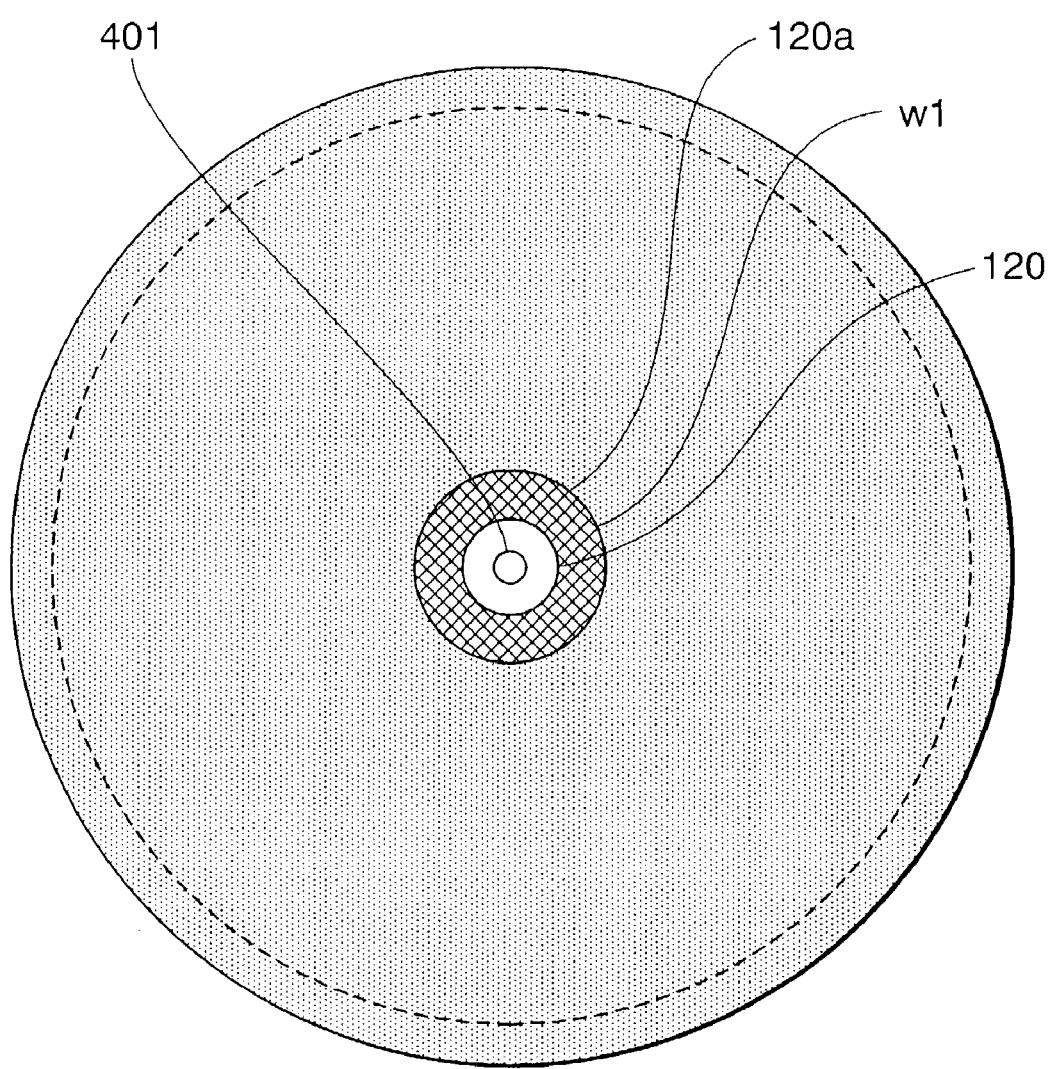
FIG. 25 is a side elevational view of a high voltage supply-side of the flat plate laminate ozone generating apparatus of FIG. 23.
Figure 26:
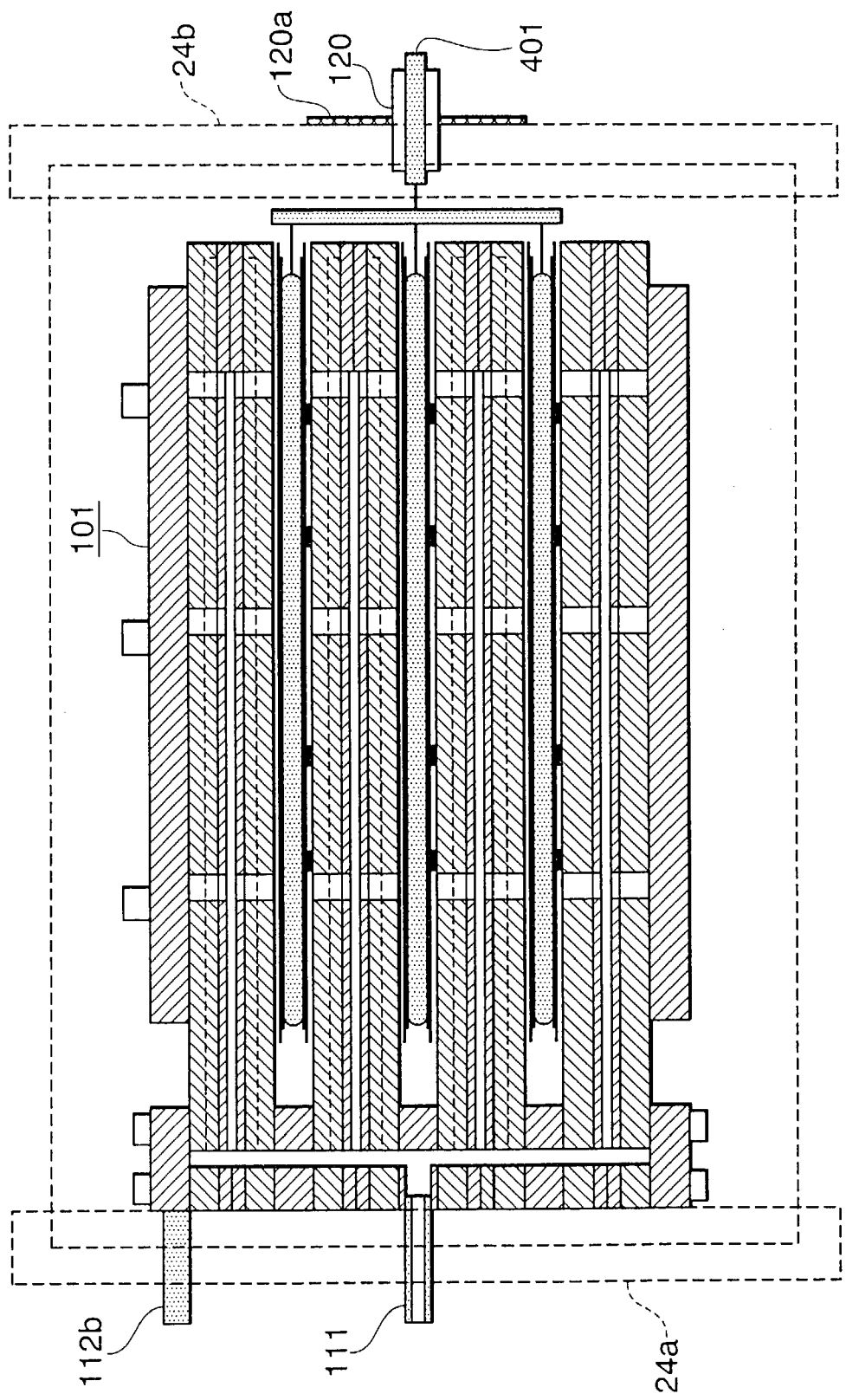
FIG. 26 is a front sectional view of an ozonizer module of the flat plate laminate ozone generating apparatus of FIG. 23.
Figure 28:
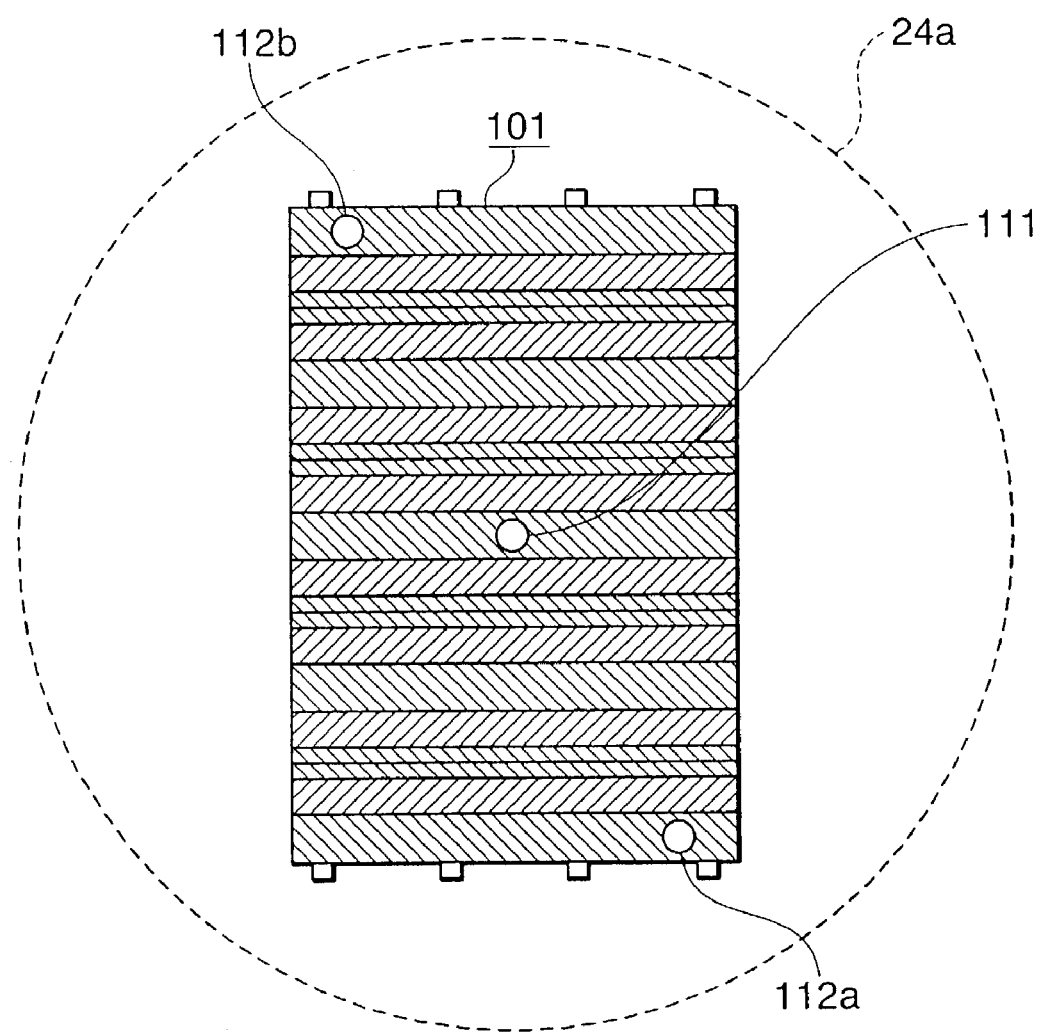
FIG. 28 is a side elevational view of a gas inlet/outlet-side of the ozonizer module of the flat plate laminate ozone generating apparatus of FIG. 23.
Figure 29:
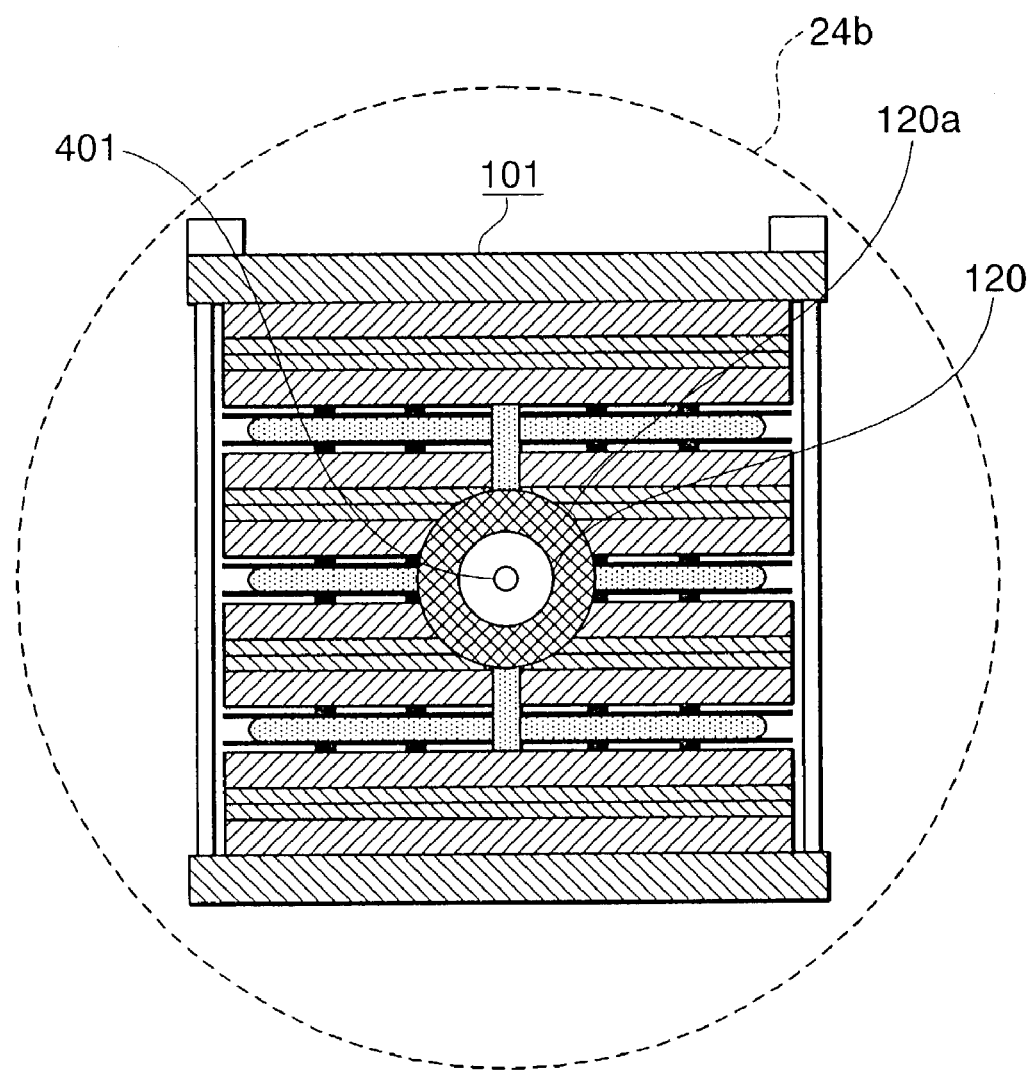
FIG. 29 is a side elevational view of the high voltage supply-side of the ozonizer module of the flat plate laminate ozone generating apparatus of FIG. 23.

FIG. 23 is a front sectional view of a flat plate laminate ozone generating apparatus including an ozonizer of Embodiment 3 of the present invention. FIG. 24 is a side elevational view of a gas inlet/outlet-side of the flat plate laminate ozone generating apparatus of FIG. 23. FIG. 25 is a side elevational view of a high voltage supply-side of the flat plate laminate ozone generating apparatus of FIG. 23. FIG. 26 is a front sectional view of an ozonizer module of the flat plate laminate ozone generating apparatus of FIG. 23. FIG. 27 is a plan view of the ozonizer module of the flat plate laminate ozone generating apparatus of FIG. 23. FIG. 28 is a side elevational view of a gas inlet/outlet-side of the ozonizer module of the flat plate laminate ozone generating apparatus of FIG. 23. FIG. 29 is a side elevational view of the high voltage supply-side of the ozonizer module of the flat plate laminate ozone generating apparatus of FIG. 23.

The apparatus of the present embodiment includes a cylindrically shaped housing 1100. In the cylindrical housing 1100, surfaces at both ends are closed with end surface lids 24a, 24b which are connected by welding to make a sealed construction. In the present embodiment, a slender flat plate laminate ozonizer 101 is housed in the approximately $\phi$100 mm cylindrical housing 1100 via a module base 24c. Cooling water outlet piping 112a passes through the end surface lid 24a and extends to an outside portion. A periphery of the portion where the outlet piping 112a passes through the end surface lid 24a is hermetically sealed with piping cap C3, having a hole formed in a center portion, which is fixed to the end surface lid 24a. The outlet piping 112a and piping cap C3 are joined with a joining portion W7. This joining is performed by welding or soldering. Cooling water inlet piping 112b passes through the end surface lid 24a and extends to an outside portion. A periphery of the portion where the inlet piping 112b passes through the end surface lid 24a is hermetically sealed with piping cap C1, having a hole formed in a center portion, which is fixed to the end surface lid 24a. The inlet piping 112b and piping cap C1 are joined with a joining portion W5.

Raw material gas is supplied to the cylindrical housing 1100 from raw material gas intake piping 1010 communicated therewith, and raw material gas is filled in the cylindrical housing 1100. Accordingly, raw material gas is continuously supplied and ozone gas is retrieved from ozone gas retrieving piping 111. The ozone gas retrieving piping 111 passes through the end surface lid 24a and extends to an outside portion. A periphery of the portion where the ozone gas retrieving piping 111 passes through the end surface lid 24a is hermetically sealed with piping cap C2, having a hole formed in a center portion, which is fixed to the end surface lid 24a. The ozone gas retrieving piping 111 and piping cap C2 are joined with a joining portion W6.

A high voltage bushing 120 passes through the end surface lid 24b and extends to an outside portion. A periphery of the portion where the high voltage bushing 120 passes through the end surface lid 24b is hermetically sealed with a high voltage feeding flange 120a which is fixed to the end surface lid 24a In the flat plate laminate ozone generating apparatus of FIGS. 23, 24 and 25, the slender flat plate laminate ozonizer 101 is housed in the approximately φ100 mm cylindrical housing 1100 via the module base, and the ozone gas retrieving piping 111 communicated with the ozone gas passage 8, the cooling water outlet piping 112a and cooling water inlet piping 112b of the cooling water passages 9 are formed at a side of the cylindrical housing 1100. Thus, the ozone gas retrieving piping 111, the raw material gas intake piping 1010 and the voltage bushing 120 are provided and the piping caps C1, C2, C3 are put one and hermetically welded at the cooling water inlet piping 112b cooling water outlet piping 112a ozone gas retrieving piping 111. Also, the periphery of high voltage bushing 120 is hermetically welded via high voltage feeding flange 120a. Furthermore, peripheries of both end surface lids 24a, 24b of the cylindrical housing 1100 are hermetically welded with welds W2, W3.

Although in the apparatus of Embodiment 2 construction is such that the cooling water inlet/outlet piping, ozone gas retrieving piping and high voltage feed terminal are taken out from the base surface provided at the bottom, in the present embodiment, the inlet piping 112b, outlet piping 112a and ozone gas retrieving piping 111 are provided at the end surface lid 24a in view if the space factor of the apparatus and considering easy of integration with the cylindrical housing 1100.

Accordingly, by housing the flat plate laminate ozone generating apparatus 101 in the cylindrical housing 1100, the ozonizer may be compact and have a large capacity. And since the housing 1100 is a cylindrical housing, it may have strong high pressure strength and be lightened. Also, assembly and welding operations of the apparatus are facilitated and the assembly line may be easily automated.

Figure 49:
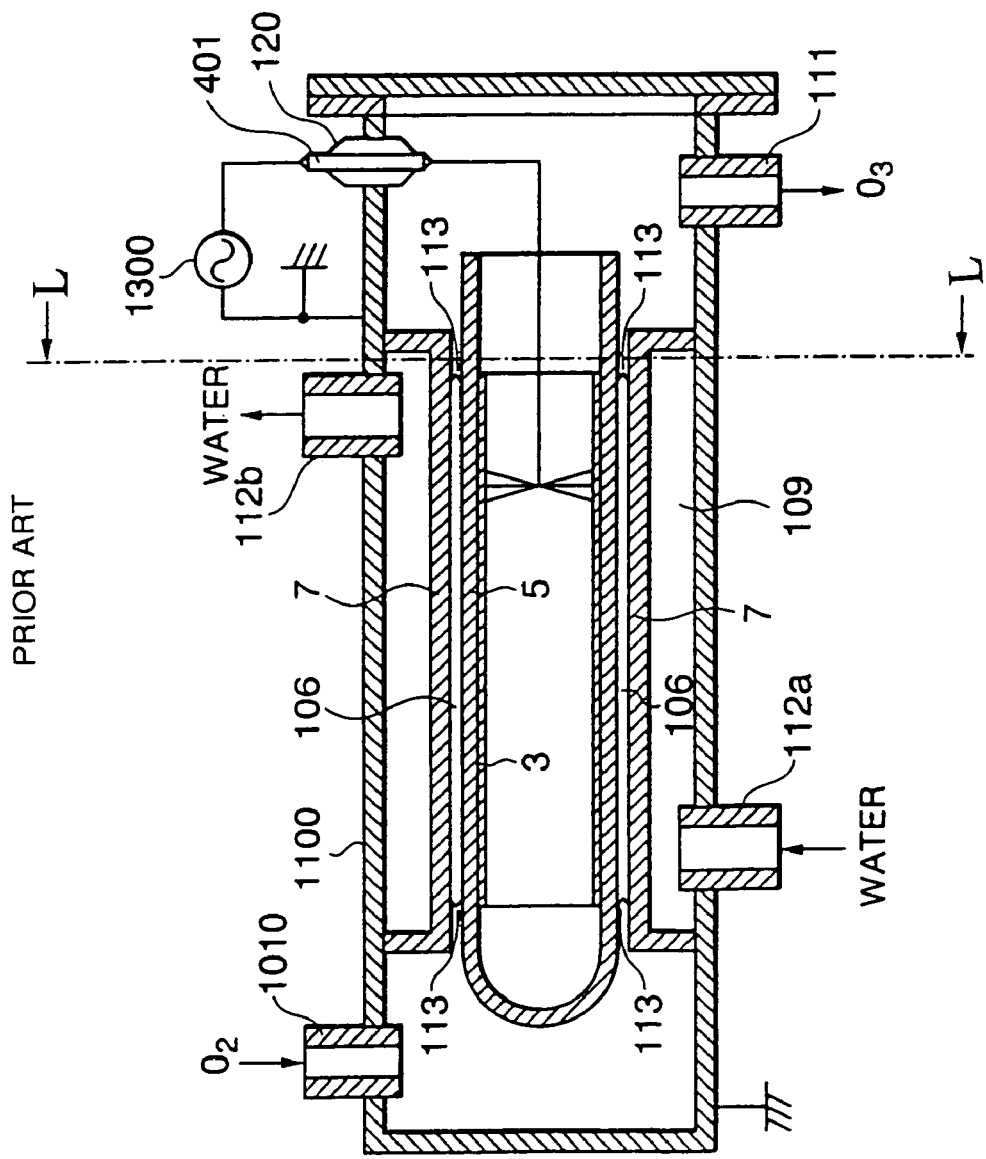
FIG. 49 is a side sectional view of a conventional coaxial cylindrical ozone generating apparatus.
Figure 50:
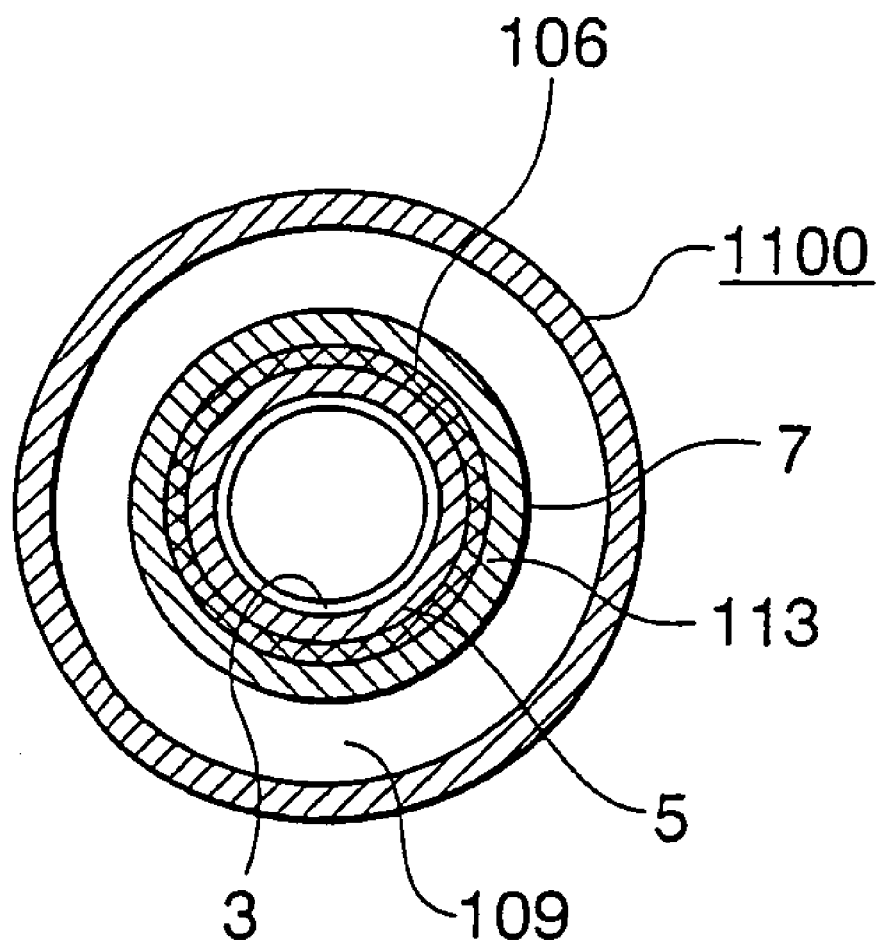
FIG. 50 is a sectional view, taken along the line L—L, of the coaxial cylindrical ozone generating apparatus of FIG. 49.
Figure 51:
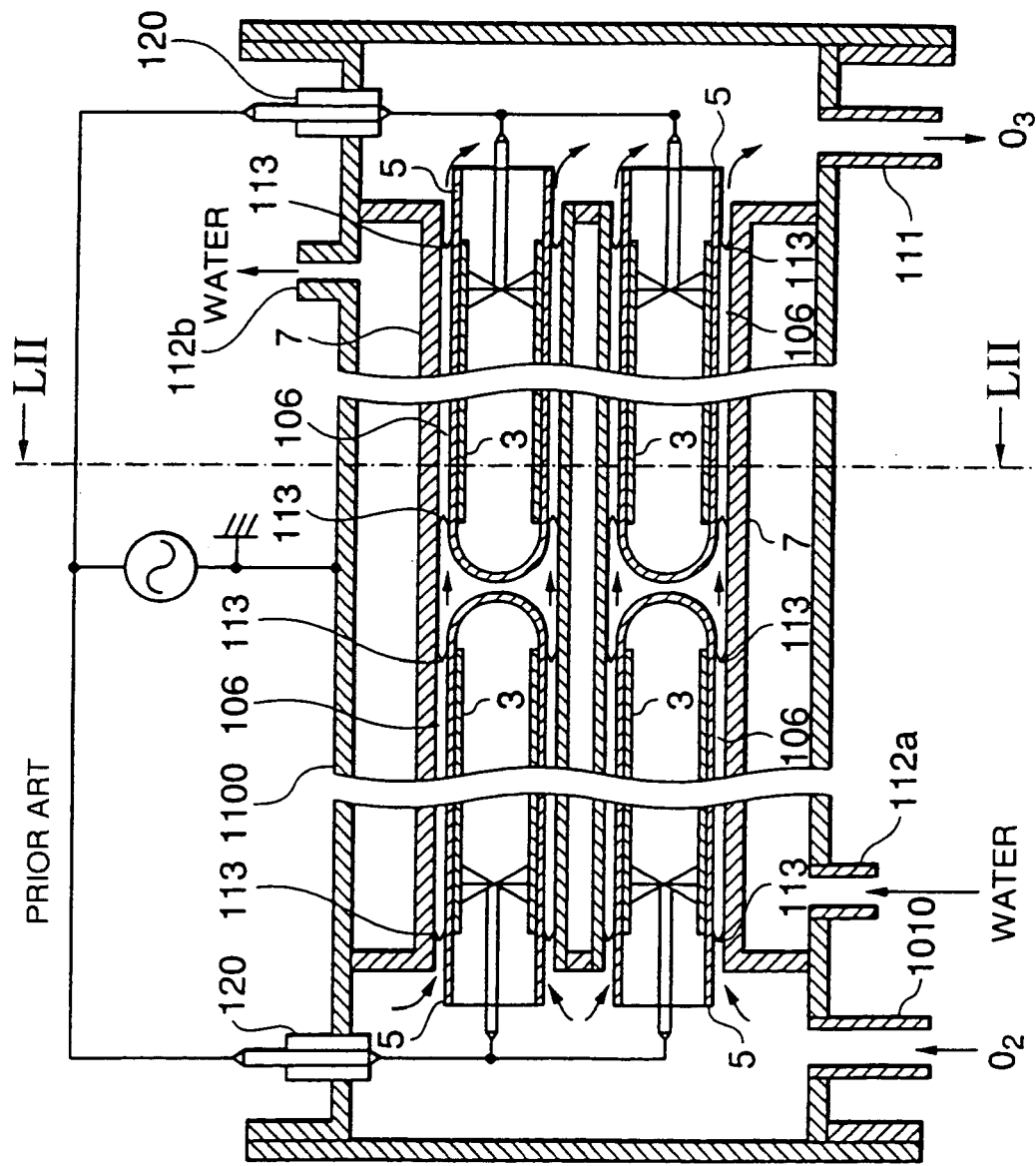
FIG. 51 is a side sectional view showing another example of a conventional coaxial cylindrical ozone generating apparatus.
Figure 52:
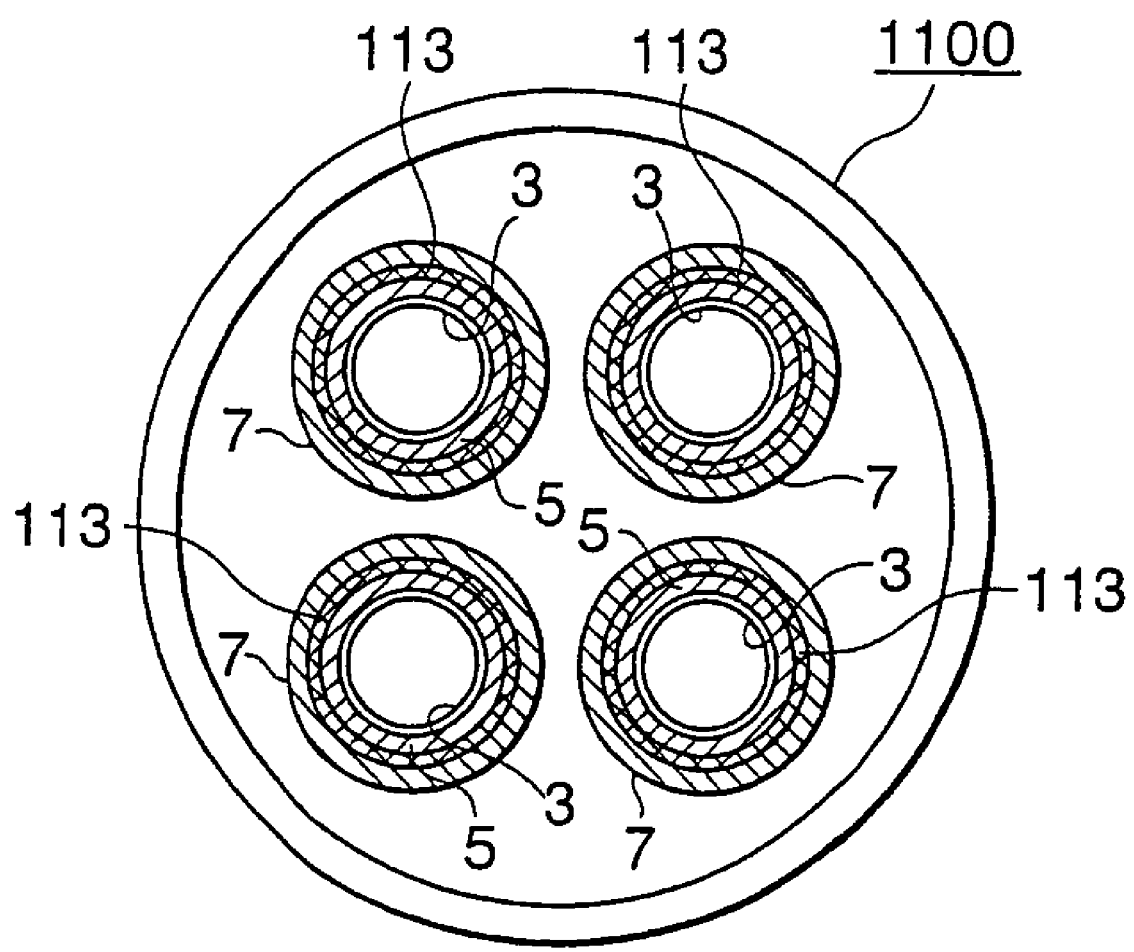
FIG. 52 is a sectional view, taken along the line LII—LII, of the coaxial cylindrical ozone generating apparatus of FIG. 51.

As an example, when the an ozonizer in the conventional cylindrical ozonizer shown in FIGS. 49, 50 is constructed to be xxx P00 mm–500 mm length, a cylindrically-shaped space for the high voltage electrode becomes a waste of space, and in a construction where six (6) cylindrical units, 40 mm in diameter and 1 m in length, are inserted and discharge gaps of 0.04 cm are provided, ozone cannot be generated at a rate of 200 g/h. On the other hand, in the ozonizer of the present embodiment which is a laminate construction in which the electrodes 6 cm in width and 50 cm in length make six (6) discharge surfaces, the cooling construction of the electrode cools both surfaces, the discharge gap is 0.01 cm and the cylindrical housing 300 is φ100 mm–50 mm length, one (1) ozonizer generates highly concentrated ozone at an amount of approximately 0.5 kg/h Embodiment 4

Figure 30:
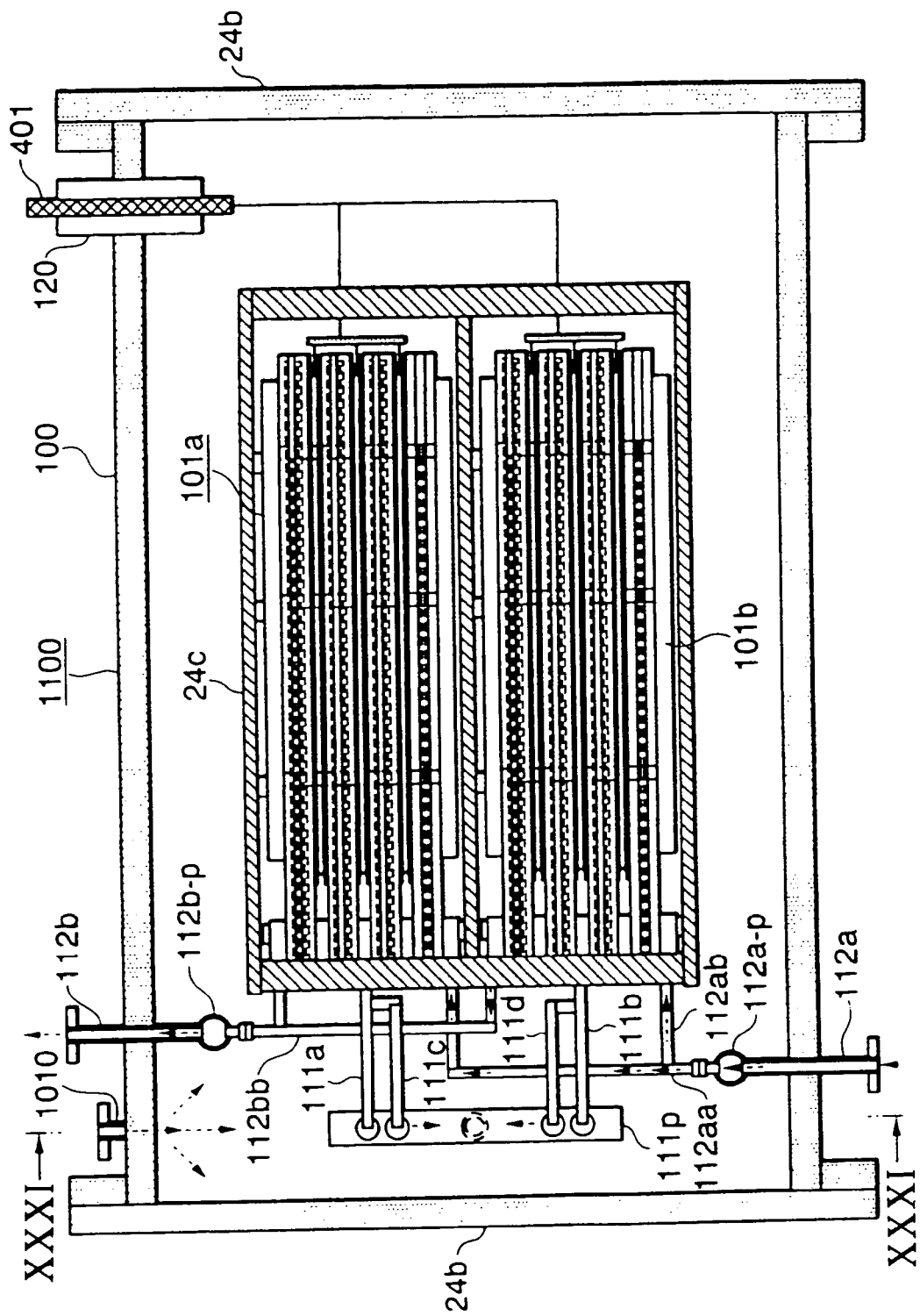
FIG. 30 is a schematic vertical sectional view of a flat plate laminate ozone generating apparatus including an ozonizer of Embodiment 4 of the present invention, and is a sectional view, from the perspective of the arrows, taken along the line XXX—XXX in FIG. 31.
Figure 31:
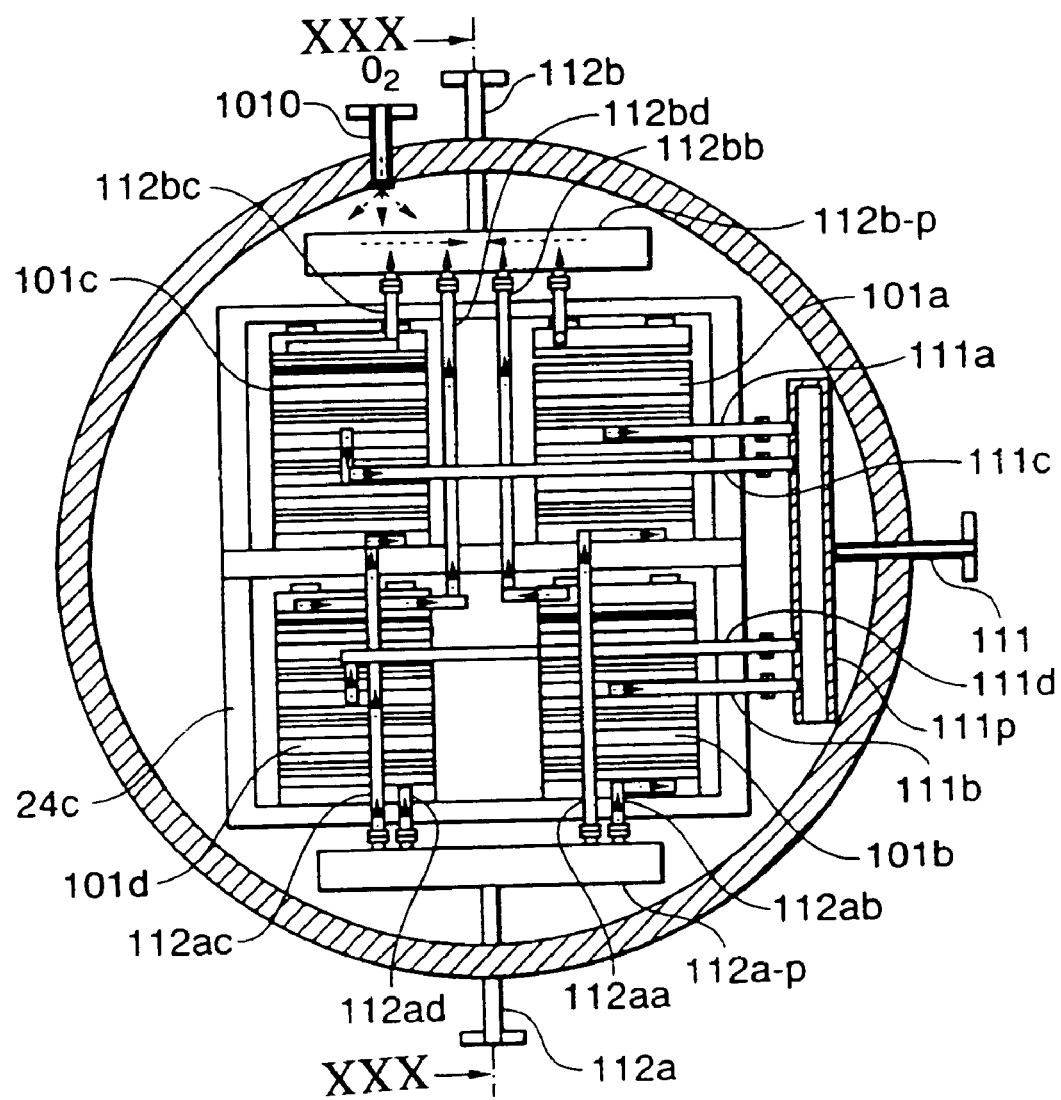
FIG. 31 is a transverse sectional view of a flat plate laminate ozone generating apparatus including an ozonizer of Embodiment 4 of the present invention, and is a sectional view, from the perspective of the arrows, taken along the line XXXI—XXXI in FIG. 30.

FIG. 30 is a schematic vertical sectional view of a flat plate laminate ozone generating apparatus including an ozonizer of Embodiment 4 of the present invention, and is a sectional view, from the perspective of the arrows, taken along the line XXX—XXX in FIG. 31. FIG. 31 is a transverse sectional view of a flat plate laminate ozone generating apparatus including an ozonizer of Embodiment 4 of the present invention, and is a sectional view, from the perspective of the arrows, taken along the line XXXI—XXXI in FIG. 30. In the present embodiment, a flat plate laminate ozone generating apparatus is equipped with an angular ozonizer(s), and a plurality of flat plate laminate ozonizers 101a, 101b, 101c, and 101d are housed in a single housing and a large capacity ozone generating apparatus is realized. In the FIGS, the apparatus of the present embodiment includes a cylindrically shaped cylindrical housing 1100. Both end surfaces of the cylindrical housing 1100 are closed with end surface lids 24a and 24b in an airtight construction. The present apparatus includes a shelf-shaped module base 24c. Moreover, the apparatus includes respective cooling water inlet/outlet piping 112aa, 112ab, 112ac, 112ad, 112ba, 112bb, 112bc, and 112bd and a plurality of respective ozone gas retrieving piping for the plurality of flat plate laminate ozonizers 101a, 101b, 101c, and 101d.

Furthermore, header piping 112a–p (means for branching and sending coolant to the plurality of ozone generating modules) for combining the piping which is branched to be distributed to the plurality of flat plate laminate ozonizers and header piping 112b–p (means for collecting and retrieving coolant from the plurality of ozone generating modules) for combining the collecting piping from the plurality of flat plate laminate ozonizers, are provided. In the cylindrical housing 1100, inlet piping 112b and outlet piping 112a are provided as the cooling water inlet/outlet for the entire apparatus, and an ozone retrieving opening 111p (means for collecting and retrieving ozone gas from the plurality of ozone generating modules) for the entire apparatus, a raw material gas intake pipe 101 for the entire apparatus and a high voltage bushing 120 (means for supplying voltage to the high voltage electrodes of the plurality of ozone generating modules), are also provided.

In the present embodiment, a plurality of slender flat plate laminate ozonizers 101 are arranged on the module base 24 in the single cylindrical housing 1100, and the cooling water inlet/outlet piping and ozone gas retrieving piping of the flat plate laminate ozonizer(s) 101 is taken out via the cooling water header piping 112b–p and ozone retrieving opening 111p.

By housing the plurality of flat plate laminate ozonizers 101 in the single, large, cylindrical housing, a many tens kg/h class ozonizer may be realized in ⅕ or less the conventional size and it is possible to achieve compactness.

Figure 53:
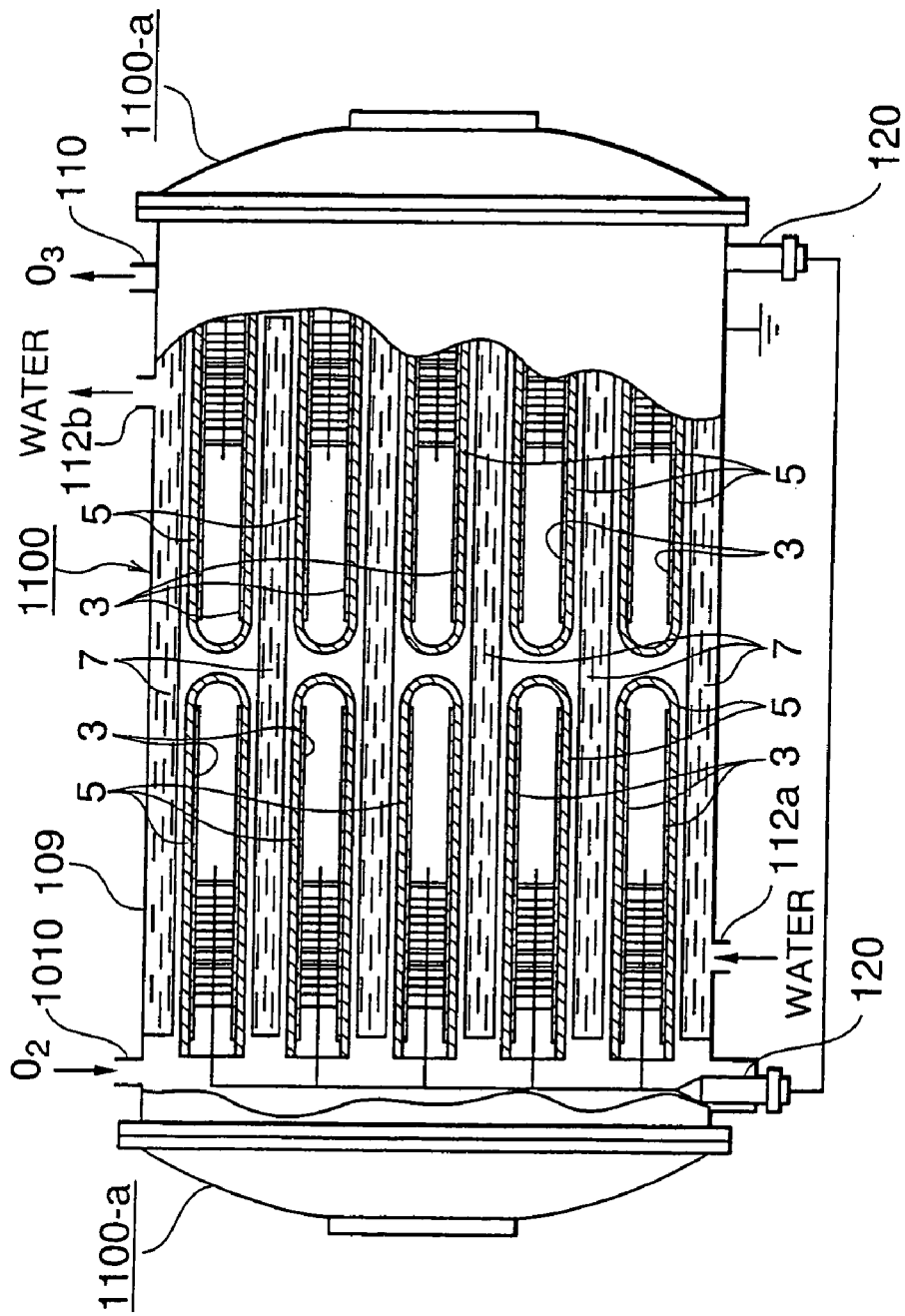
FIG. 53 is a partially sectional side elevational view showing a conventional large coaxial cylindrical ozone generating apparatus.
Figure 54:
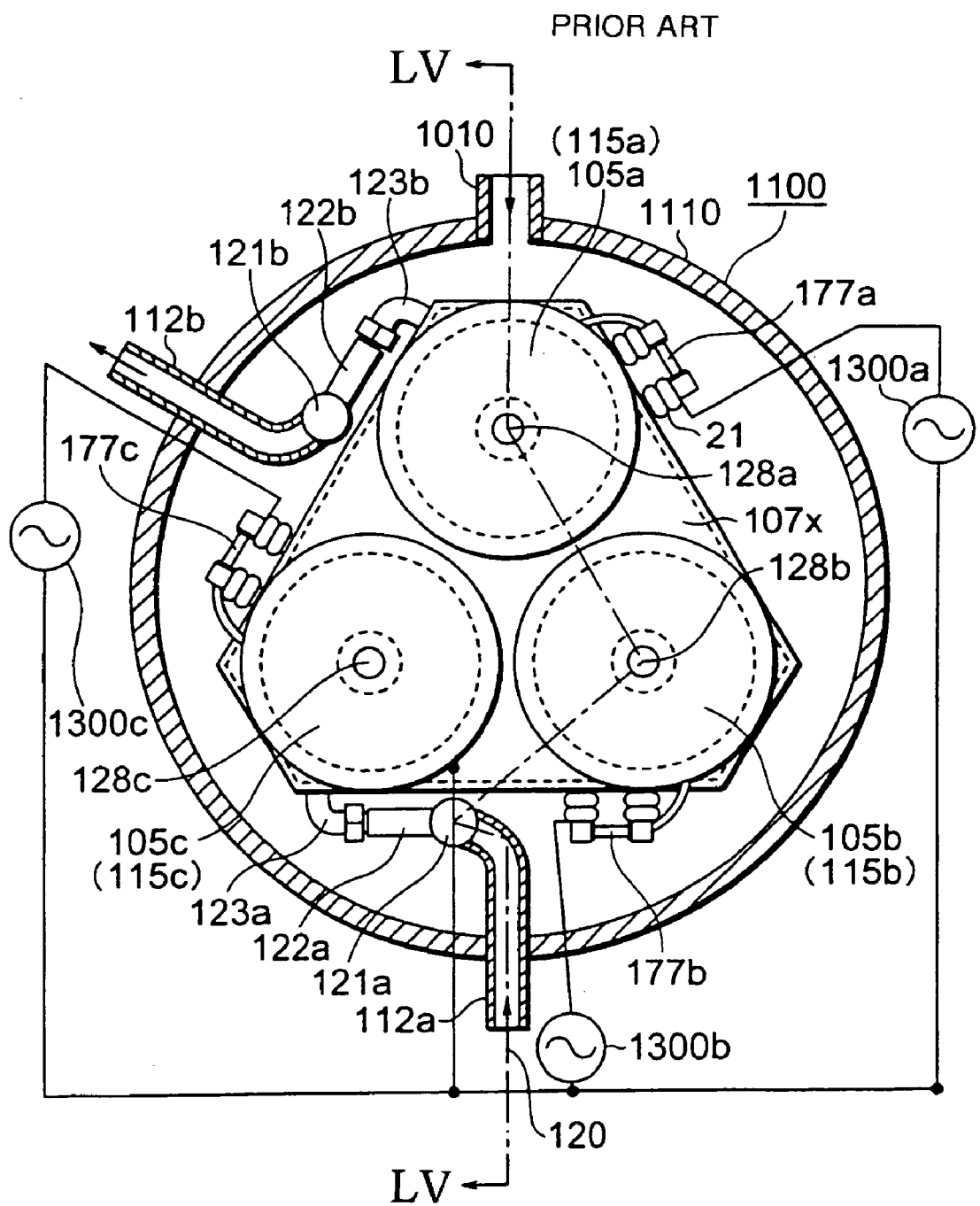
FIG. 54 is a transverse sectional view of an essential portion showing yet another example of a conventional ozone generating apparatus, and is a sectional view, from the perspective of the arrows, taken along the line LIV—LIV in FIG. 55.

As an example, in the present embodiment, one hundred (100) flat plate laminate ozonizers 101 ozonizers 40 mm in diameter and 1 m in length are housed in the housing. That is, if each flat plate laminate ozonizer 101 has a capacity of approximately 0.5 kg/h, a 50 kg/h large capacity ozone generating apparatus is obtained. Compared to a conventional cylindrical ozone generating apparatus such as in FIG. 53, it is possible to realize an ozone generating apparatus which is very small, high capacity, and that generates highly concentrated ozone.

Embodiment 5

Figure 32:
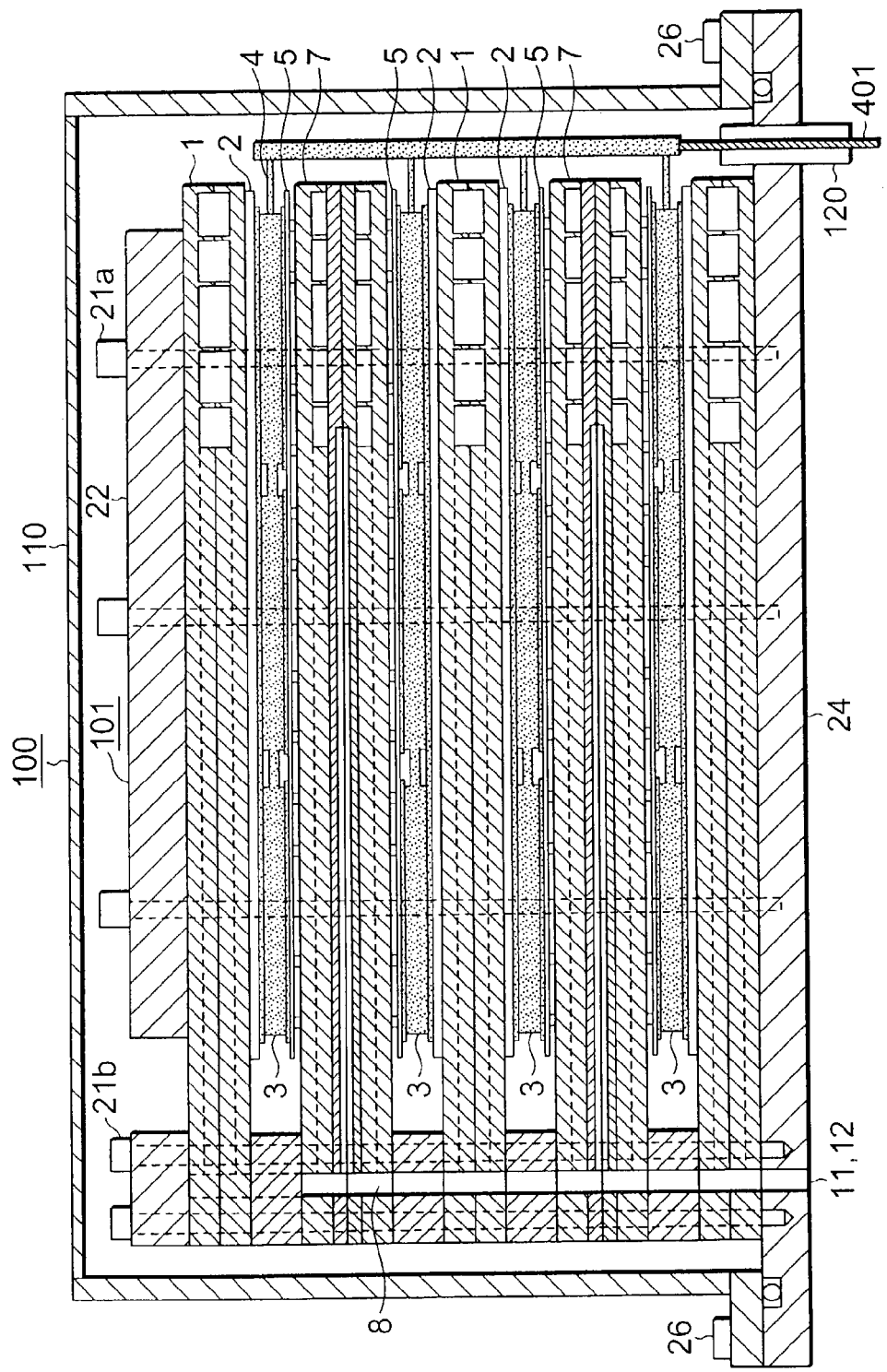
FIG. 32 is a schematic sectional view of a flat plate laminate ozone generating apparatus including an ozonizer of Embodiment 5 of the present invention.

FIG. 32 is a schematic sectional view showing yet another example of a flat plate laminate ozone generating apparatus, including an ozonizer, of the present invention. In the present embodiment, an insulating plate(s) 2 combining insulating and cooing properties are provided at a back side-side of the high voltage electrode 3 and high voltage electrode cooling plate(s) 1 are provided stacked on the insulating plate(s) 2, and, the construction is such that the high voltage electrode 3 may be cooled via the insulating plate 2 by flowing a coolant at a surface of the high voltage electrode cooling plate 1.

The high voltage electrode cooling plate 1 is made by adhering together two (2) metal plates. A number of grooves which are C-shaped in section are formed to a depth of several mm, by means of pre-formed half etching or machining and the like, in one (1) main surface of each of the two (2) metal plates. The two (2) metal plates are then adhered so that the grooves match up and cooling water passage(s) are formed inside. The two (2) metal plates are superposed and joined, by means of soldering or hot pressing and the like, so that an inner portion is made as an airtight construction.

An ozone gas passage and cooling water passage(s) are formed, similar to in the low voltage electrode 7, in an inlet/outlet portion provided at a side portion of the high voltage electrode cooling plate 1, extending in the laminating direction. Here, the cooling water passage is divided into a cooling water inlet (coolant inlet) and a cooling water outlet (coolant outlet). The cooling water passage communicated with the cooling water inlet and cooling water outlet is formed over approximately the entire inner portion of the high voltage electrode cooling plate 1, similar to in the low voltage electrode 7. That is, the cooling water passage is formed in concentric plurality from an inner portion to an outer portion of the rectangular high voltage electrode cooling plate 1. Moreover, adjacent concentric cooling water passages are partitioned by thin ribs.

The ozone gas passage and cooling water passage(s) formed extending in the laminating direction in an inlet/outlet portion line up straight and connect with respective ozone gas passages and cooling water passages provided in manifold blocks 23 and finally connect with a ozone gas outlet 11 and cooling water inlet/outlet 12 provided in the base 24.

In the ozonizer of the present embodiment, the dual electrode cooling structure is such that, not only the low voltage electrode, but also the high voltage electrode 3 is cooled. Thus, discharge power density injected in the apparatus may be increased, and the apparatus may be made compact. Also, because the high voltage electrode is electrically insulated by the insulating plate 2, the cooling water for cooling the high voltage electrode 3 may be shared with the cooling water for the low voltage electrode 7. Moreover, a dual electrode cooling structure may be made without increasing the piping of the apparatus.

Embodiment 6

Figure 33:
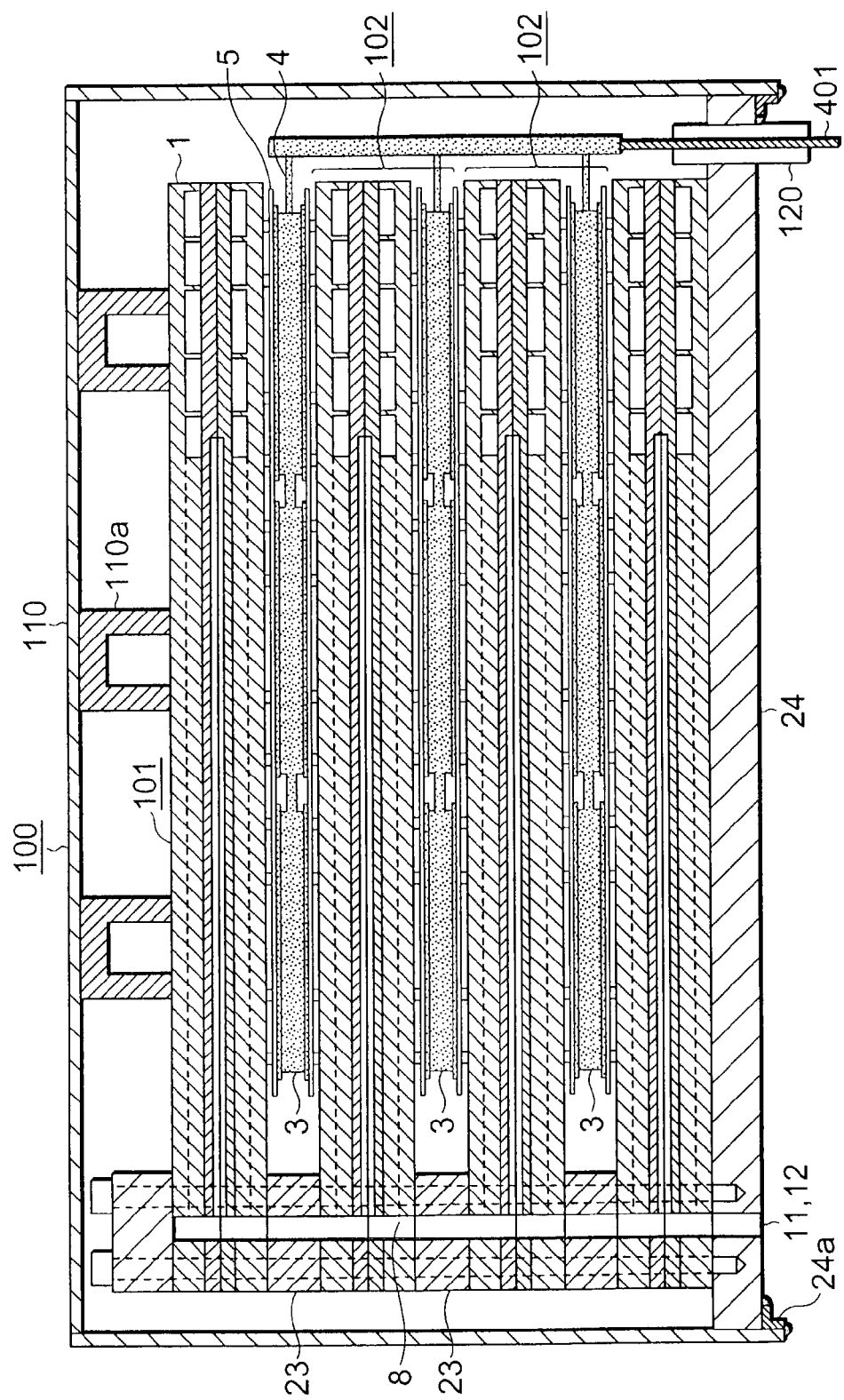
FIG. 33 is a schematic sectional view of a flat plate laminate ozone generating apparatus including an ozonizer of Embodiment 6 of the present invention.

FIG. 33 is a schematic sectional view of a flat plate laminate ozone generating apparatus, including an ozonizer, of the present invention. The present embodiment aims to reduce the number of components of the ozone generating apparatus, reduce a raw material gas space region, reduce a joining portion for the ozonizer cover 110 and base 24 and improve the workability of the ozonizer cover 110 installation operation.

In the present embodiment, the ozonizer cover 110 has the function of pressing a plurality of electrode modules including the low voltage electrode 7, high voltage electrode 3, dielectric plate(s) 5 and spacers 13 (not shown) to the base 24 with a predetermined pressing pressure. The ozonizer cover 110 is made by means of a drawing process using thin stainless steel plates, and includes a number of pressing blocks 110a at an inner side of a top portion. The pressing blocks 110a are provided protruding at the underside of the top portion and are controlled to a predetermined height. The fastening flange formed at the circumferential edge of the opening, in Embodiment 1, is not provided in the ozonizer cover 110.

On the other hand, L-shaped members 24a of an L-shaped cross section are fastened, by soldering, around the entire circumference of the base 24 for mounting the ozonizer electrode 101 of laminated electrode modules 102. The ozonizer cover 110 covers the ozonizer electrode 101 and, together with covering the ozonizer electrode 101, pushes the laminated electrode modules 102 from above to the base 24-side by means of the pressing blocks 110a. The circumferential edge portion of the opening of the ozonizer cover 110 and the L-shaped members 24a provided at the outer circumferential of the base 24 are butt jointed and joined, and a peripheral portion of this area is made an integral construction by flowing solder or welding. The interior of the ozonizer cover 110 and the base 24 is formed as an airtight space.

In an ozonizer of such a construction, the apparatus may be made compact, the number of parts may be reduced and the assembly process may be improved. Furthermore, the apparatus may be made by automated assembly.

Embodiment 7

Figure 34:
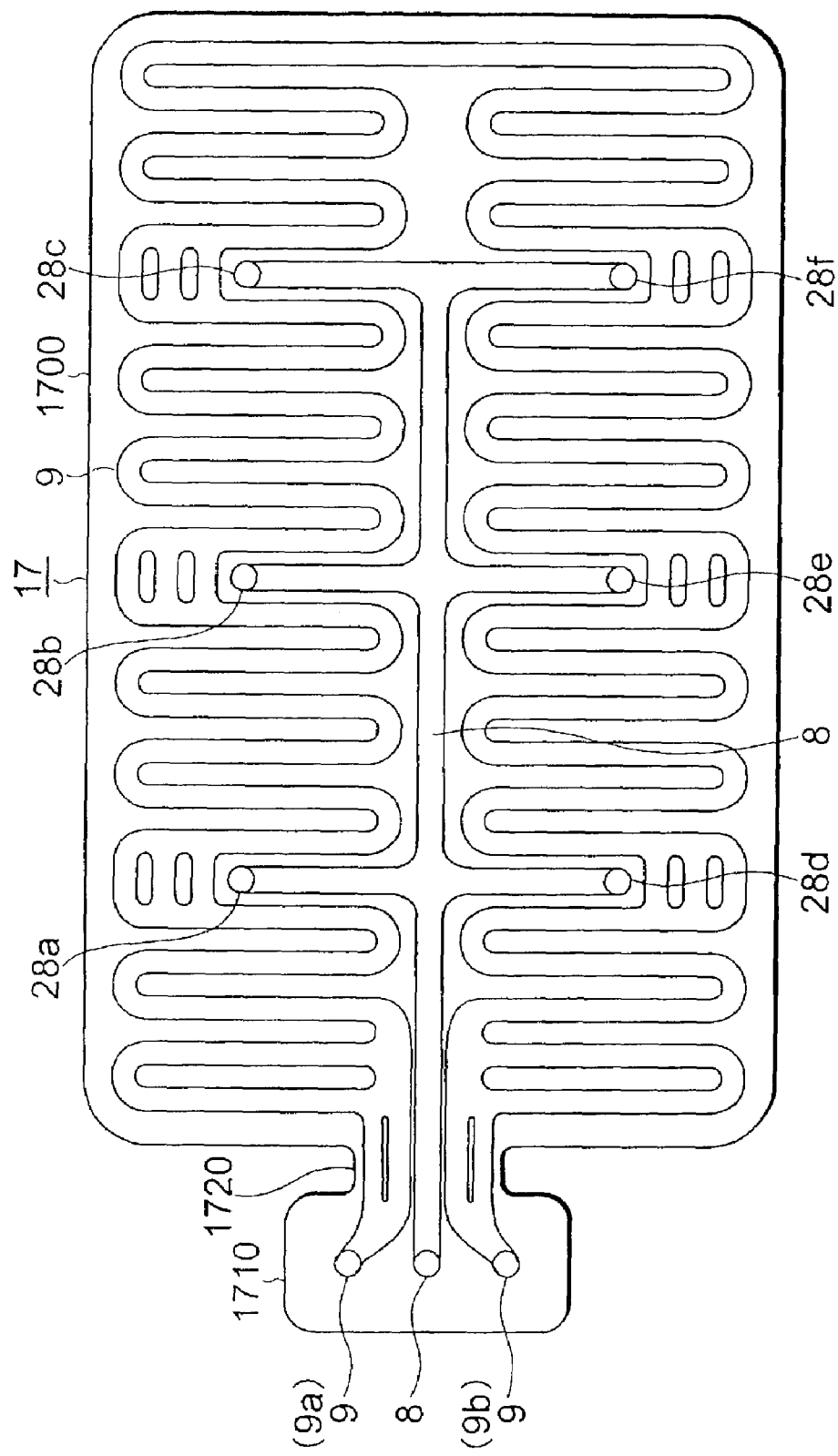
FIG. 34 is a pattern drawing of a low voltage electrode of an ozonizer of Embodiment 7 of the present invention.

FIG. 34 is a pattern drawing of yet another example of a low voltage electrode of the present invention. A low voltage electrode of the present embodiment includes a rectangular flat plate-shaped low voltage electrode discharge portion 1700, main surface(s) thereof forming electrode(s), formed with ozone passages 8 and cooling water passages 9 in an inner portion thereof, and an inlet/outlet portion 1710 provided at a side edge of the low voltage electrode discharge portion 1700 and formed with a gas retrieving opening 8a of the ozone gas passage 8 and a cooling water inlet (coolant inlet) 9a and cooling water outlet (coolant outlet) 9b of the cooling water passages. The cooling water passages 9 provided at the low voltage electrode discharge portion 1700 as coolant passages are formed over the entire low voltage electrode discharge portion 1700 so as to flow cooling water as coolant around the entire low voltage electrode discharge portion 1700.

A neck portion 1720 is provided between the low voltage electrode discharge portion 1700 and the inlet/outlet portion 1710. The neck portion 1720 is formed as a portion of small rigidity so that a deformation occurring in either the low voltage electrode discharge portion 1700 or the inlet/outlet portion 1710, when they are fastened with fastening bolts 21a and fastening bolts 21a, respectfully, will not have an effect on the fastening force of the other.

The low voltage electrode 17 is manufactured by adhering two (2) metal electrodes (not shown). A number of grooves which are C-shaped in section are formed to a depth of several mm, by means of pre-formed half etching or machining and the like, in one (1) main surface of each of the two (2) metal plates. The two (2) metal plates are then adhered so that the grooves match up and cooling water passages 9 and ozone gas passage(s) 8 are formed inside. That is, both C-shaped grooves for forming the ozone gas passages 8 and C-shaped grooves for forming the cooling water passages 9 are formed in one (1) main surface of each of the two (2) metal plates. The two (2) metal plates are superposed and joined, by means of soldering or hot pressing and the like, so that an inner portion is made as an airtight construction.

Other constructions are similar to Embodiment 1.

Accordingly, the low voltage electrode 17 as the first electrode in the present embodiment is two (2) flat plates made of metal and formed with grooves in main surfaces thereof, which and are then adhered so that the grooves match up and the cooling water passages 9 and the ozone gas passage(s) 8 are formed inside. Because both the grooves for forming the ozone gas passages and the grooves for forming the cooling water passages are formed in the main surface of each of the two (2) metal plates which is adhered, the low voltage electrode 17 may be manufactured inexpensively and the electrode may be made thin.

Six (6) ozone retrieving holes 28a to 28f are provided in a main surface of each of the metallic electrodes similar to in Embodiment 1. Each ozone retrieving holes 28a to 28f is communicated with the ozone gas passage 8. Ozone gas entering the low voltage electrode 17 from the ozone retrieving holes 28a to 28f merges inside the low voltage electrode 17 and is led to the ozone gas passage 8 provided in the inlet/outlet portion 1710.

On the other hand, cooling water as a coolant flows into the low voltage electrode 17 from the cooling water inlet (coolant inlet) 9a provided in the inlet/outlet portion 1710 and, after circuiting inside the entire low voltage electrode 17, is led out from the cooling water outlet (coolant outlet) 9b provided in the inlet/outlet portion 1710.

In the ozonizer with such a construction, the low voltage electrode 17 as the first electrode in the present embodiment is two (2) flat plates made of metal and formed with grooves in main surfaces thereof, which and are then adhered so that the grooves match up and the cooling water passages 9 and the ozone gas passage(s) 8 are formed inside. Because both the grooves for forming the ozone gas passages and the grooves for forming the cooling water passages are formed in the main surface of each of the two (2) metal plates which is adhered, the low voltage electrode 17 may be manufactured inexpensively and the electrode may be made thin.

Embodiment 8

Figure 35:
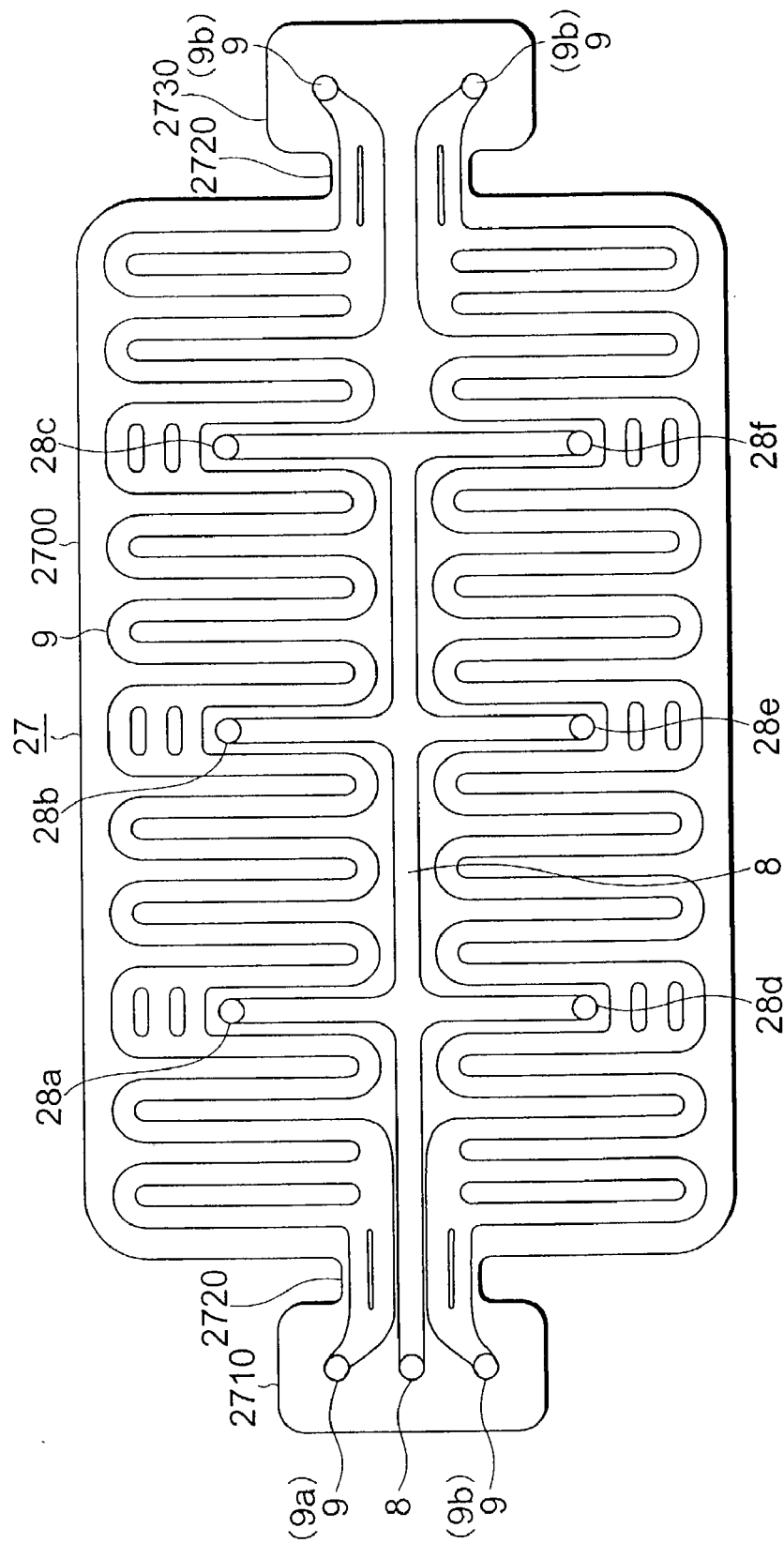
FIG. 35 is a pattern drawing of a low voltage electrode of an ozonizer of Embodiment 8 of the present invention.

FIG. 35 is a pattern drawing of still yet another example of a low voltage electrode of an ozonizer of the present invention. A low voltage electrode 27 of the present embodiment includes a rectangular flat plate-shaped low voltage electrode discharge portion 2700, main surface(s) thereof forming electrode(s), formed with ozone passages 8 and cooling water passages 9 in an inner portion thereof, a first inlet/outlet portion 2710 provided at a first side edge of the low voltage electrode discharge portion 2700 and formed with a gas retrieving opening 8a of the ozone gas passage 8 and cooling water inlets (coolant inlet) 9a of the cooling water passages 9 and a second inlet/outlet portion provided at a second edge opposite the first side edge of the low voltage electrode discharge portion 2700 and formed with cooling water outlets (coolant outlet) 9b of the cooling water passages 9.

Although in the above Embodiment 7 one (1) cooling water passage 9 is provided, in the present embodiment two (2) cooling water passages 9 are provided. The cooling water passages 9 provided at the low voltage electrode discharge portion 2700 are formed over the entire low voltage electrode discharge portion 2700 as coolant passages so as to flow cooling water as coolant around the entire low voltage electrode discharge portion 2700.

Neck portions 2720 are provided between the low voltage electrode discharge portion 2700 and the inlet/outlet portions 2710, 2730, respectively. The neck portions 2720 are formed as portions of small rigidity so that a deformation occurring in either the low voltage electrode discharge portion 1700 or the inlet/outlet portions 2710, 2730 when they are fastened with fastening bolts 21a and fastening bolts 21a, respectfully, will not have an effect on the fastening force of the other.

Other constructions are similar to Embodiment 1.

In the low voltage electrode 27 of the present embodiment, the ozone retrieving opening 8a and cooling water inlets 9a are formed in the inlet/outlet portion 2710 provided at a first side edge of the low voltage electrode discharge portion 2700 and cooling water outlets 9b are formed in the inlet/outlet portion 2730 provided at the second edge opposite the first side edge of the low voltage electrode discharge portion 2700.

In the ozonizer structured as above, The low voltage electrode 27 as a first electrode includes the rectangular flat plate-shaped low voltage electrode discharge portion 2700, main surface(s) thereof forming electrode(s), formed with ozone passages 8 and cooling water passages 9 in the inner portion thereof, the first inlet/outlet portion 2710 provided at the first side edge of the low voltage electrode discharge portion 2700 and formed with the gas retrieving opening 8a of the ozone gas passage 8 and cooling water inlets 9a of the cooling water passages 9 and the second inlet/outlet portion 2730 provided at a second edge opposite the first side edge of the low voltage electrode discharge portion 2700 and formed with cooling water outlets 9b of the cooling water passages 9. Thus, the cooling water flows in only one (1) direction and the half etching pattern is simplified. And because a pressure loss is less when cooling water flows through the low voltage electrode 27, the amount of cooling water flowed through the apparatus may be increased and the cooling performance may be improved.

Embodiment 9

Figure 36:
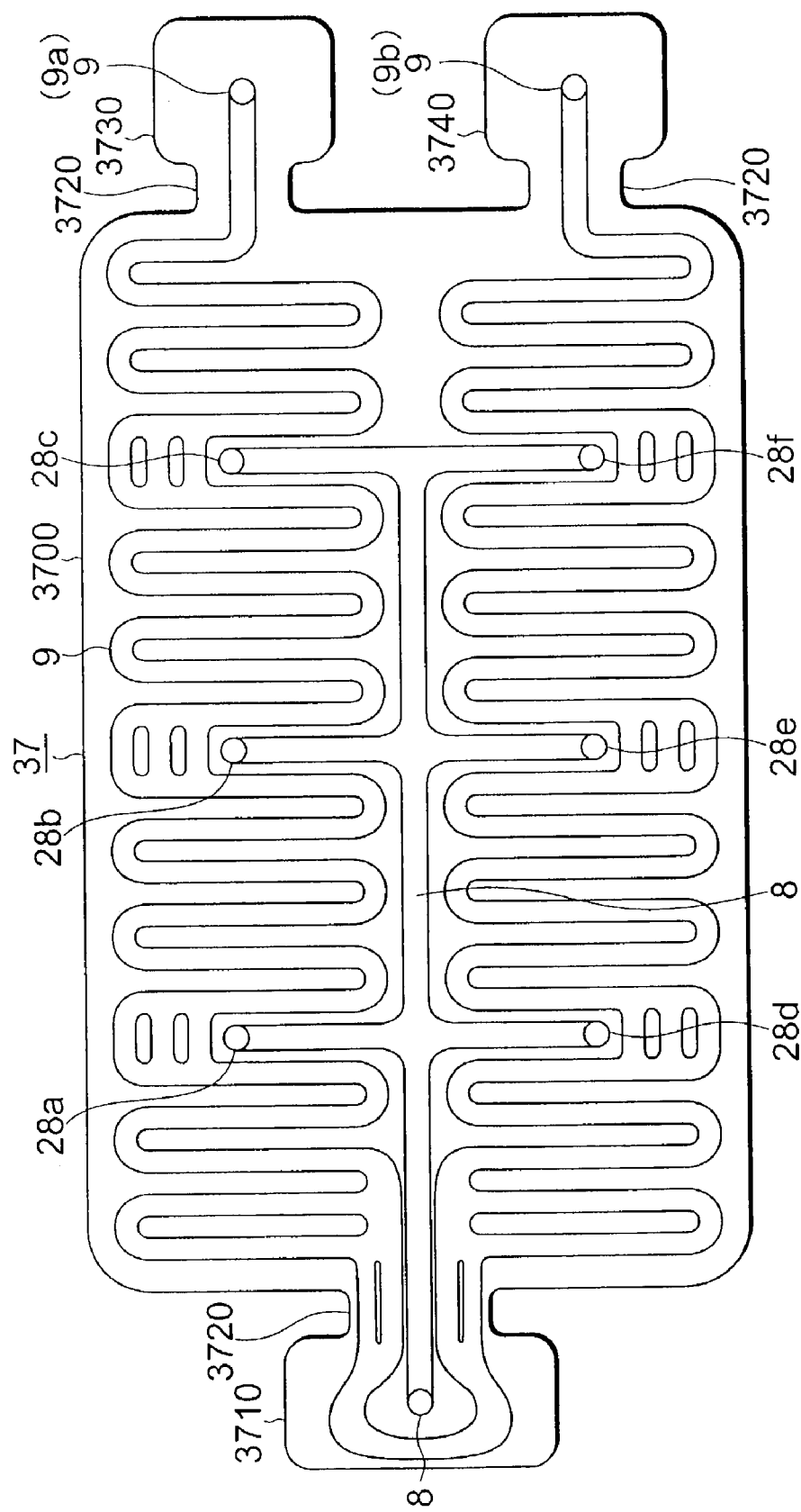
FIG. 36 is a pattern drawing of a low voltage electrode of an ozonizer of Embodiment 9 of the present invention.

FIG. 36 is a pattern drawing of still yet another example of a low voltage electrode of the present invention. A low voltage electrode 37 of the present embodiment includes a rectangular flat plate-shaped low voltage electrode discharge portion 3700, main surface(s) thereof forming electrode(s), formed with ozone passages 8 and cooling water passages 9 in an inner portion thereof, a first inlet/outlet portion 3710 provided at a first side edge of the low voltage electrode discharge portion 3700 and formed with a gas retrieving opening 8a of the ozone gas passage 8, a second inlet/outlet portion 3730 provided at a second edge opposite the first side edge of the low voltage electrode discharge portion 3700 and formed with a cooling water inlet (coolant inlet) 9a of the cooling water passage 9 and a second inlet/outlet portion 3740 provided at the same second edge of the low voltage electrode discharge portion 3700 and formed with a cooling water outlet (coolant outlet) 9b of the cooling water passage 9. The cooling water passages 9 provided at the low voltage electrode discharge portion 3700 are formed over the entire low voltage electrode discharge portion 3700 as coolant passages so as to flow cooling water as coolant around the entire low voltage electrode discharge portion 3700.

Neck portions 3720 are provided between the low voltage electrode discharge portion 3700 and the inlet/outlet portions 3710, 3730 and 3740, respectively. The neck portions 3720 are formed as portions of small rigidity so that a deformation occurring in either the low voltage electrode discharge portion 3700 or the inlet/outlet portions 3710, 3730, 3740, when they are fastened with fastening bolts 21a and fastening bolts 21a, respectfully, will not have an effect on the fastening force of the others.

Other constructions are similar to Embodiment 1.

In the low voltage electrode 37 of the present embodiment, the ozone retrieving opening 8a is formed in the inlet/outlet portion 3710 provided at a first side edge of the low voltage electrode discharge portion 3700 and the cooling water inlet 9a and cooling water outlet 9b are formed in the two (2) inlet/outlet portions 3730, 3740 provided at the second edge of the low voltage electrode discharge portion 3700. Moreover, although in the present embodiment the second inlet/outlet portions formed with the cooling water inlet 9a and cooling water outlet 9b are divided into two (2), the inlet/outlet portion 3730 and the inlet/outlet portion 3740, they may be integrated into one (1).

In the ozonizer structured as above, The low voltage electrode 37 as a first electrode includes the rectangular flat plate-shaped low voltage electrode discharge portion 3700, main surface(s) thereof forming electrode(s), formed with ozone passages 8 and cooling water passages 9 in the inner portion thereof, the first inlet/outlet portion 3710 provided at the first side edge of the low voltage electrode discharge portion 3700 and formed with the gas retrieving opening 8a of the ozone gas passage 8, the second inlet/outlet portions 3730, 3740 provided at a second edge opposite the first side edge of the low voltage electrode discharge portion 3700 and formed with the cooling water inlet 9a and the cooling water outlet 9b of the cooling water passages 9. Thus, the inlet/outlet portion provided with the ozone gas passage 8 and the inlet/outlet portion provided with the cooling water passage 9 may be provided separately, and, ozone gas piping and cooling water piping, which is outside the ozonizer and communicated with these portions, may also be provided separate from each other to facilitate the layout of the piping.

Embodiment 10

Figure 37:
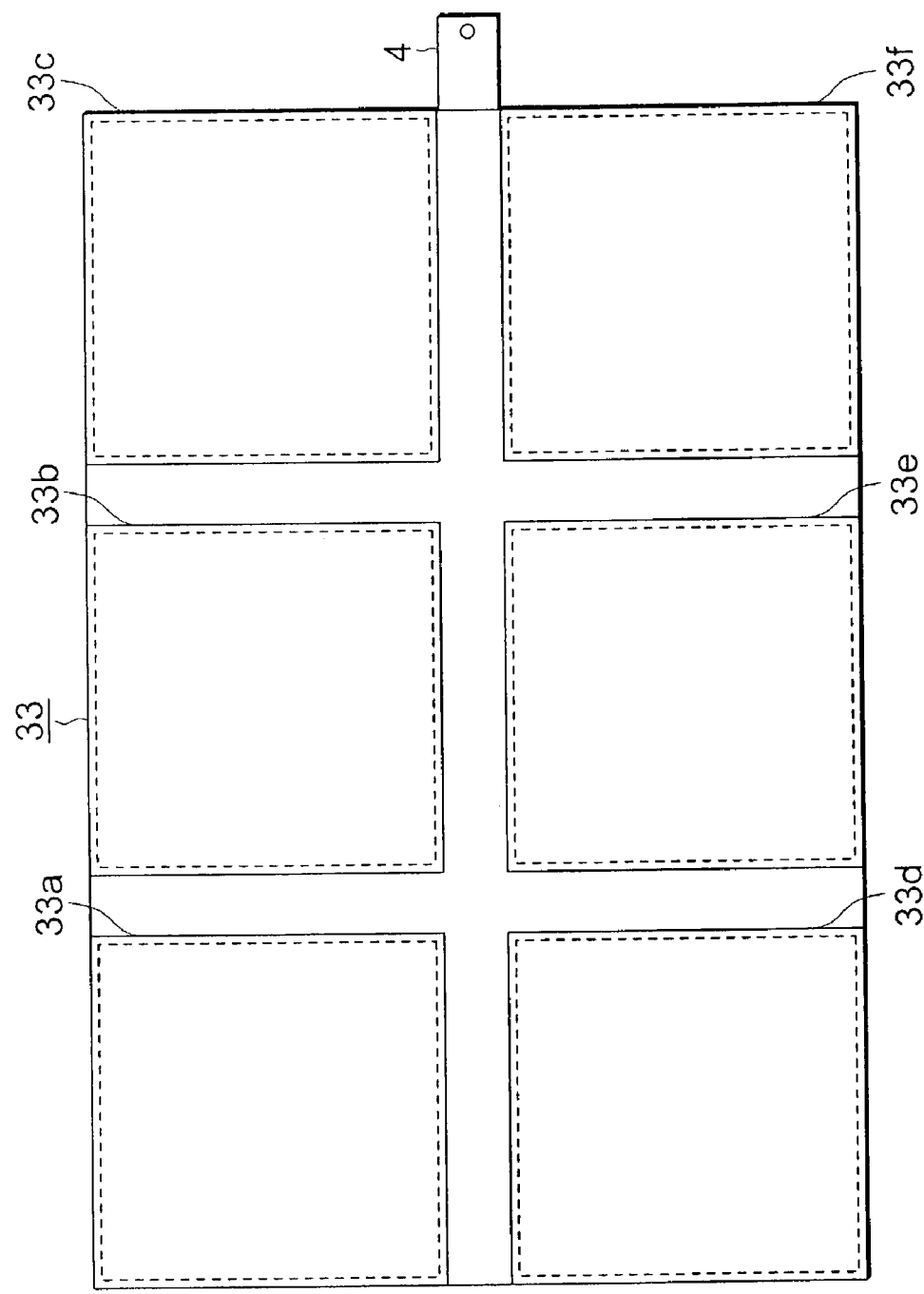
FIG. 37 is a top view of a high voltage electrode of an ozonizer of Embodiment 10 of the present invention.
Figure 38:
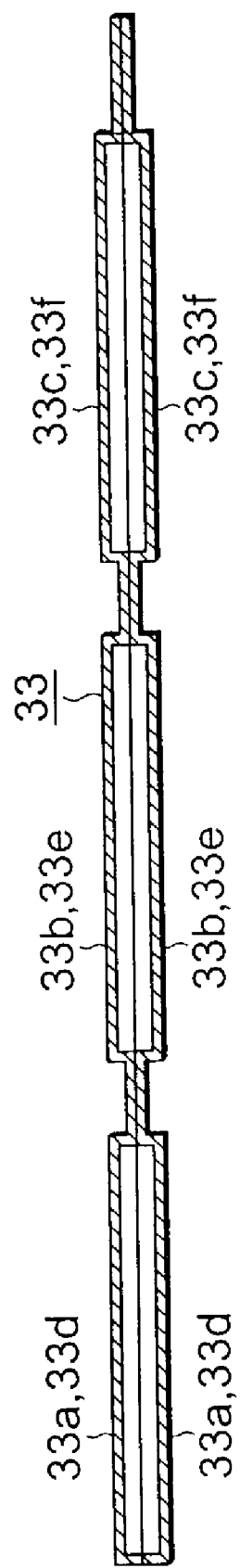
FIG. 38 is a front sectional view of the high voltage electrode of FIG. 37.
Figure 39:
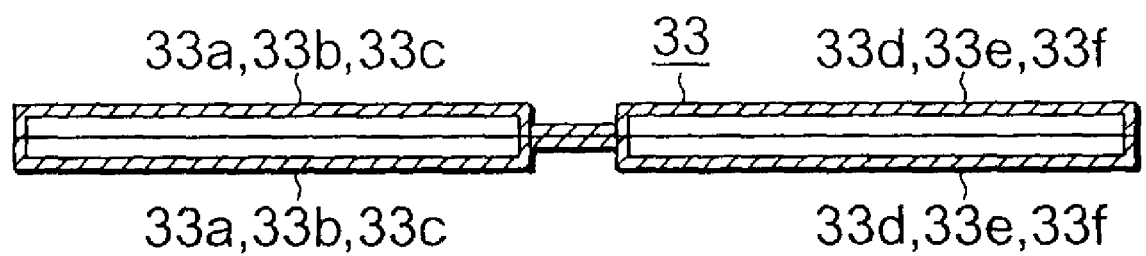
FIG. 39 is a side sectional view of the high voltage electrode of FIG. 37.

FIG. 37 is a top view of still yet another high voltage electrode of the present invention. FIG. 38 is a front sectional view of the high voltage electrode of FIG. 37. FIG. 39 is a side sectional view of the high voltage electrode. A high voltage electrode 33 of the present embodiment is made by superposing and joining two (2) conductive thin plates of stainless steel and the like. The conductive thin plate(s) is subjected to pressing so that a number of convex portions are formed in an (obverse) surface and a number of concave portions are in the underside surface, and the underside surfaces of the plates are superposed and joined. In the high voltage electrode 33, six (6) roughly square-shaped convex portions 33a to 33f are formed in each main surface. The high voltage electrode 33 manufactured in this manner has an outer shape that is approximately the same as that of the high voltage electrode of Embodiment 1.

In the ozonizer of such a construction, the high voltage electrode 33 is made, as a second electrode, by superposing and joining two (2) metal flat plates, the convex portions being formed in the (obverse) surface thereof and concave portions being formed in the underside surface at positions corresponding to the convex portions. Thus, the high voltage electrode 33 may be lightened. Also, the (amount of) material is reduced and the cost may be reduced, and further, the structure of the divided discharge regions may be easily constructed. Moreover, since the shape top surfaces of the convex portions is approximately square, divided discharge regions of an approximately 1:1 aspect ratio may be formed corresponding to these portions.

Embodiment 11

Figure 40:
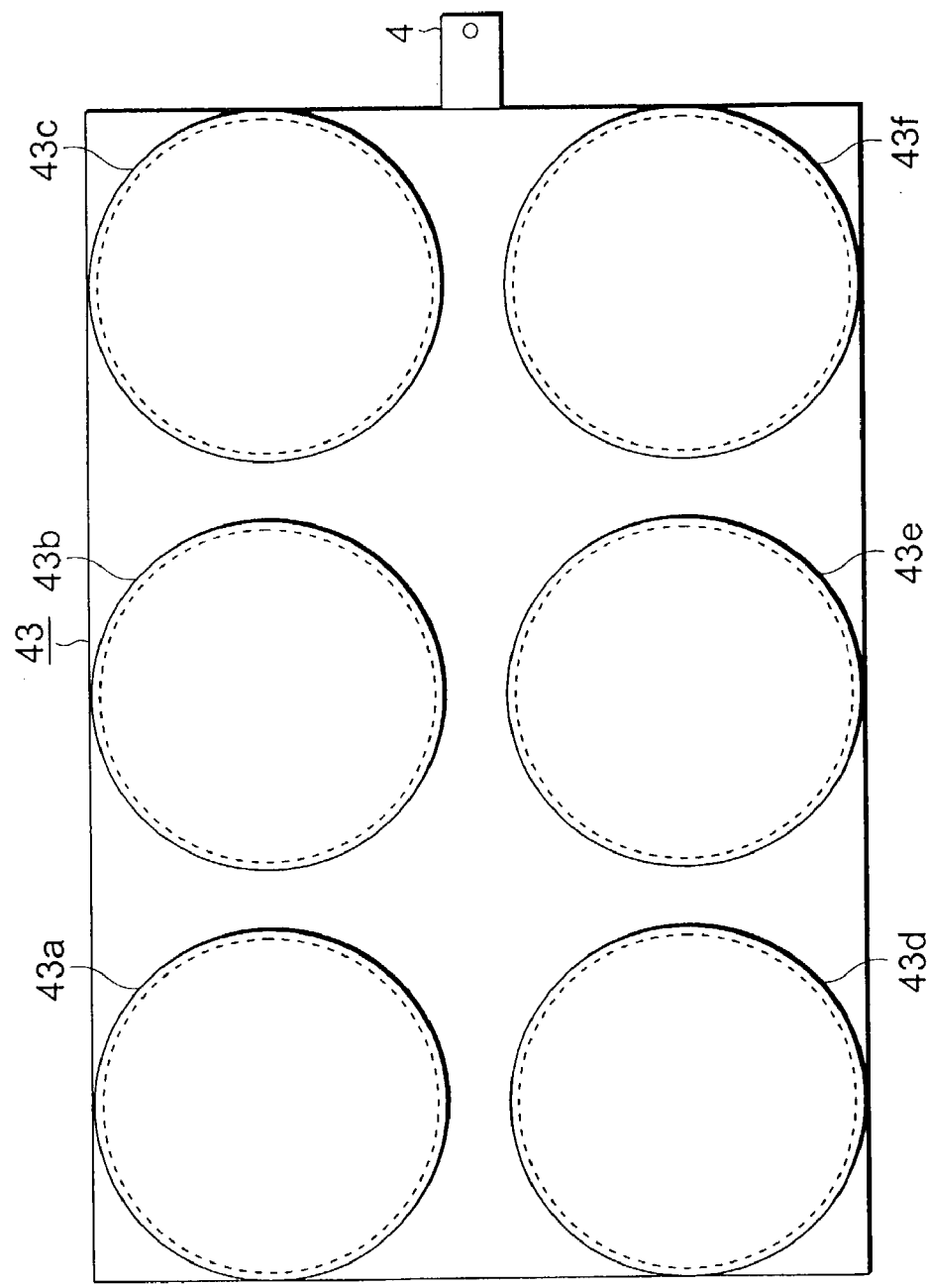
FIG. 40 is a top view of a high voltage electrode of an ozonizer of Embodiment 11 of the present invention.
Figure 41:
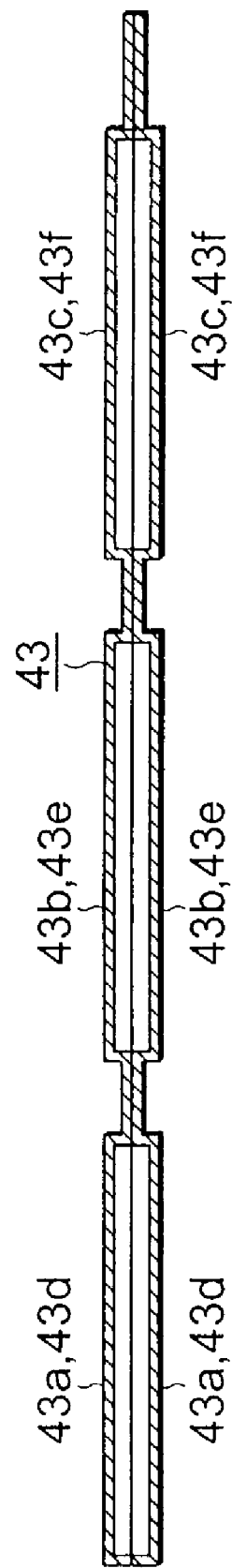
FIG. 41 is a front sectional view of the high voltage electrode of FIG. 40.
Figure 42:
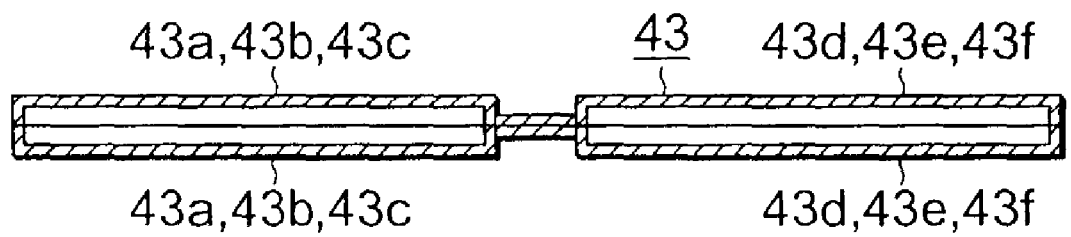
FIG. 42 is a side sectional view of the high voltage electrode of FIG. 40.

FIG. 40 is a top view of a high voltage electrode of still yet another example of an ozonizer of the present invention. FIG. 41 is a front sectional view of the high voltage electrode. FIG. 42 is a side sectional view of the high voltage electrode. A high voltage electrode 43 of the present embodiment is made by superposing and joining two (2) conductive thin plates of stainless steel and the like. The conductive thin plate(s) is subjected to pressing so that a number of convex portions are formed in an (obverse) surface and a number of concave portions are in the underside surface, and the underside surfaces of the plates are superposed and joined. In the high voltage electrode 33, six (6) circular-shaped convex portions 43a to 43f are formed in each main surface. Other constructions are similar to Embodiment 10.

In the ozonizer of such a construction, because the shape of top surfaces of the convex portions 43a to 43f is roughly circular, the discharge regions 27a to 27f formed based on these portions are also circular. Accordingly, the ozone gas flow velocity inside the discharge regions 27a to 27f may be constant, degradation of ozone concentration may be prevented and the ozone generating efficiency may be improved.

Moreover, the convex portions 33a to 33f formed in the high voltage electrode 33 of the above Embodiment 10 are roughly square and the convex portions 43a to 43f formed in the high voltage electrode 43 are approximately circular. Nevertheless, the convex portions formed in the high voltage electrode are not limited to square of circular and may be any shape between square and circular, the important consideration is that the aspect ratio be within 1.5:1.0.

Embodiment 12

Figure 43:
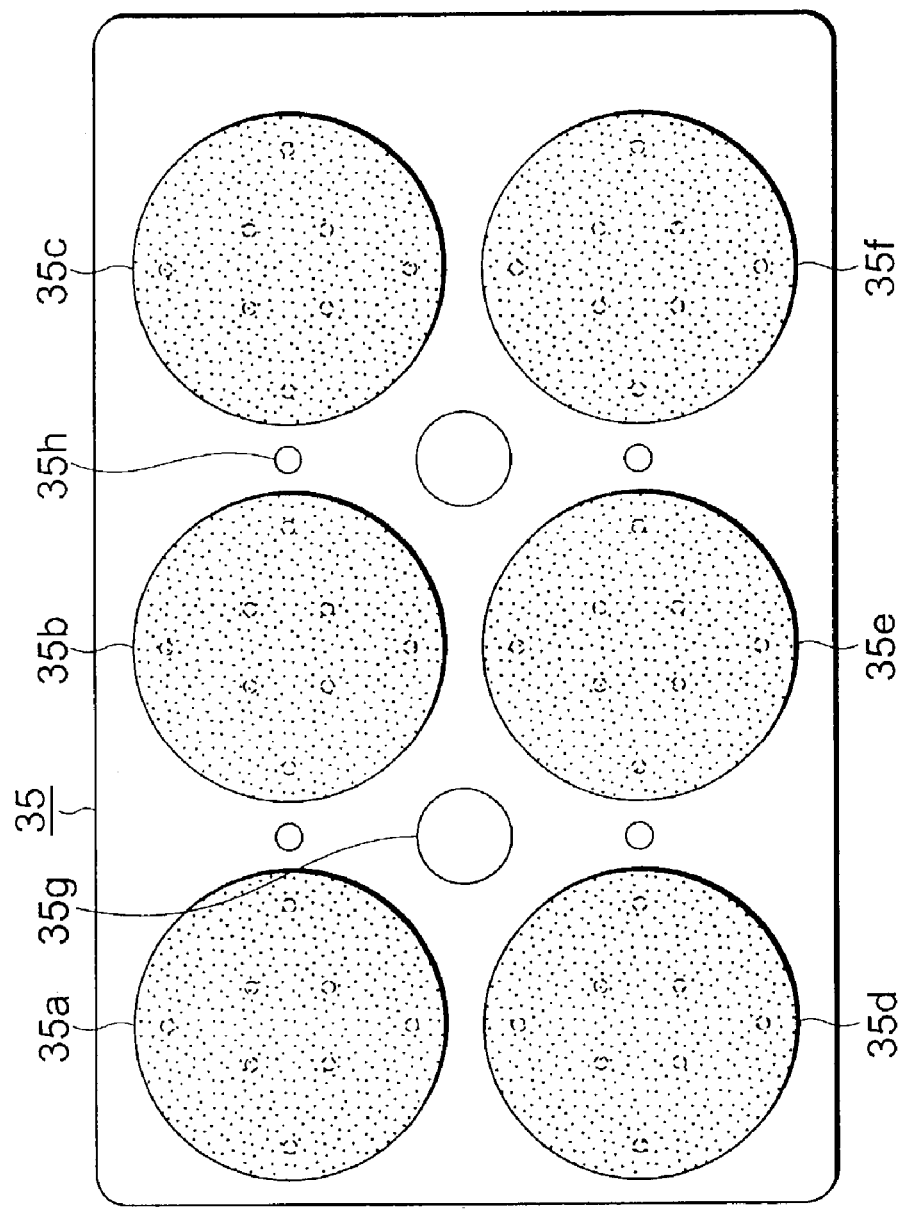
FIG. 43 is a top view of a dielectric plate of an ozonizer of Embodiment 12 of the present invention.
Figure 44:
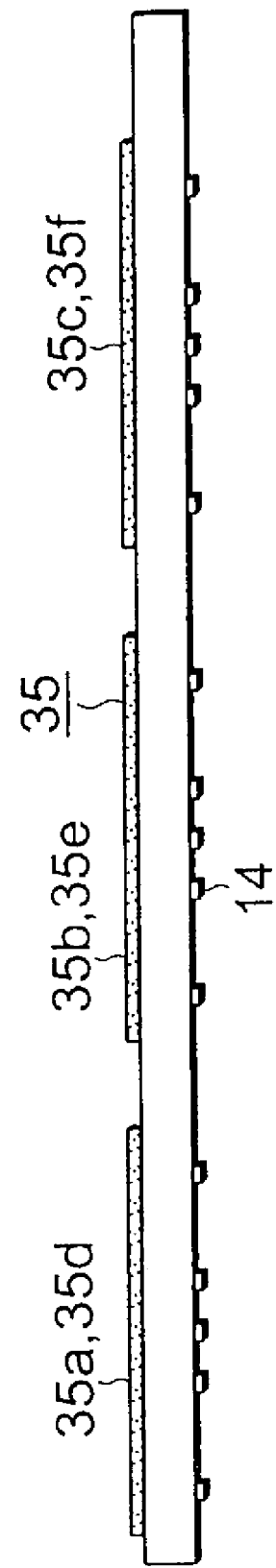
FIG. 44 is a front elevational view of the dielectric plate of FIG. 43.
Figure 45:
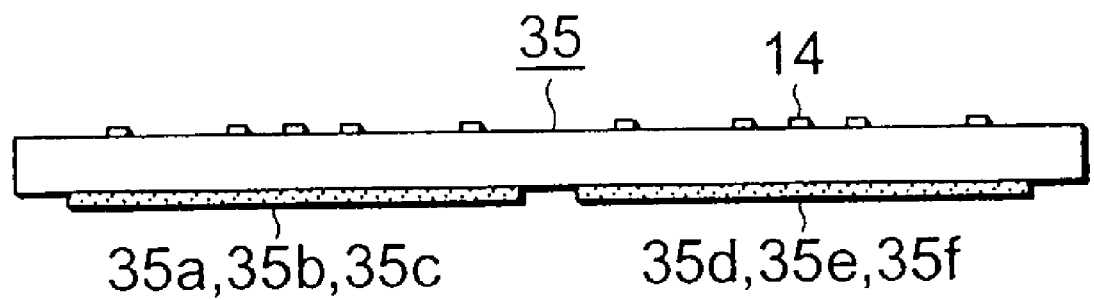
FIG. 45 is a side elevational view of the dielectric plate of FIG. 43.

FIG. 43 is a top view of a dielectric plate of still yet another example of an ozonizer of the present invention. FIG. 44 is a front elevational view of the dielectric plate. FIG. 45 is a side elevational view of the dielectric plate. In the dielectric plate 35 of the present embodiment, six (6) conductive films 35a to 35f formed is a surface of a side that contacts the high voltage electrode 3 are formed circular. Thus, the six (6) discharge regions 27a to 27f formed at locations corresponding to these conductive films 35a to 35f are also approximately circular, and the ozone gas flow velocity inside the discharge regions 27a to 27f may be constant, degradation of ozone concentration may be prevented and the ozone generating efficiency may be improved. Moreover, large and small raw material gas uniform supply holes 35g, 35h are bored between adjacent conductive films 35a to 35f so that raw material gas flows uniformly into each discharge region 27a to 27f.

Also, In the dielectric plate 35 of the present embodiment, spacers 14 for forming the discharge regions 27a to 27f are provided at a surface opposite the surface where the conductive films 35a to 35f of the dielectric 35 are formed, that is at the low voltage electrode 7-side (discharge region-side) surface of the dielectric plate 35. The spacers 14 are, for example, made as a plurality of cylindrically shaped protrusions 0.1 mm in height. The spacers 14 are formed, for example, by machining the dielectric plate 35 to cut away peripheries so that the spaces 14 are relatively (integrally) formed by shaving. Accordingly, by cutting the dielectric plate 35 and spacers 14 integrally out of one (1) piece of material, compared to the procedure where the dielectric plate 35 and spacers 14 are formed separately and joined, the parts for the spacers 14 themselves are reduced and the number of components may be reduced, and further, the step for positioning the spacers 14 becomes unnecessary and assembly of the ozonizer is facilitated.

That is, in an ozonizer constructed such as above, the dielectric plate 35 includes the conductive films 35a to 35f provided at the high voltage electrode 3-side main surface, and these conductive films 35a to 35f are closely contacted with and electrically joined with the high voltage electrode 3. Because these conductive films 35a to 35f are divided so as to correspond to the plurality of divided discharge regions 27a to 27f, construction of the divided discharge regions 27a to 27f may be easily realized.

Since the shape of the conductive films 35a to 35f is a circular, the shape of the corresponding discharge regions 27a to 27f is also circular and the ozone gas flow velocity inside the discharge regions may be constant, degradation of ozone concentration may be prevented and the ozone generating efficiency may be improved. Furthermore, because the spacers 14 are integrally provided at the main surface opposite the conductive films 35a to 35f of the dielectric 35, the number of parts may be reduced, and the step for positioning the spacers 14 becomes unnecessary and the assembly operation is facilitated.

Moreover, in the present invention, although the spacers 14 are provided at the main surface opposite the conductive films 35a to 35f of the dielectric 35 within circles corresponding to the conductive films 35a to 35f, the positioning location of the spacers 14 is not limited to within these circles and they may also be provided outside the circles.

Further, the shape of the conductive films is not limited to square or circular and may be any shape between square and circular, the important consideration is that the aspect ratio be within 1.5:1.0.

Embodiment 13

Figure 46:
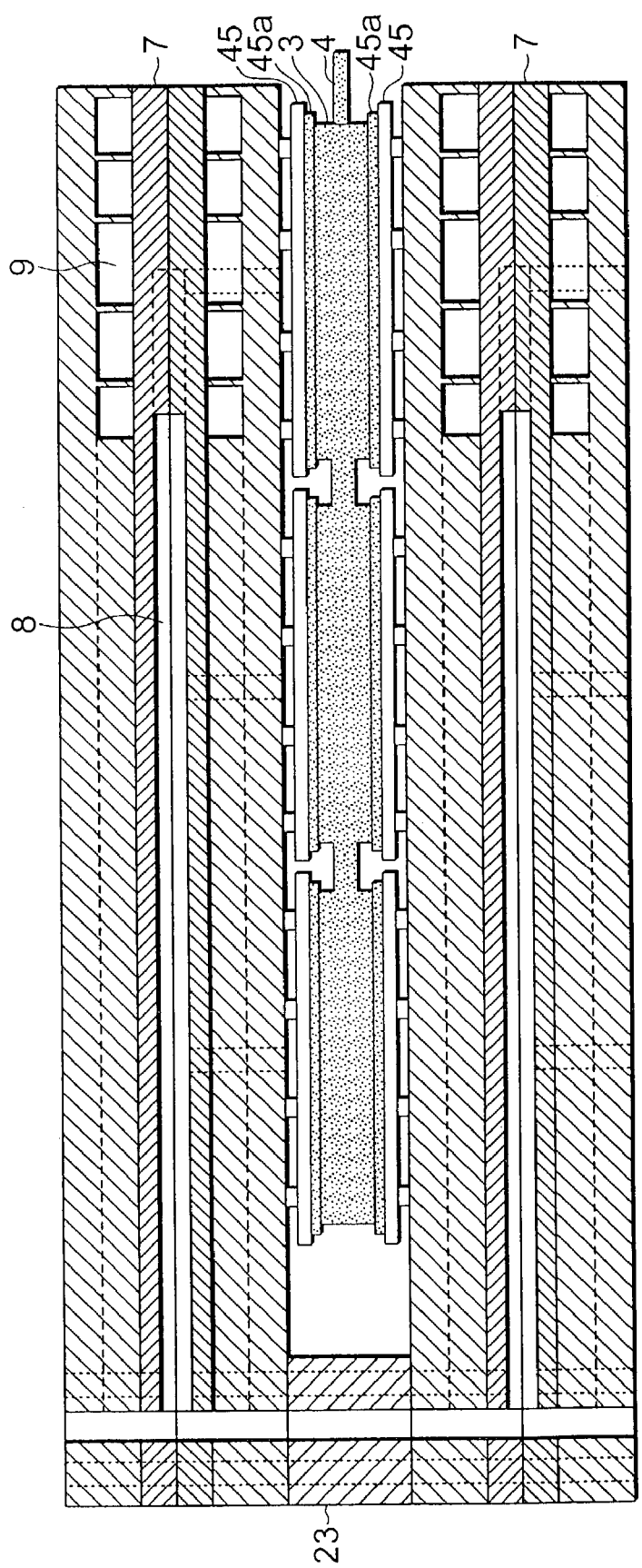
FIG. 46 is sectional view of an electrode module of an ozonizer of Embodiment 13 of the present invention.
Figure 47:
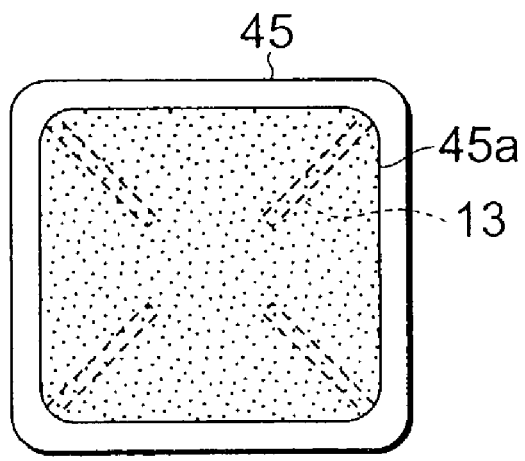
FIG. 47 is a top view of a dielectric plate of the electrode module of FIG. 46.

FIG. 46 is sectional view of an electrode module of still yet another ozonizer of the present invention. FIG. 47 is a top view of a dielectric plate of the electrode module of FIG. 46. A dielectric plate 45 of the present embodiment is divided into six (6) section which correspond to the six (6) discharge regions 27a to 27f. The roughly square shaped, flat dielectric plate 45 includes a rectangular conductive film 45a on a main surface thereof. Slender, rod-shaped spacers 13 0.1 mm in thickness at a main surface opposite the conductive film 45a are provided integrally with the dielectric plate 45.

In a construction such as above, because the dielectric plate 45 is a simple construction wherein a single conductive film 45a is formed of the plate surface, manufacture is simplified, cost reduction is possible and the capacity for mass production is increased.

Embodiment 14

Figure 48:
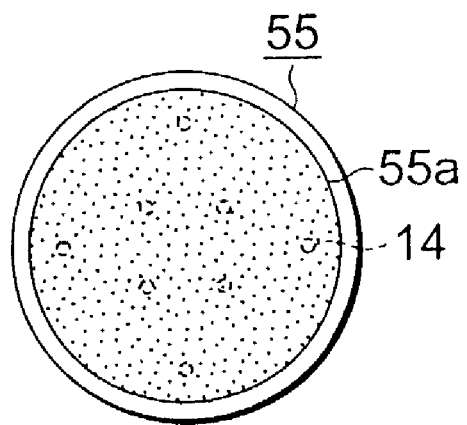
FIG. 48 is a top view of dielectric plate of an ozonizer of Embodiment 14 of the present invention.

FIG. 48 is a top view of dielectric plate of still yet another example of an ozonizer of the present invention. A dielectric plate 55 of the present embodiment is divided into six (6) section which correspond to the six (6) discharge regions 27a to 27f. A circular dielectric plate 55 includes a circular conductive film 55a on a main surface thereof. A plurality of cylindrical spacers 14 of a small diameter are formed as protrusions on a surface opposite the conductive film 55a.

Accordingly, in such a construction, the dielectric plate 55 may be easily manufactured, the cost may be reduced and the capacity for mass production may be improved. Further, because the discharge regions 27a to 27f are circular, the ozone gas flow velocity inside the discharge regions may be constant, degradation of ozone concentration may be prevented and the ozone generating efficiency may be improved.

The present invention provides an ozonizer wherein, an electrode module comprising a flat plate first electrode, a flat plate second electrode facing a main surface of the first electrode, and a flat dielectric plate and spacer for forming a discharge region provided between electrodes of the first electrode and second electrode, is laminated in a plurality of layers, an alternating current is applied between an electrode of the first electrode and an electrode of the second electrode, and a discharge is brought about in a gap of the discharge region which is injected with a gas containing at least oxygen gas, in the first electrode, an ozone gas passage for taking out ozone gas generated by the discharge region is formed between an electrode surface facing the discharge region and a side portion, a plurality of the ozone gas retrieving holes are dispersed in a discharge region of the first electrode so as to make flow velocity distribution in a radial direction(s), with the ozone gas retrieving holes connected with the ozone passage as centers, approximately uniform, and the plurality of ozone gas passages collect and draw out ozone gas generated at a plurality of the discharge region locations inside the first electrode. Thus, surface area of discharge regions may be increased to increase an ozone generating capacity, ozone generating performance is not damaged even if the discharge region for one (each) electrode surface is increased and reliability is high, a high level of flatness may be maintained in the electrode surface, the laminate structure of modules may be easily constructed, cooling performance of the electrode may be increased, the apparatus may be small and light, structure of the piping may be simplified, and further, the manufacturing cost may be reduced.

What is claimed is:

1. An ozonizer comprising:
a plurality of electrode modules laminated in a plurality of layers, each electrode module comprising
a first electrode,
a second electrode facing a main surface of said first electrode,
a flat dielectric plate, and
gap spacers, wherein said spacers and said dielectric plate are located between said first electrode and said second electrode, said gap spacers being disposed between said dielectric plate and said first electrode and defining a discharge space between said dielectric plate and said first electrode, wherein
the discharge space is divided into a plurality of discharge regions of substantially uniform size and shape, arranged in a pattern within the discharge space, each of said discharge regions receiving oxygen at all of a respective periphery of said discharge region,
said first electrode includes a plurality of ozone gas retrieving holes, one of said ozone gas retrieving holes being located centrally within each of said discharge regions, and
said first electrode includes an ozone gas passage communicating with each of said ozone gas retrieving holes for extracting ozone generated in said discharge regions, said ozone gas passage being located between an electrode surface facing said second electrode and a side portion of said first electrode, so that when an alternating current is applied between said first electrode and said second electrode, a discharge occurs in said discharge regions to which oxygen is supplied, ozone is generated and the ozone generated is collected through said ozone gas retrieving holes in said first electro and said ozone gas passage in said first electrode.

2. The ozonizer according to claim 1, wherein each of said discharge regions has an aspect ratio within a range of 1.5:1.0.

3. The ozonizer according to claim 1 including a cooling water passage for circulating coolant in said first electrode.

4. The ozonizer according to claim 3, wherein said first electrode includes
rectangular shaped electrode discharge portions and said ozone gas passage and said cooling water passage are in an inner portion of said first electrode, and
an inlet/outlet portion including an ozone gas retrieving opening of said ozone gas passage, and a coolant inlet and coolant outlet of said cooling water passage, are located at a edge of one side of said first electrode.

5. The ozonizer according to claim 3, wherein said first electrode includes
rectangular shaped electrode discharge portions and said ozone gas passage and said cooling water passage are in an inner portion of said first electrode,
a first inlet/outlet includes a coolant inlet of said cooling water passage, located at a first edge of said first electrode, and
a second inlet/outlet portion includes a coolant outlet of said cooling water passage, located at a second edge, opposite said first edge of said first electrode.

6. The ozonizer according to claim 3, wherein said first electrode includes,
rectangular shaped electrode discharge portions and said ozone gas passage and said cooling water passage are in an inner portion of said first electrode,
a first inlet/outlet portion including an ozone gas retrieving opening of said ozone gas passage, located at a first edge of said first electrode, and
a second inletloutlet portion including a coolant inlet and a coolant outlet of said cooling water passage, located at a second edge, opposite said first edge of said first electrode.

7. The ozonizer according to claim 3, wherein said first electrode comprises two flat plates made of metal and having grooves in main surfaces of said flat plates, adhered together so that the grooves are aligned, and said ozone gas passage and said cooling water passage are located in an inner portion of said first electrode.

8. The ozonizer according to claim 1, including a conductive film on a second electrode-side surface of said dielectric plate, wherein said conductive film is electrically joined to said second electrode.

9. The ozonizer according to claim 8, wherein said spacers are integral with a main surface of said dielectric plate opposite said conductive film.

10. The ozonizer according to claim 1, including conductive films on a second electrode-side surface of said dielectric plate, wherein said conductive films are electrically joined to said second electrode, and said conductive films correspond to said discharge regions.

11. The ozonizer according to claim 10, wherein said conductive films are approximately square.

12. The ozonizer according to claim 10, wherein said conductive films are approximately circular.

13. The ozonizer according to claim 1, wherein said dielectric plate is configured to correspond to said discharge regions.

14. The ozonizer according to claim 1, wherein gap length of said discharge space in said discharge regions is no more than 0.06 cm, discharge pressure in said discharge regions is no more than 0.4 MPa, and discharge power density in said discharge regions is 4.0 W/cm$^2$ or less.

15. The ozonizer according to claim 1, wherein surface area of said discharge space is approximately 3000 cm$^2$.

16. The ozonizer according to claim 1, comprising an ozonizer cover that compresses said electrode modules with a force in a laminating direction so that said discharge regions have a predetermined thickness, and so that said electrode modules are sealed.

17. The ozonizer according to claim 1, comprising:
a base on which said laminated electrode modules are mounted, and
an ozonizer cover sealing said electrode modules, wherein said base and said ozonizer cover are joined by one of soldering, welding, and adhesion.

18. The ozonizer according to claim 1, comprising a cylindrical ozonizer cover that compresses said electrode modules with a force in a laminating direction so that said discharge regions have a predetermined thickness and so that said laminated electrode modules are sealed, wherein any of coolant inlet/outlet piping, raw material gas intake piping, ozone gas retrieving piping, and a high voltage bushing are located at an end surface of said ozonizer cover.

19. An ozonizer comprising:
a plurality of electrode modules stacked in a plurality of layers, each electrode module including a flat plate first electrode, a flat plate second electrode facing a main surface of said first electrode, a flat dielectric plate, and a spacer located between and forming a discharge region between said first and second electrodes, wherein
said first electrode is hollow and includes an exterior surface and an internal volume,
said first electrode includes a main surface discharge portion at said main surface and, adjacent said discharge portion, a neck portion, said internal volume including a coolant passage having a coolant inlet and a coolant outlet at said neck portion, and said internal volume including an ozone gas passage in communication with an ozone gas retrieving opening at said neck portion,
said first electrode includes an ozone gas retrieving hole providing communication between the discharge space and said ozone gas retrieving opening for retrieving ozone gas generated in the discharge space, and
ozone is generated when a discharge is established in the discharge region when a gas mixture including oxygen is injected into the discharge region and an alternating current is applied between said first and second electrodes;
a manifold block connected to said first electrode at said neck portion and including respective ports in communication with said coolant inlet, said coolant outlet, and said ozone gas retrieving opening;
a first fastening mechanism compressing said electrode discharge portion of said first electrode, said second electrode, said dielectric plate, and said spacer; and
a second fastening mechanism, separate from said first fastening mechanism, compressing said neck portion of said first electrode and said manifold block.

* * * * *